(12) United States Patent
Delurey et al.

(10) Patent No.: US 6,178,364 B1
(45) Date of Patent: Jan. 23, 2001

(54) METHOD OF CONTROLLING A RETRACTABLE STAIRWAY ASSEMBLY

(75) Inventors: Paul J. Delurey, Beaverton; David J. Johnston, Portland; Michael K. Smith, Beaverton; Nasser Zamani, Lake Oswego; William G. Massey, III; Luis A. Novoa, both of Portland; Michael von Mayenburg, Lake Oswego, all of OR (US); Charles H. Blakewood, Jr., Vancouver, WA (US); Paul M. Menig, Tigard, OR (US)

(73) Assignee: Freightliner Corporation, Portland, OR (US)

( * ) Notice: Under 35 U.S.C. 154(b), the term of this patent shall be extended for 0 days.

(21) Appl. No.: 09/257,824

(22) Filed: Feb. 25, 1999

Related U.S. Application Data
(60) Provisional application No. 60/119,890, filed on Feb. 12, 1999.

(51) Int. Cl.⁷ .................................................. G06F 7/00
(52) U.S. Cl. ......................... 701/36; 105/443; 105/447; 280/163; 280/166; 414/58; 182/82; 182/88
(58) Field of Search ................................... 105/443, 447; 182/82, 88; 414/558; 280/163, 166; 701/36

(56) References Cited

U.S. PATENT DOCUMENTS

| | | |
|---|---|---|
| 1,621,479 | 3/1927 | Cleveland et al. . |
| 3,095,216 | 6/1963 | Browne et al. .................... 280/166 |
| 3,224,525 | 12/1965 | Froitzheim et al. .................. 180/89 |
| 3,378,278 | 4/1968 | Froitzheim et al. ................. 280/163 |
| 3,392,990 | 7/1968 | Wolf ................................... 280/166 |
| 3,403,926 | 10/1968 | Way .................................... 280/166 |
| 3,572,754 | 3/1971 | Fowler ............................... 280/166 |
| 3,696,372 | 10/1972 | Garrett et al. ...................... 340/272 |
| 3,865,399 | 2/1975 | Way ................................... 280/166 |
| 3,955,827 | 5/1976 | Wonigar .............................. 280/166 |
| 3,967,695 | 7/1976 | Waddell ................................. 182/86 |
| 3,997,183 | 12/1976 | Russey ................................ 280/166 |
| 4,074,786 | 2/1978 | Joubert ............................... 180/68.5 |
| 4,116,457 | 9/1978 | Nerem ................................. 280/166 |
| 4,140,327 | 2/1979 | Hackney, III ....................... 280/163 |
| 4,200,303 | 4/1980 | Kelly .................................... 280/166 |
| 4,416,486 | 11/1983 | McNaught et al. .................. 296/190 |

(List continued on next page.)

FOREIGN PATENT DOCUMENTS

| | | |
|---|---|---|
| 111 140 | 3/1971 | (DE) . |
| 3826542A1 | 2/1990 | (DE) . |
| 3920527 | 7/1990 | (DE) . |
| 0012336A1 | 12/1979 | (EP) . |
| WO9840241 | 9/1998 | (EP) . |
| 80 12115 | 5/1980 | (FR) . |
| 60-148741 | 8/1985 | (JP) . |
| 08332900 | 12/1996 | (JP) . |

*Primary Examiner*—William A. Cuchlinski, Jr.
*Assistant Examiner*—Yonel Beaulieu
(74) *Attorney, Agent, or Firm*—Klarquist Sparkman Campbell Leigh & Whinston LLP

(57) ABSTRACT

A method of controlling a retractable stairway assembly for a vehicle includes monitoring at least one vehicle status condition such as (a) whether the vehicle is stopped, (b) whether the parking brake is set, (c) whether the cab is tilted in excess of a threshold, and (d) whether excess current is being required by a motor used to shift the stairway between stowed and deployed positions in the event an electric motor is used for this purpose. In the event any of these monitored conditions are not in a predetermined state, deployment of the stairway from a stowed position is blocked. Deployment and stowing of the stairway may also be interrupted depending upon vehicle status and other conditions. Interior and exterior vehicle alarms may be activated depending on vehicle status conditions and the mode of operation of the stairway.

43 Claims, 37 Drawing Sheets

U.S. PATENT DOCUMENTS

| | | | |
|---|---|---|---|
| 4,482,113 | 11/1984 | Backlund et al. | 264/129.5 |
| 4,570,962 | 2/1986 | Chavira | 280/166 |
| 5,085,450 | 2/1992 | DeHart | 280/166 |
| 5,228,707 | 7/1993 | Yoder | 280/166 |
| 5,241,780 | 9/1993 | Zaun et al. | 47/1.7 |
| 5,284,349 | 2/1994 | Bruns et al. | 280/166 |
| 5,375,864 | 12/1994 | McDaniel | 280/166 |
| 5,538,265 | 7/1996 | Chen et al. | 280/163 |
| 5,547,040 | 8/1996 | Hanser et al. | 182/88 |
| 5,584,493 | 12/1996 | Demski et al. | 280/166 |

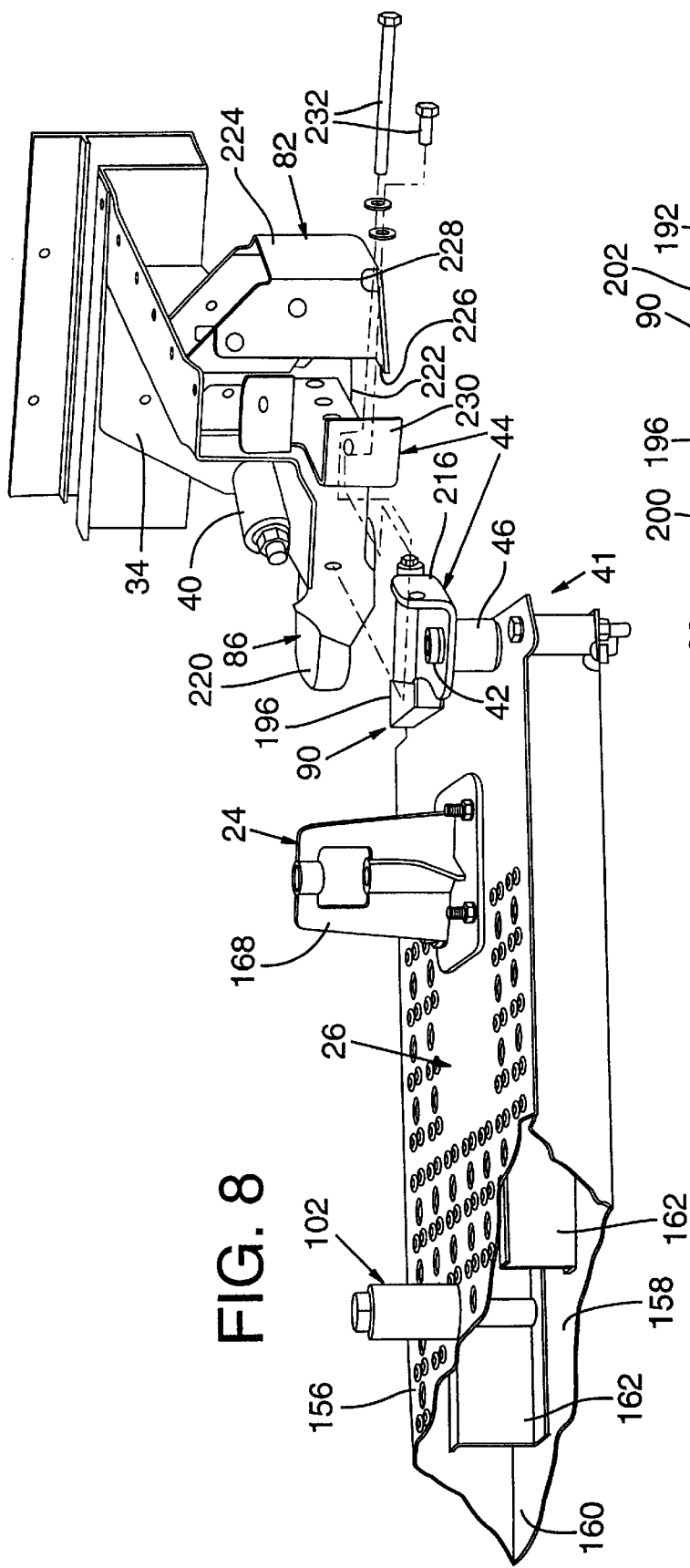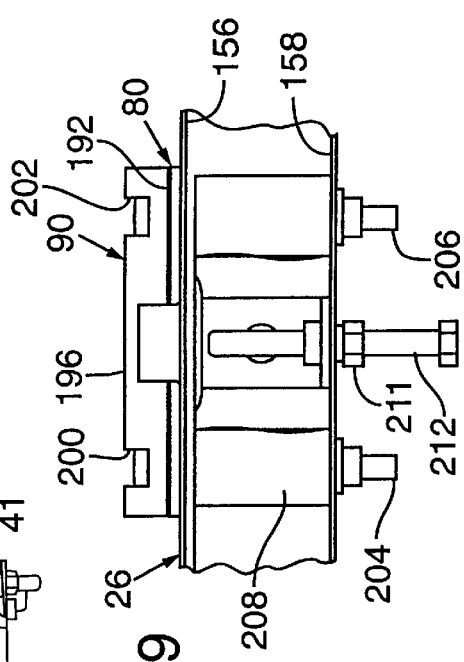

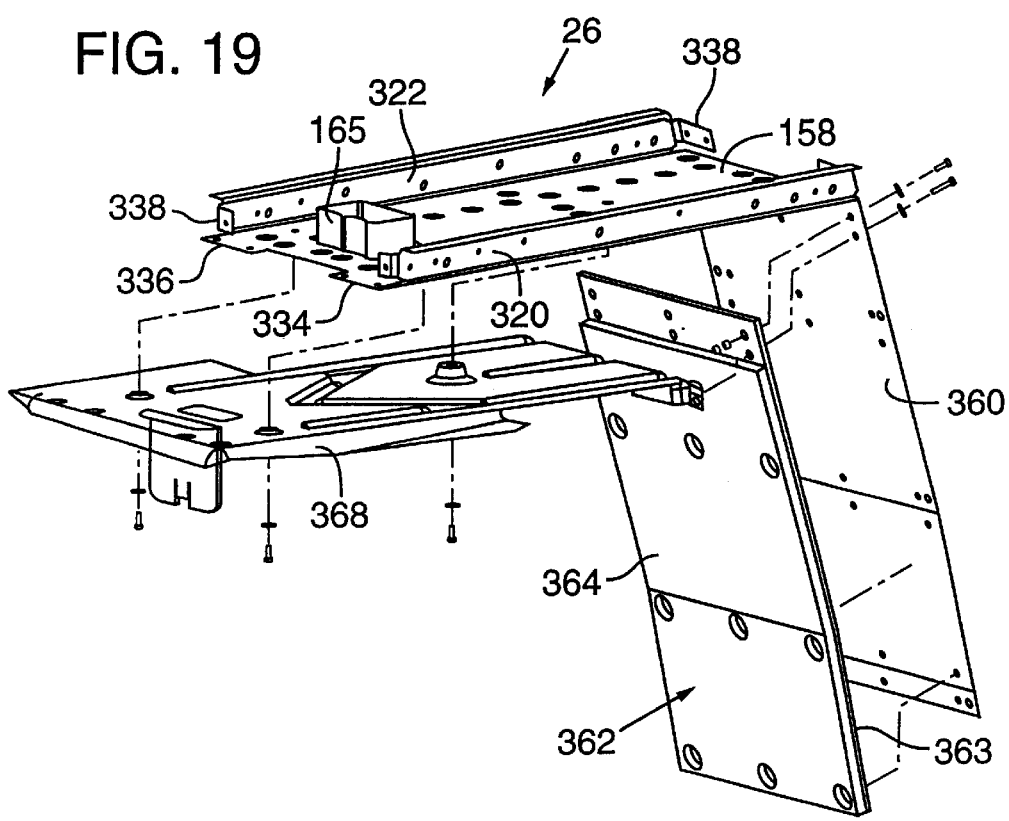
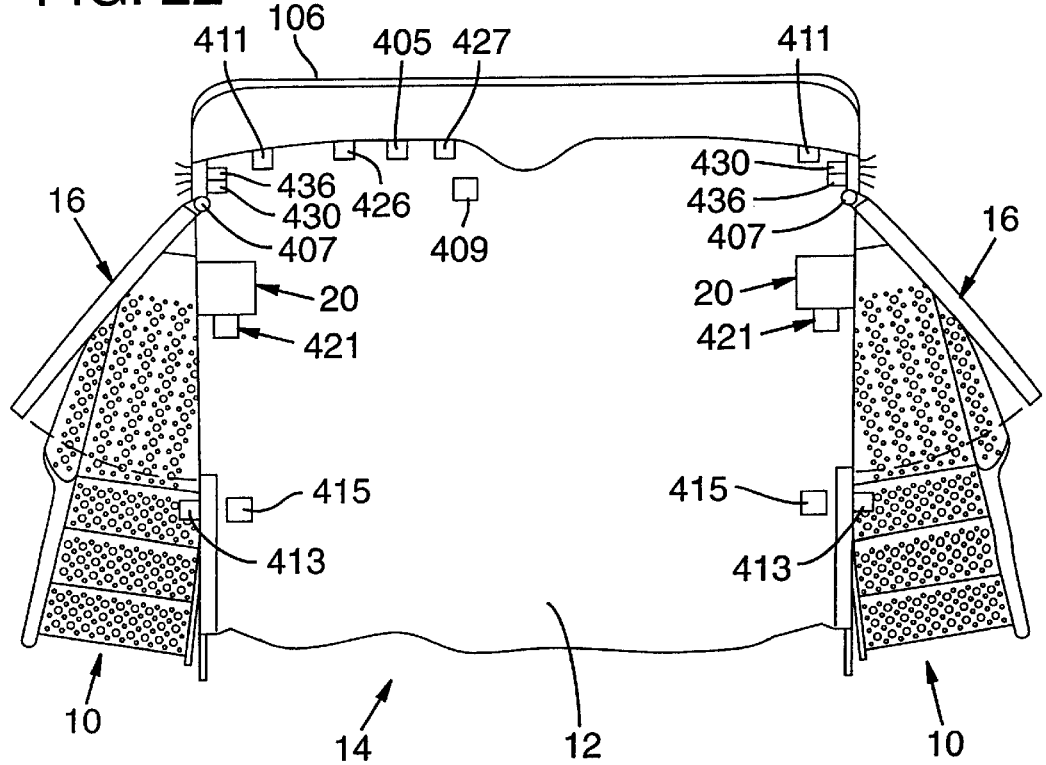

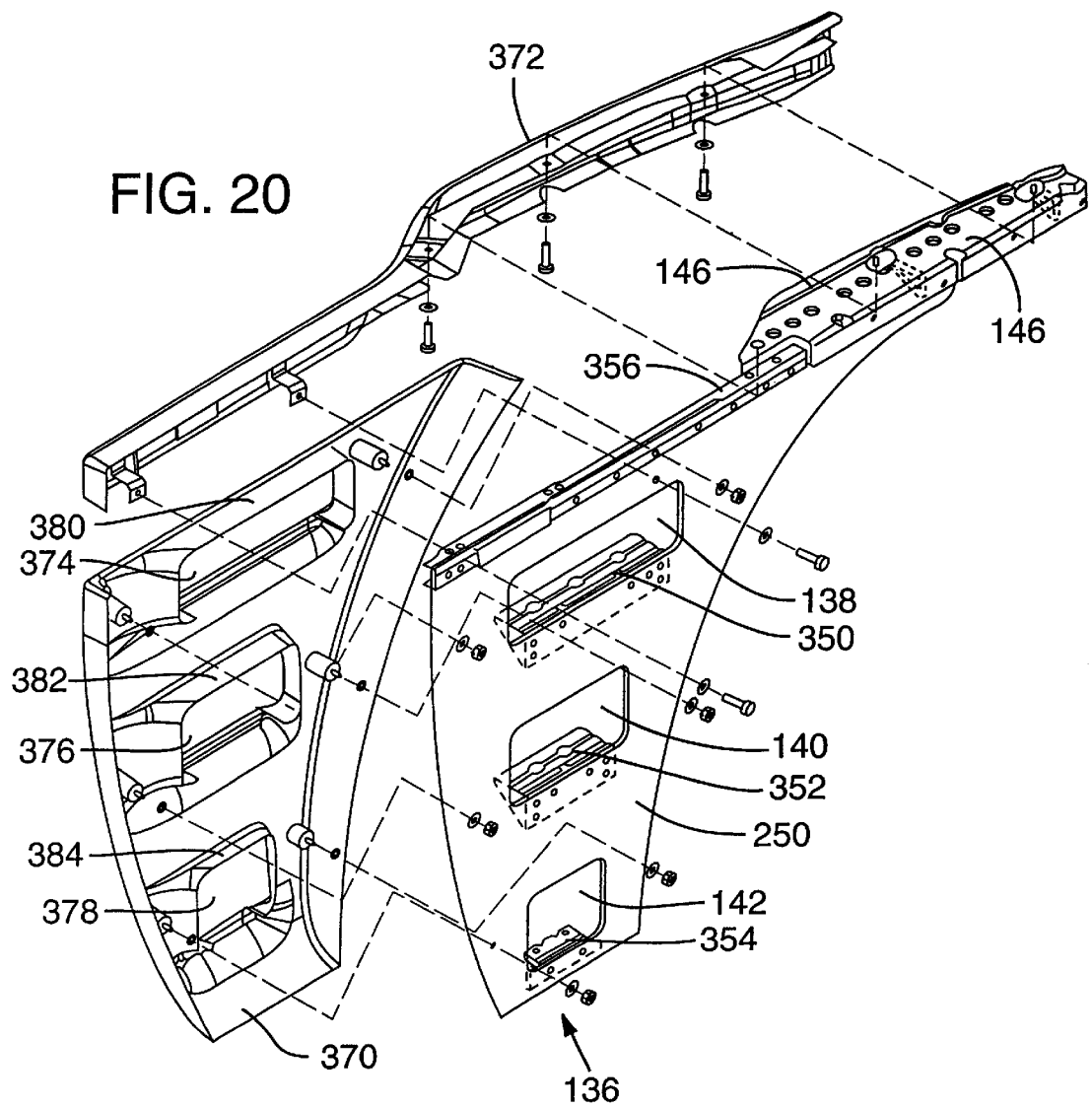

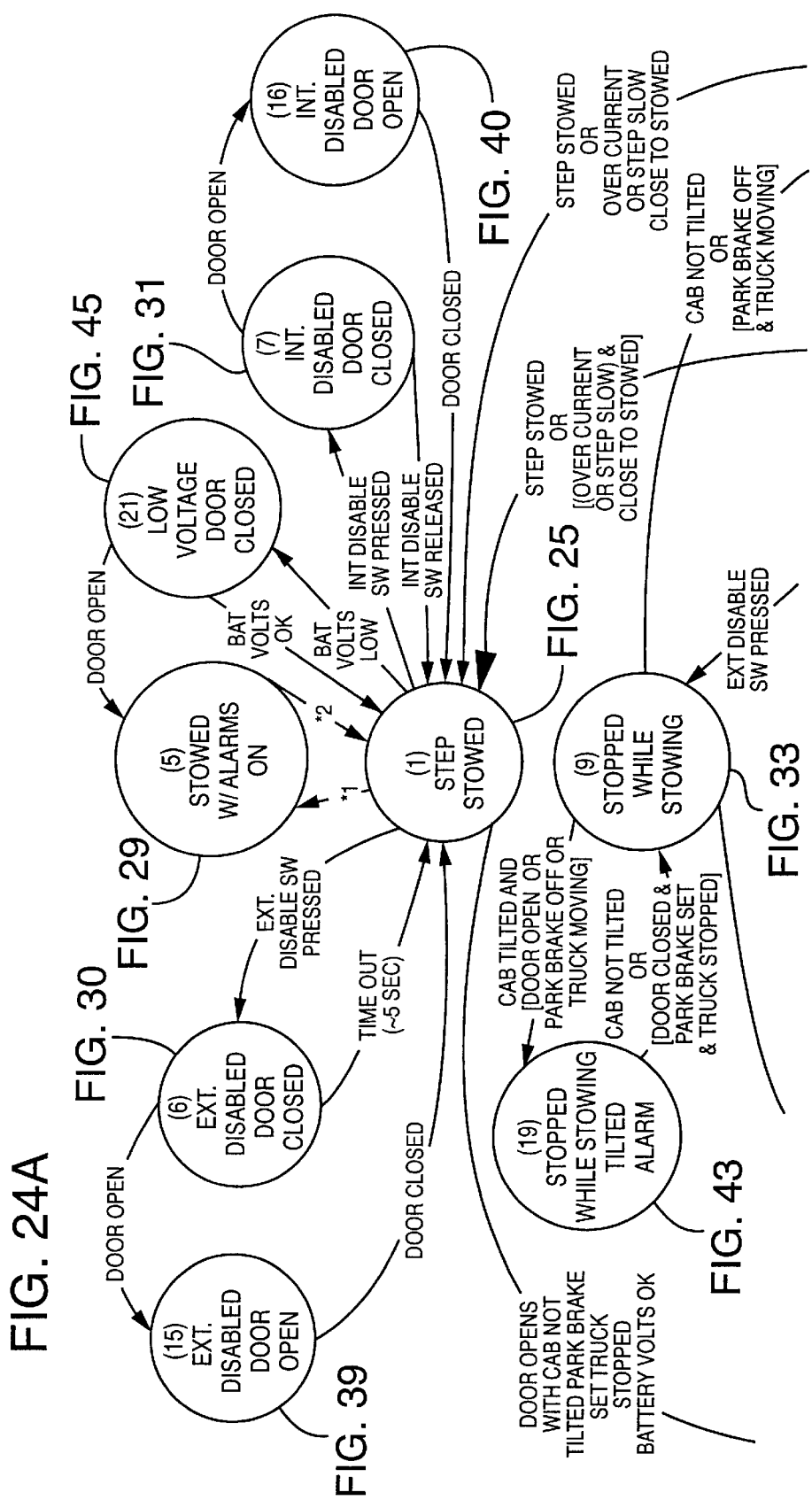

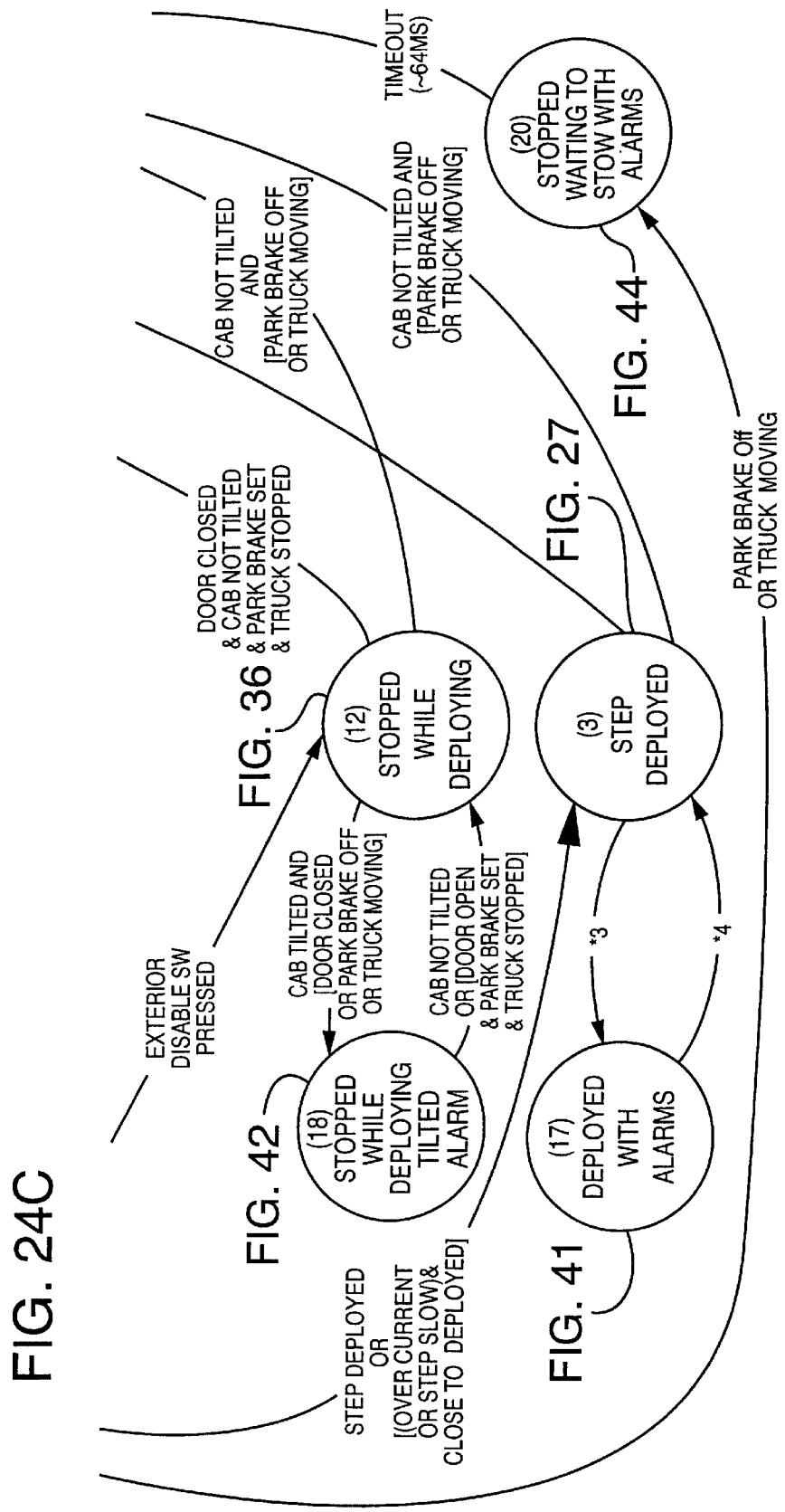

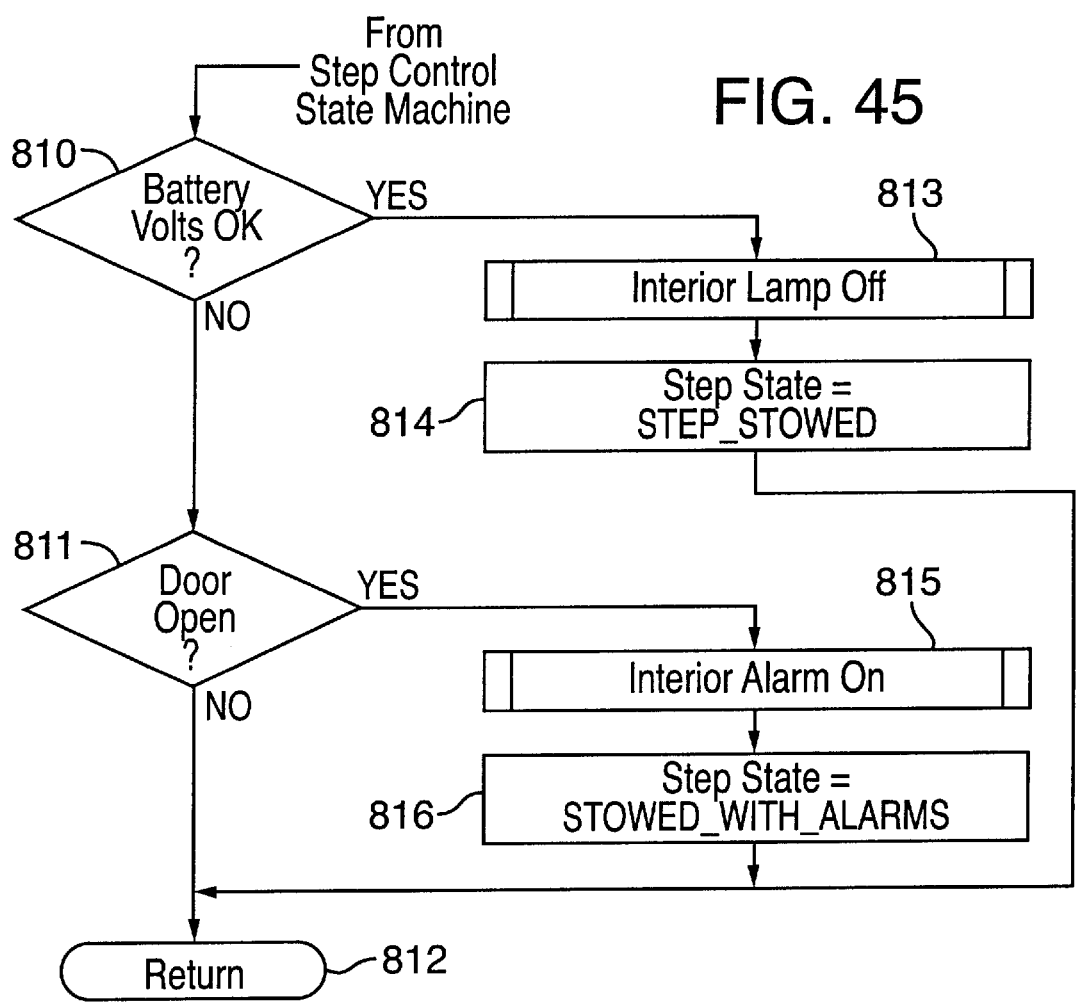

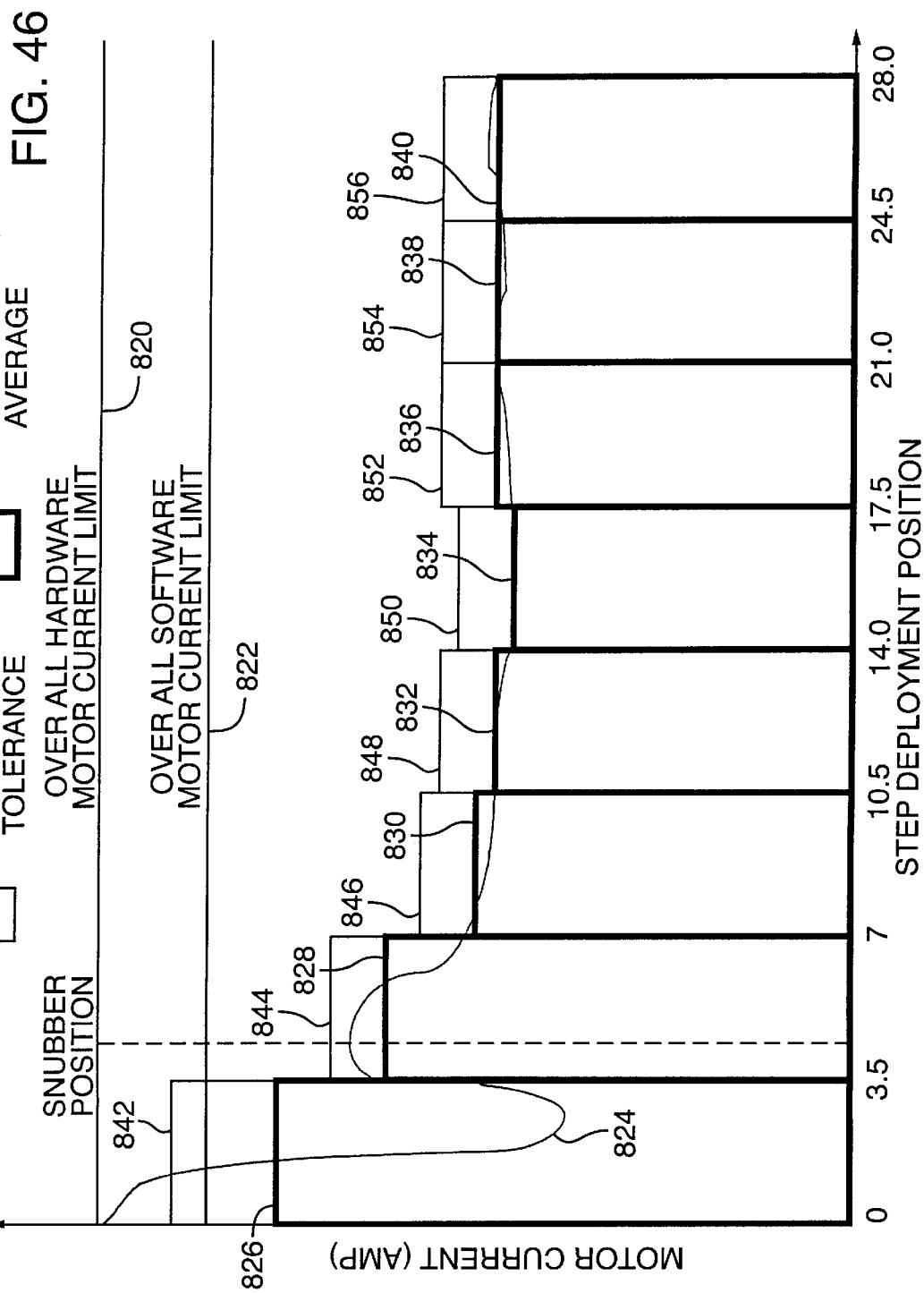

METHOD OF CONTROLLING A RETRACTABLE STAIRWAY ASSEMBLY

REFERENCE TO PRIOR APPLICATION

This application claims the benefit of U.S. Provisional Application, Ser. No. 60/119,890 filed Feb. 12, 1999. This provisional application was entitled METHOD OF CONTROLLING A RETRACTABALE STAIRWAY ASSEMBLY, and has the same inventors as this application.

COPYRIGHT NOTICE

This document is copyrighted ©1999 Freightliner Corporation. A portion of this disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND

The present invention relates to a method and apparatus for controlling the operation of a retractable stairway assembly for a vehicle such as a truck, the stairway being deployable for use in entering and exiting the vehicle and being stowable when not in use.

The design of many large vehicles, in particular cab-over-engine trucks, does not allow easy access into the cab of the vehicle. Often, the cab is positioned at a substantial height above the ground, making it difficult for a driver or passenger to enter and exit the cab. Therefore, steps or some type of foot support structure are often provided for use by an individual when climbing up into the cab as well as when exiting from the cab.

Although various approaches have been used to facilitate the entry and exit of an individual from a vehicle, a need nevertheless exists for a control method and apparatus for a retractable stairway assembly wherein the method and apparatus are novel and non-obvious improvements ways.

SUMMARY

A method of controlling retractable stairway assembly for a vehicle is disclosed. The vehicle may be of a type having a cab, the cab having an exterior and an interior. The cab also may have a cab sidewall within which a doorway and door is positioned. Access through the doorway is provided for ingress and egress into and out of the cab interior when the door is open. The retractable stairway is shiftable from a stowed position to a deployed position, when deployed the stairway is positioned for climbing along the stairway to and from the doorway.

The stairway may be shiftable between the deployed and stowed positions by pivoting the stairway between such positions, laterally extending the stairway from a stowed to a deployed position, or otherwise.

In connection with one aspect of one embodiment of the method, at least one vehicle status condition is evaluated from a set of vehicle status conditions, the set of vehicle status conditions including at least one of the following: (a) whether the vehicle is stopped, (b) whether the parking brake is set, and (c) whether the cab is tilted, for example from horizontal in excess of a threshold. If said at least one vehicle status condition is not in a predetermined state, deployment of the stairway is blocked.

The set of vehicle status conditions may comprise all three of these vehicle status conditions, two of the three conditions, or only one of these conditions as well as additional or alternative conditions. The predetermined states may be the truck is stopped, the parking brake is set, and the cab is not being tilted excessively.

In accordance with another embodiment, deployment of a stairway may be blocked if a manually actuated disable control, such as a switch, is in a step deployment or movement deactivating state. One of such manually actuated disable controls may be located within the interior of the vehicle. Another of such manually actuated disable controls may be located at the exterior of the cab. In one embodiment, the exterior disable control may be shifted automatically out of the step movement deactivating state after a predetermined period of time.

Although a semiautomatic control approach may be used, in accordance with a specific embodiment, deployment of the stairway from a stowed position toward a deployed condition commences upon opening of the cab door if said at least one vehicle status condition being evaluated is in the predetermined state.

An actuator, such as an electric motor, may be used to shift the stairway between stowed and deployed positions. In the event current delivered to the motor exceeds a threshold, deployment of the stairway may be blocked or interrupted. In accordance with the method, a variable current threshold may be established which is correlated with the position of the stairway. The current threshold may vary so that it is different for one position of step deployment in comparison to another position of step deployment. In addition, the threshold may vary over time such that it differs for one position of deployment at one time in comparison to the threshold for the same position of deployment at a different time. In addition, the current threshold may vary for a given position of step deployment depending upon whether the stairway is being stowed or deployed when at the position of deployment. In a specific approach, the travel of the stairway may be subdivided into a plurality of travel segments between the stowed and deployed position. A current threshold may be established for each of the travel segments and may comprise the sum of a stored average of current over time for the segment together with a current tolerance for the segment. The measured current for the segment nay be compared with the sum of the stored current average and the tolerance. If the measured current average exceeds the sum, an excess current condition is indicated. In this case, operation of the stairway may be halted. The sum of the stored current and average tolerance may be set to be less than or equal to a software imposed maximum tolerant limit. Under certain conditions, the software tolerance limit may be exceeded to accelerate closing of the stairway or provide more closing force. In addition, the method may include evaluating at least one interrupt deployment of stairway condition from a set of interrupt deployment stairway conditions. The set of interrupt deployment of stairway conditions may include at least one of the following: (a) whether a manually actuated exterior disable control at the exterior of the cab is in a step movement deactivating state, and (b) whether the speed of deployment of the stairway is below a threshold speed. The deployment of the stairway may be interrupted if said at least one interrupt stairway deployment status condition is not in a predetermined state.

Interior and exterior alarm devices may be activated in accordance with the control method under certain conditions. For example, an exterior auditory alarm may be activated at any time the stairway is being moved. Interior alarms or alerts, which may include an auditory alarm as well as a visual alarm such as a lamp, may also be activated under certain conditions. For example, the interior alerts may be activated in the event deployment of the stairway is interrupted due to excessive motor current being required by an electric motor used to extend and retract the stairway. Alternatively, interior alerts may be activated in the event said at least one vehicle status condition is not in a predetermined state.

In accordance with another aspect of an embodiment, the deployment of the stairway may be interrupted by closing the door.

In another embodiment, the stairway may be stowed from a partially or fully stowed deployed and toward a stowed position in the event at least one of the following vehicle status conditions occur: (a) the vehicle starts moving, and (b) the parking brake is not set. In accordance with this latter aspect of the method, both of these status conditions need not be monitored, as either of these conditions may be monitored in the alternative.

The present invention is directed toward novel and non-obvious aspects of a retractable stairway control method as set forth above and in the following description and drawings individually, as well as collectively.

BRIEF DESCRIPTION OF THE DRAWINGS

FIG. 8 is an exploded, partially broken away view of one portion of a stairway assembly illustrating one approach for connection of the pivot to the vehicle in this form of stairway assembly.

FIG. 9 is a partially broken away end view of one form of snubber usable in the embodiment of FIG. 1.

FIG. 19 illustrates an embodiment of first and second wheel well components which may be included in the stairway of FIG. 18.

FIG. 20 is an exploded view of an upright panel of a form usable in the stairway of FIG. 1 together with outer trim pieces which may be combined with the panel in a specific form of an outer side wall assembly.

FIG. 22 schematically illustrates first and second retractable stairways positioned at the respective driver and passenger sides of the vehicle and showing the location of various sensors and other components which may be used by the specific controller of FIG. 21.

FIGS. 25 through 45 schematically illustrate flow charts for the various states shown in the step control state diagram embodiment of FIG. 24.

FIG. 46 illustrates one suitable control approach for an electric motor actuator based on current delivered to the electric motor and usable in the embodiment of the stairway of FIG. 1.

DETAILED DESCRIPTION

Figure 1:
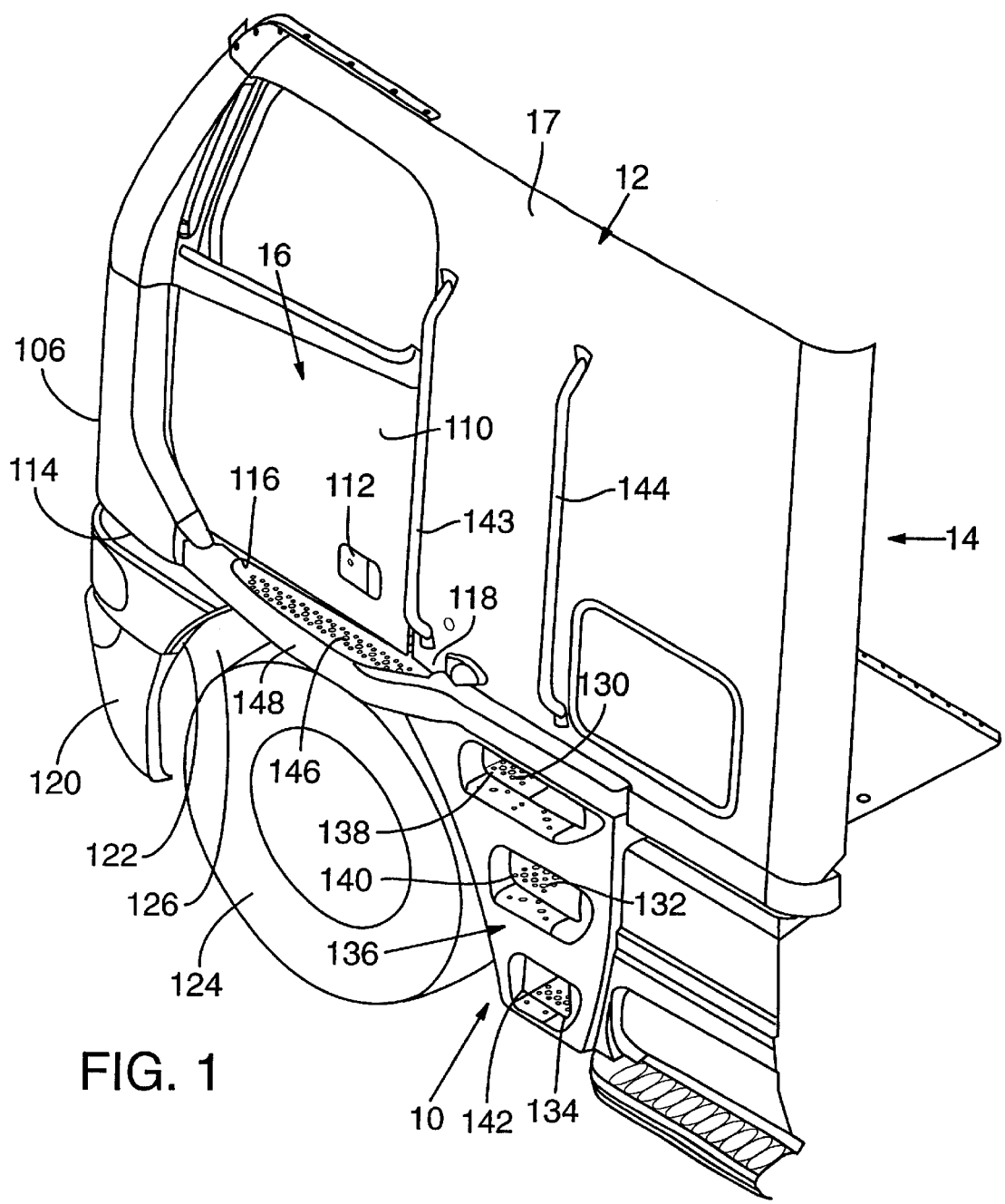
FIG. 1 is a perspective view of a portion of a truck including one embodiment of a retractable stairway assembly, the illustrated stairway assembly being shown in a fully stowed position and with the door to the cab of the truck shown closed.
Figure 2:
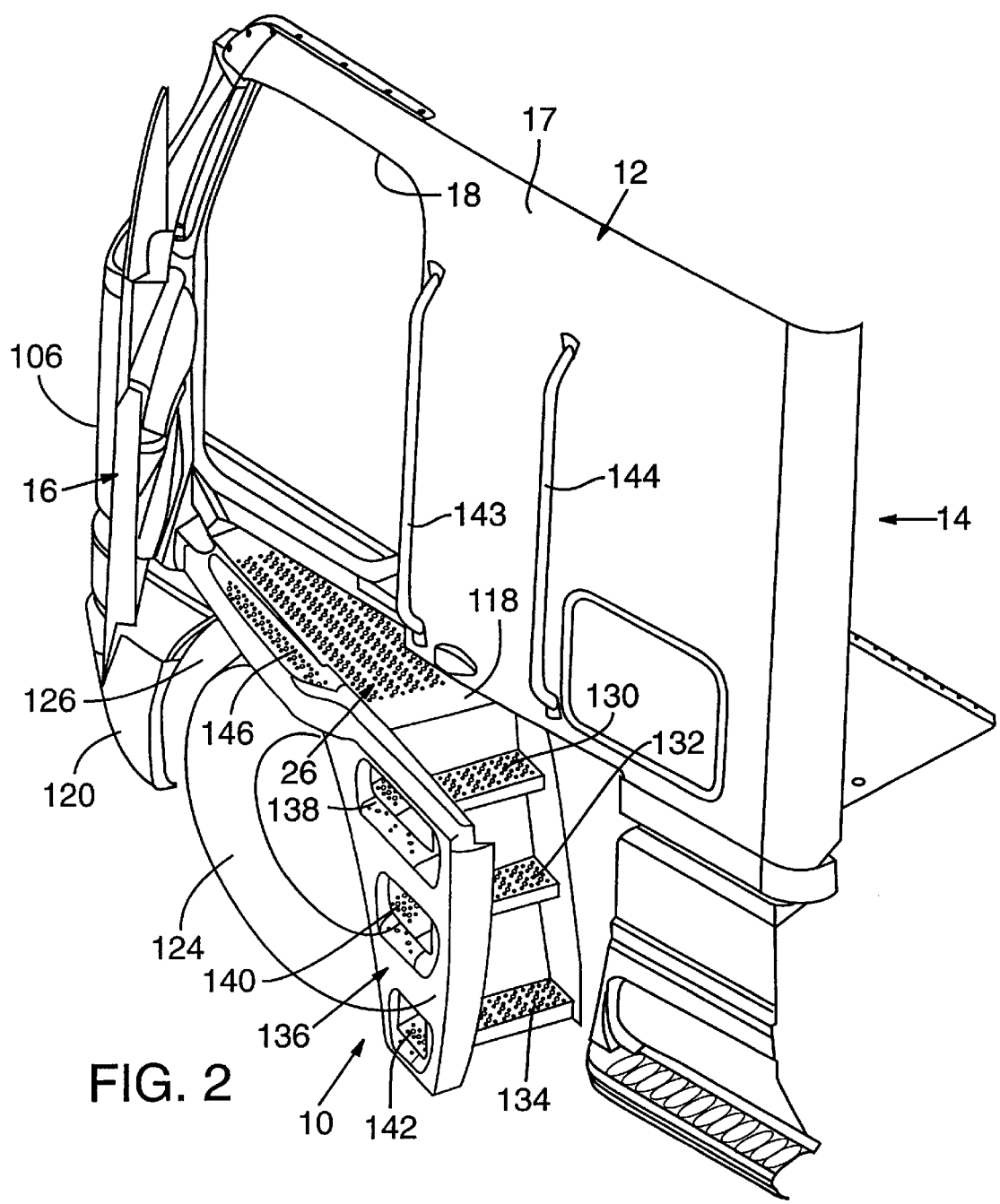
FIG. 2 is a perspective view, like that of FIG. 1, showing the retractable stairway assembly in a partially deployed position and with the door open.
Figure 3:
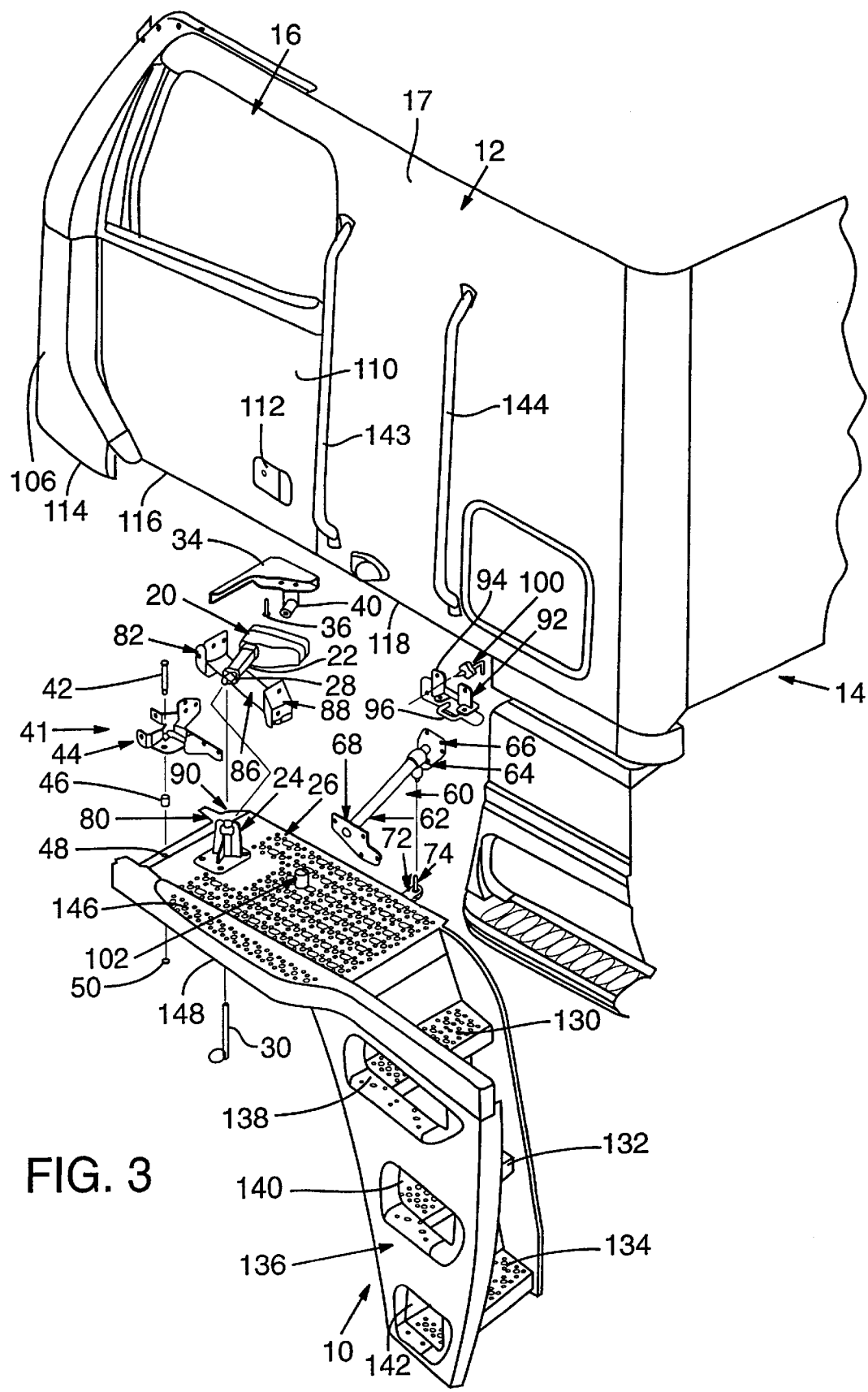
FIG. 3 is an exploded, perspective view of the FIG. 1 embodiment of the retractable stairway assembly, together with a truck cab.

One embodiment of the retractable stairway assembly is shown in FIGS. 1–3. As indicated in these figures, the stairway assembly 10 may be attached to a cab 12 of a truck 14, but may also be attached to the frame of the truck. Although the stairway assembly 10 may be usable with other vehicles, in these figures it is shown attached to the cab of a conventional cab over engine truck. When attached to the cab, the stairway assembly may be lifted with the cab when the engine is being serviced.

When not in use, the stairway assembly 10 is typically stored substantially beneath the cab 12 in a stowed position, such as shown in FIG. 1. The stairway assembly 10 in the FIGS. 1–3 embodiment is pivotally movable about an upright axis into deployed positions in which the stairway assembly 10 is exposed, such as shown in FIG. 2. When the stairway assembly is exposed, a truck driver, passenger, or other individual may travel along the stairway upwardly and downwardly from the truck cab. The cab 12 includes a doorway 18 (FIG. 2) in a side wall 17 of the cab. A door 16 pivots between a closed position, shown in FIG. 1, in which access through the doorway is blocked, to open positions, such as shown in FIG. 2. When the door is open and the stairway 10 is sufficiently deployed, ingress and egress through the doorway along the stairway 10 is permitted.

In the illustrated embodiment, the stairway assembly 10 includes an actuator such as an electric motor 20 (FIG. 3) with an extendable and retractable actuator arm 22. The actuator 20 is operable in this embodiment to shift the stairway assembly 10 from the stowed position to an open position. In one simple approach, the actuator may automatically operate to pivot the stairway 10 to a deployed position whenever the door 16 is opened. The actuator 20 in this approach may also be operable to automatically shift the stairway assembly 10 from deployed to stowed positions when the door 16 is closed. Stowing of the stairway from a deployed position and deploying of the stairway from a stowed position may be controlled depending upon the status of various truck parameters, such as explained below. Thus, in a specifically illustrated embodiment, the automatic stairway operation occurs unless other certain conditions exist. Alternatively, the stairway assembly 10 may be manually operated, for example by a user simply moving the assembly manually to a deployed or stowed position. As another semi-manual approach, a mechanical linkage (not shown) may be connected between the stairway assembly 10 and the door 16 to transmit the motion of opening or closing the door to the stairway assembly 10. Semi-automatic operation of the stairway is yet another control approach which may be adopted. Also, pneumatic or other forms of actuators other than an electric motor actuator may also be used. In the description which follows, although not required, the automatic operation of the stairway is described.

In the embodiment illustrated in FIG. 3, an actuator coupler 24 is shown projecting upwardly above a platform 26 of the stairway 10. The distal end portion 28 of the actuator arm 22 is pivoted to the actuator coupler 24 by a pin 30. In addition, an actuator supporting bracket 34 is mounted to the vehicle (such as to framework on the underside of the cab) and pivotally supports the actuator 20. A pivot pin 36 pivotally interconnects the actuator 20 to the bracket 34. The underside of the actuator 20 may be supported by a cushioned support 40 projecting outwardly from a lower portion of the bracket 34.

A pivot assembly 41, which may include a pivot such as a pin 42, is provided. The pin 42 is coupled by a bracket, one form being indicated at 44, to the vehicle 14, such as to the cab of the vehicle. The pin passes through a vibration reducing cushion 46 and through an opening 48 through a forward and outboard location of the platform 26. The pin 42 is secured in place by a fastener, such as a nut 50. With this construction, pivot 42 pivotally couples the stairway 10 to the vehicle for pivoting about an upright axis between stowed and deployed positions. More specifically, when the extendable and retractable portion of actuator arm 22 extends and retracts, the stairway 10 is pivotally moved between deployed and stowed positions.

A stairway support 60 is positioned at a location spaced from the pivot for use in supporting the stairway in addition to the support provided by the pivot 42. In the illustrated embodiment, the support 60 is located rearwardly of the pivot 42. In this case, forward or forwardly refers to the direction toward the front of the cab. In contrast, rear or rearwardly refers to the direction toward the rear of the cab. The illustrated support 60 includes an elongated guide member 62 which slidably receives a coupler 64. The guide member 62 is mounted to the vehicle (in this example, to the cab 12 of the vehicle) by respective end brackets 66, 68. In this specific construction, the coupler 64 is coupled to the stairway 10 such that, as the actuator operates to deploy or stow the stairway, the coupler 64 slides along the guide member 62. The guide member 62 may take various forms and may be straight, as shown, or be straight along a section or portion thereof along which the coupler slides. The illustrated guide member 62 has a longitudinal axis, with the coupler sliding along a straight section of the guide member. The coupler 64 is coupled to the stairway such that, as the coupler slides along the guide member 62 during stowing or deployment of the stairway, the stairway 10 is supported at least in part by the coupler from the guide member 62. In the illustrated embodiment, the coupler is pivotally coupled to the stairway 10 and more specifically to a platform reinforcement with a portion of one form of reinforcement being indicated at 72 in FIG. 3 and described more fully below. In addition, the illustrated coupler 64 is permitted to pivot about the longitudinal axis of the section of guide member 62 along which the coupler slides. As the coupler slides along the guide member, the coupler may both pivot relative to the stairway and about the longitudinal axis of the guide member. Consequently, a simplified support is provided. For example, the coupler 64 may include a linear bearing therein to provide smooth travel of the coupler along the guide member 62 with the motion of the coupler permitting the use of a linear bearing. A link element, which may be in a form indicated at 74 and described more fully below, may be used to interconnect the coupler with the stairway 10. Link element 74 may be of an adjustable length to permit raising and lowering of the stairway relative to the vehicle at the location of the link.

A snubber, with one form being indicated at 80, may be included on the stairway 10. A snubber receiver, with one form being indicated at 82, may be mounted to the vehicle, such as to the underside of the cab 12, in a position for engagement by the snubber 80 when the stairway is shifted to a stowed position. The snubber is spaced at an inboard location, in this depicted example, from the pivot axis through pivot 42. Snubber 80 minimizes vibrations of the stairway that otherwise might occur when the stairway is stowed and the truck is traveling, for example along a roadway. A slide element 86, in this case of an elongated construction, is supported at its end portions. For example, one end portion of the slide element 86 may be supported by a bracket 88 and the opposite end portion may be supported by a bracket 89. Snubber receiver 82 may be slidably carried by the bracket 89 such that, by loosening fasteners, the elevation of the snubber receiver may be adjusted to, for example, adjust the force exerted by the snubber against the snubber receiver during snubbing. The brackets 88, 89 may be mounted to the vehicle, such as to the underside of the cab of the vehicle. The under surface of slide element 86 is positioned to bear against the upper surface of a slide 90 to minimize vibration of the stairway and to assist in wedging the snubber 80 into the snubber receiver 82 as the stairway is stowed. The cooperation of these specific forms of snubber 80, snubber receiver 82, slide member 90 and slide element 86 will become more apparent from the description below.

A latch, one form indicated generally at 92 in FIG. 3, may be included to engage a latch catch to provide support for the stairway 10 when fully stowed. Again, this minimizes vibration of the stairway. In the form shown in FIG. 3, the latch catch (not shown in this figure) is mounted to the stairway 10, while the latch is mounted by a bracket 94 to the vehicle, such as to the underside of the vehicle cab. The illustrated latch comprises a U-bolt 96 with the base of the bolt being spaced from the bracket 94 for engaging the catch. The location of the latch and latch catch may be reversed. That is, one of the latch and latch catch may be mounted to the vehicle, while the other of the latch and latch catch may be mounted to the stairway.

A lock, such as a manually activated lock 100, described more fully below, may be included. When lock 100 is actuated, it couples the stairway 10 to the vehicle, in this case to the cab of the vehicle, when the stairway is in a stowed position. The lock 100 prevents deployment of the stairway.

A stop, such as indicated at 102 in FIG. 3, may project upwardly from the upper surface of the platform 26. Stop 102 is positioned to engage the vehicle to limit the deployment of the stairway when the stairway reaches a fully deployed position. For example, stop 102 may be positioned to engage the inboard side of the door sill surrounding the door opening 18 of the cab 12.

It should be noted that the components described above may be varied in arrangement and detail. In addition, not all of these components are required to be included in a retractable stairway assembly of the present invention.

As best seen in FIG. 1, the cab 12 of the truck 14 has a forward body portion 106 spaced longitudinally and forwardly along the truck from the side wall 12. The door 16 spans the opening 18 between the forward body portion 106 and a rear panel of the side wall 17. The door 16 has an exterior side surface 110 with a door handle 112 recessed into its lower, right-hand corner, as shown in FIG. 1. The exterior side 110 of the door 16 in the illustrated truck is substantially aligned with the exterior surface of the cab side wall 17 and with the portion of the exterior side surface of the cab forwardly of the door 16, when the door is in the closed position. For purposes of this description, the term "substantially aligned" is meant to encompass situations in which a surface is configured to aesthetically match the contours of the vehicle. Thus, perfect or flush alignment is not required, nor are planar surfaces. A situation where a self-contained stairway is simply mounted to a vehicle surface, as opposed to being built in so as to recess at least partially into the surface, would be excluded from this definition of "substantially aligned".

As best seen in FIG. 3, the forward body portion 106 of the illustrated truck 14 has a lower extension 114 that projects downwardly past the bottom edge 116 of the door 16 and also downwardly past the bottom edge 118 of the cab side wall 17. As shown in FIG. 1, the illustrated truck 14 also includes a bumper 120 positioned beneath the bottom edge 114. In general, the bumper 120 is positioned forwardly of the door 16. The rearward edge 122 of the bumper 40 is concavely, arcuately-shaped and generally mimics the shape of a forward wheel 124 adjacent thereto. The rearward edge 122 of the bumper 40, together with the illustrated stairway assembly 10, defines a forward wheel well 126, as will be discussed in greater detail below.

With reference to FIG. 2, the stairway assembly includes a plurality of steps in addition to the top platform 26. In this case, three steps are provided, namely, a top step 130, a middle step 132, and a bottom step 134. The steps 130–134 extend in an inboard direction from an outboard side panel assembly 136. Each of the steps 130–134 has an upper tread surface at an elevation which may be substantially aligned with an associated and respective foot receiving or step opening through the side wall assembly 136. Thus, step 130 is aligned with opening 138, step 132 is aligned with opening 140, and step 134 is aligned with the associated opening 142. As can be seen in FIGS. 1–3, although they may be the same size, the opening 138 at the top of the step is the widest. Opening 138 in this embodiment is wide enough to comfortably receive two feet of a user at this location. This can make it easier to climb out of the cab onto the auxiliary steps. The other step openings may be smaller than opening 138. In the illustrated form, the steps have a progressively increasing width moving from bottom to top of the stairway. The step openings 138–142 comprise auxiliary steps which may be used, such as shown in FIG. 1, when the stairway 10 is in a stowed position. Hand holds 143, 144 mounted to side wall 17 adjacent door opening 18 may be provided for use by an individual who is climbing the auxiliary steps 138–142 when the stairway 10 is stowed or the steps 130–134 when the stairway is deployed. Protruding from the outboard side of the illustrated platform 26 is an outboard auxiliary step 146. The illustrated outboard step 146 extends along the outer edge of the platform 26 and has a slightly curved outboard edge 148. The outboard step 146 tapers from a rear central portion of the step 146 toward the forwardmost portion of step 146 so as to minimize drag caused by the protruding step. The illustrated step 146 protrudes outwardly beyond the exterior side surface 110 of the door 16, as shown in FIG. 1, to provide an additional auxiliary stepping surface when the stairway 10 is in the stowed position.

As can be seen in FIG. 1, when the stairway 10 is in the fully stowed position, the outer face of side wall assembly 136 is substantially aligned with the side wall 17 of the cab 1 2, except for the projecting step 146.

Figure 4:
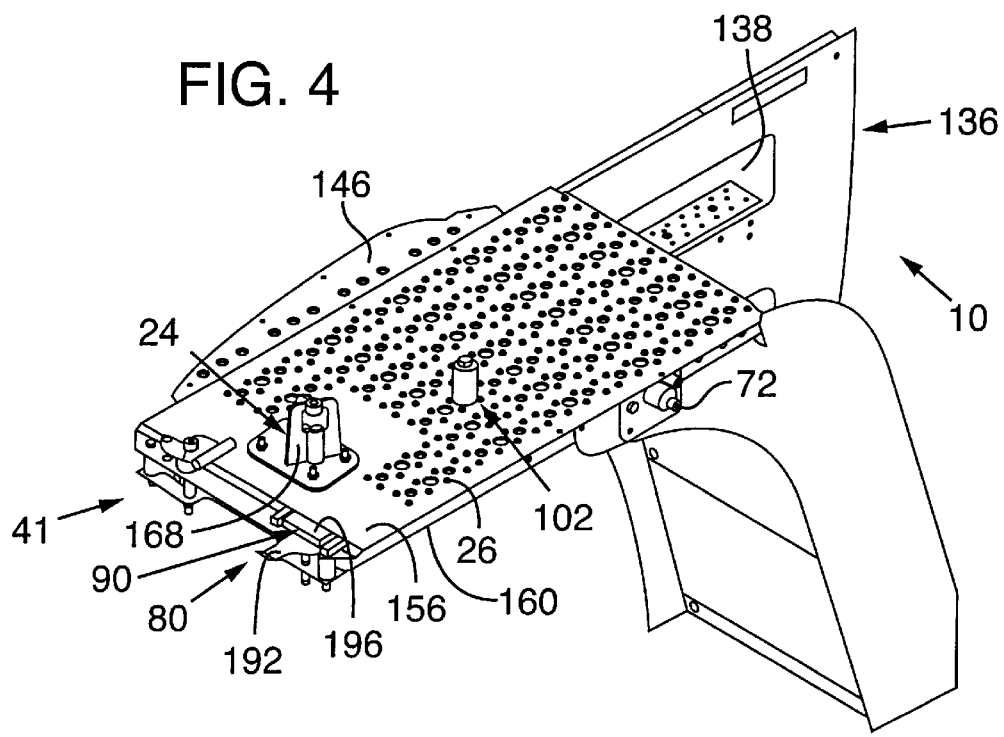
FIG. 4 is a perspective view of one form of a stairway assembly like the stairway assembly of FIG. 1, but shown for the passenger side of the vehicle in contrast to the stairway assembly of FIG. 1 shown at the driver's side of the vehicle.

The retractable stairway shown in FIGS. 1–3 is shown at the left-hand driver's side of the vehicle cab. A retractable stairway may also be included in the same manner at the right-hand passenger side of the cab. FIG. 4 illustrates a form of stairway assembly 10 for the passenger side of the vehicle. For convenience, like components in FIG. 4 to those shown in FIGS. 1–3 have been given the same numbers.

Figure 5:
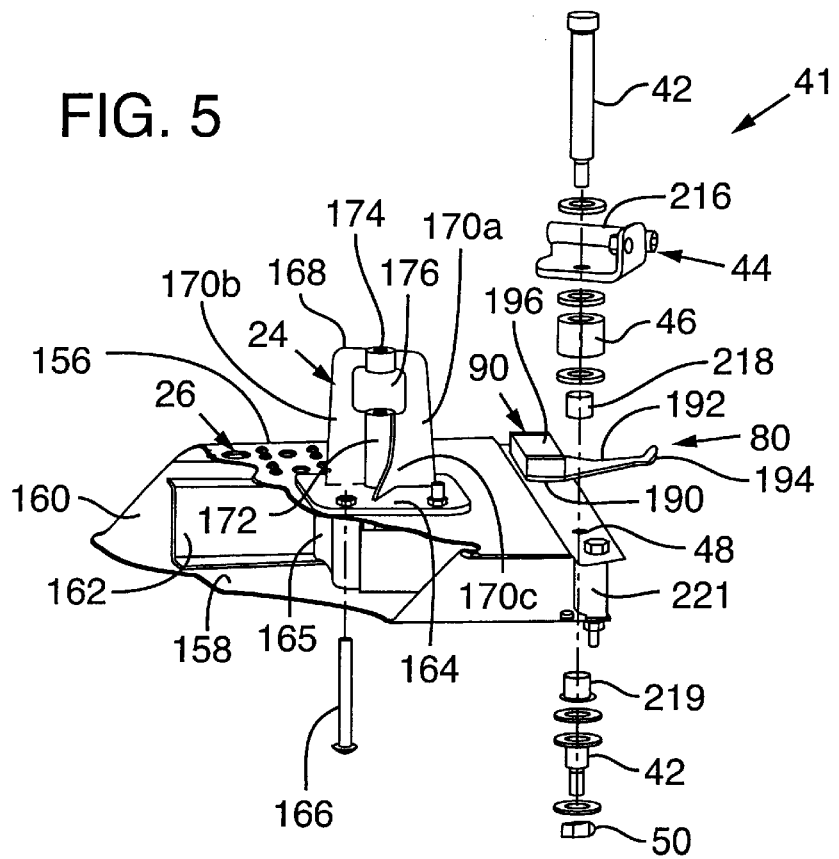
FIG. 5 is an enlarged, partially broken away view of a portion of the stairway of FIG. 4 showing an actuator coupler, a snubber, and an exploded view of one form of pivot for the stairway assembly of FIG. 4.
Figure 6:
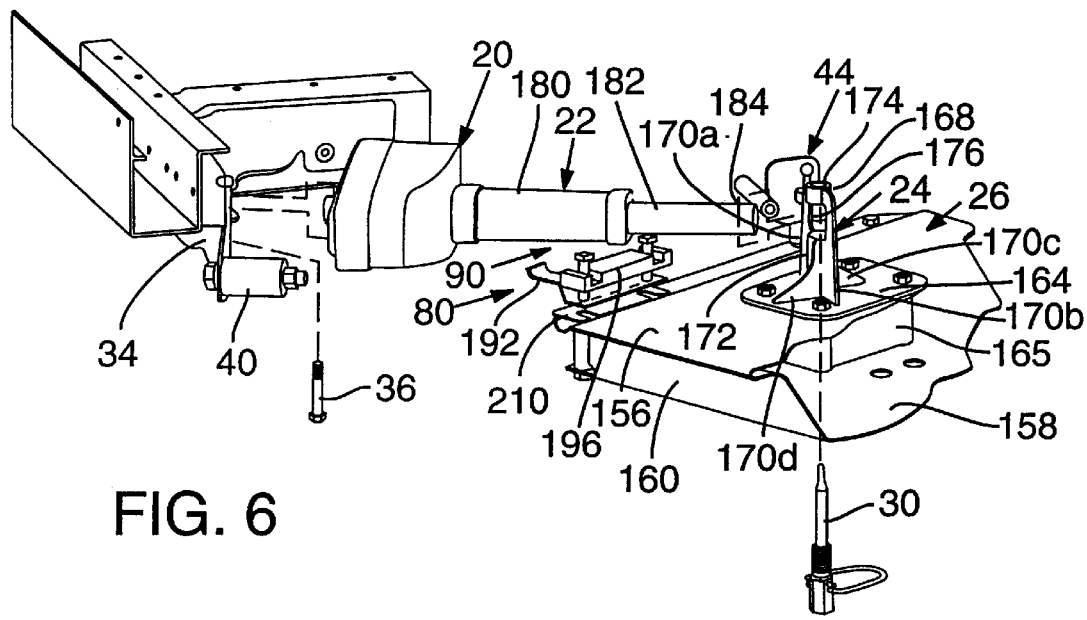
FIG. 6 is an exploded, partially broken away view of one form of actuator for pivoting the stairway between deployed and stowed positions, together with a portion of the supporting framework of a vehicle.

With reference to FIGS. 4, 5 and 6, the illustrated platform 26 includes an upper platform section 156 and a lower platform section 158. A side portion 160 of the platform 26 extends about the perimeter thereof. Also, a plurality of longitudinally extending reinforcements, a portion of one being indicated at 162 in FIG. 5, extend along the length of the platform in a direction generally parallel to the longitudinal axis of the truck when the stairway 10 is in a stowed position. A plurality of openings (not numbered in these figures) are provided through the upper and lower platform sections 156, 158 to permit water drainage.

In addition, although the illustrated actuator 20 is an electric motor, it should be noted that other forms of actuators may be used such as hydraulic cylinders and air cylinders, or other suitable movement generating devices. However, an electric motor provides advantages in connection with controlling the operation of the stairway.

The actuator coupler 24 may take many forms. In the illustrated embodiment, the actuator coupler projects upwardly above the top section 156, and, more specifically, extends upwardly from the upper surface of section 156. As best seen in FIGS. 5 and 6, the illustrated form of actuator coupler includes a base flange 164 positioned to overlie a stiffening element 165 with the base flange being fastened, such as by a plurality of bolts (one being indicated at 166 in FIG. 5), to the upper surface of top platform section 156. In this example, base flange 164 overlies the stiffener 165 with the fasteners extending through the flange 164, top section 156, stiffener 165, and bottom section 158. The illustrated actuator coupler 24 is spaced inwardly from the respective front and side edges of the platform 26 and, in this case, is located near the longitudinal center line of the platform.

The illustrated actuator coupler 24 also includes a tower section 168 projecting upwardly from the flange portion 164. The illustrated tower portion 168 includes four wing flanges, three of which are indicated by the numbers 170a, 170b and 170c in FIG. 5. Flanges 170a and 170b are generally in a common plane and are orthogonal to flanges 170c and another flange 170d (see FIG. 6) extending in an opposite direction and from the opposite side of the flanges 170a and 170b from the flange 170c. Tower 168 includes a bore defining section 172 which defines a pin receiving bore 170 through the tower 168 through which a quick release pin 30 (see FIG. 6) is inserted to pivotally couple the actuator 20 to the tower. An opening 176 (FIGS. 5 and 6) is provided through the tower into which the actuator arm is inserted when pivoted in place. More specifically, as best seen in FIG. 6, the actuator arm 22 includes a sleeve portion 180 surrounding a movable arm 182. The arm 182 is telescopingly extended and retracted from the sleeve 180 to pivot the stairway between stowed and deployed positions. The distal end portion of arm 182 includes a pin receiving passageway 184. When the distal end of the arm 182 is inserted into opening 176, the passageway 184 is aligned with the bore 174 so as to receive pin 30 to thereby pivot the actuator arm to the tower 168 and thus to the platform. In this illustrated construction, at least a portion of the actuator arm 22 is at an elevation which is above the elevation of the platform and at least a portion of the actuator arm 22 overlies the platform.

With continued reference to FIGS. 4, 5 and 6, although the snubber 80 may take a number of forms, in the illustrated embodiment the snubber 80 comprises a plate-like snubber having a base portion 190 and a projecting snubber flange portion 192. The snubber base 190 is positioned to overlie the top surface of platform section 156, with the snubber flange 192 in this example projecting forwardly of the forward edge of the platform. The distal end 194 of flange 192 may be turned upwardly to facilitate its entry into the form of snubber receiver described more fully below. The slide member 90 may also take a number of forms, but in the illustrated embodiment comprises a slide pad 196 of a friction reducing material, such as ultra high molecular weight polyethylene. The slide pad 196 overlies the base 190 of the snubber 192. Referring to FIGS. 6 and 9, the upper surface of the illustrated slide pad 196 is provided with first and second grooves 200, 202 of rectangular cross section. Fasteners 204, 206 (FIG. 9) are recessed into the grooves and pass downwardly through the pad 196, snubber 192, the upper section 156 of platform 26, the lower section 158 of the platform. The fasteners 204, 206 also pass through openings provided in a reinforcement 208 positioned between the upper and lower platform sections 156, 158 at the location of the snubber. The illustrated fasteners 204, 206 comprise square-headed bolts which are recessed in the respective grooves 200, 202 below the upper surface of pad 196. The assembly is secured in place when nuts are tightened onto the lower projecting ends of the bolts 204, 206. The grooves 200, 202 prevent the bolts from rotating as the nuts are tightened. One or more shims, such as indicated at 210 in FIG. 6, may be inserted between the snubber 192 and the platform section 156. Consequently, the spacing between the platform section 156 and upper surface of pad 196 (and also between the platform section 156 and the snubber 192) may be increased, with the inclusion of one or more additional shims, or decreased, by removing one or more such shims. By varying this spacing, the alignment of the snubber flange 192 with the snubber receiver (as explained more fully below) may be adjusted, such as to accommodate changes in the elevation of the rear of the stairway (as is also explained below). Other approaches may also be used if desired to vary the alignment of the snubber and snubber receiver.

With reference to FIG. 9, one convenient mechanism is shown for accomplishing this spacing adjustment. More specifically, the nuts on bolts 204, 206 may be loosened to permit upward motion of pad 196. In addition, a nut 211 which holds a jack screw 212 in place may be loosened. When nut 211 is loosened sufficiently, the jack screw or bolt 212 may be rotated to cause the upper end of the bolt to move upwardly through an opening in the top section 156 to lift the snubber 80 and the pad 196 relative to the platform. This action increases the spacing between the upper surface of platform section 156 and the under surface of the snubber base. Under these conditions, shims may be inserted or removed from the space between the platform and snubber base. This particular approach facilitates the snubber alignment while the stairway 10 is mounted to the vehicle.

Figure 17:
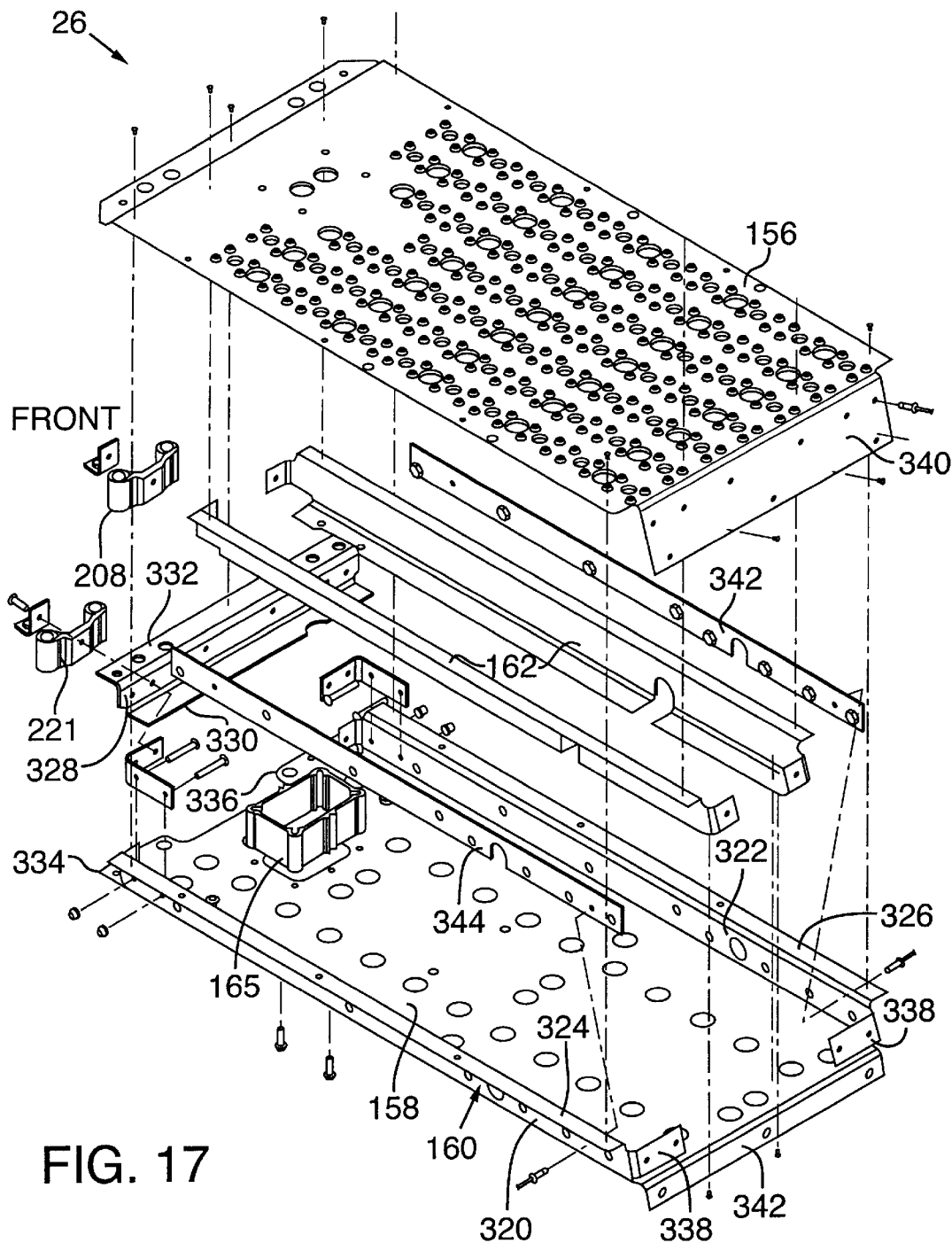
FIG. 17 illustrates one embodiment of a platform portion of a stairway usable in the embodiment of FIG. 1.

Again referring to FIG. 5, the illustrated pivot mounting bracket 44 includes a first section 216, which may be included in the pivot assembly 41 at the time pivot 42 is mounted to the stairway and before the stairway is positioned on the vehicle. Bracket 216 may then be fastened to one or more other sections of the pivot mounting bracket 44 previously installed on the vehicle to thereby couple the pivot to the vehicle. The vibration absorbing cushion 46 may be of rubber or similar vibration absorbing material. When the nut 50 is tightened, the cushion 46 is compressed to reduce vibration in the pivot. First and second bushing sections 218, 219 line the passageway 48 to facilitate pivoting movement of the stairway about the pivot 42 during stowing or deploying of the stairway. A reinforcement 221, which may be similar to the reinforcement 208 of FIG. 9, is provided to reinforce the platform at the location of the pivot. FIG. 17 illustrates exemplary reinforcements 208, 221 in greater detail.

Figure 7:
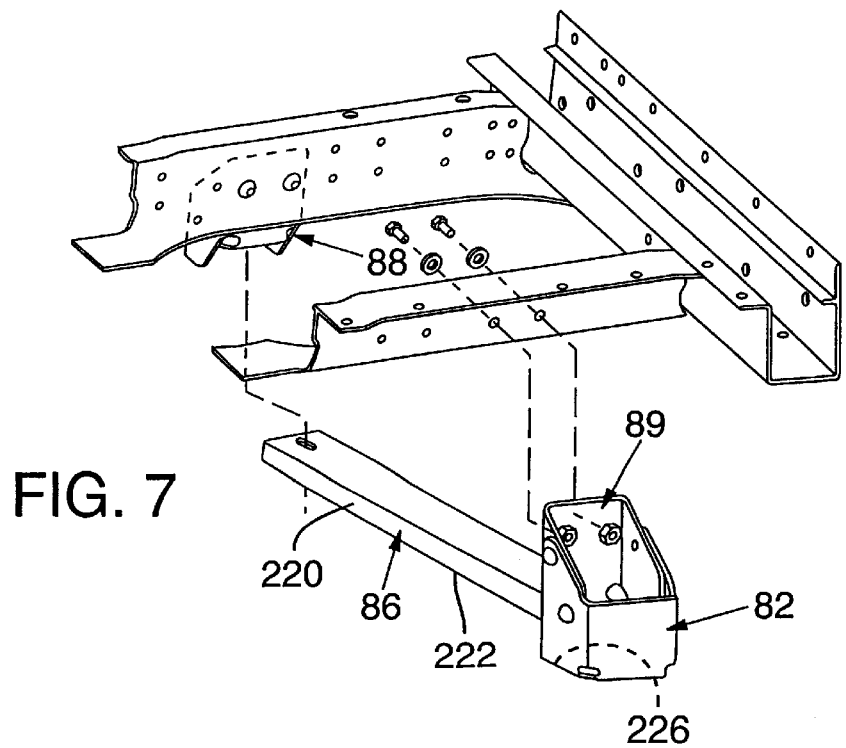
FIG. 7 is an exploded, partially broken away view of an embodiment of a snubber receiver and elongated slide member.

In FIGS. 7 and 8, illustrated forms of the snubber receiver 82, slide element 86, and slide element mounting bracket 88 are shown. These components are shown mounted to the vehicle, such as to framework elements of the vehicle cab (not numbered). The illustrated form of slide element 86 comprises a rectangular bar 220 having an under surface 222 which acts as a slide surface in that surface 222 is positioned to abut the upper surface of slide pad 196 when the stairway assembly 10 is installed. The slide bar 220 is mounted at one end to the bracket 88 and at its opposite end to another bracket 89 which carries one form of a snubber receiver 82. This particular form of snubber receiver has an upwardly inclined snubber receiving surface 226 (see FIG. 8) upon which a friction reducing material (such as a pad 228 of ultra high molecular weight polyethylene) may be secured. As the stairway approaches a fully stowed position from a partially stowed position, the snubber flange 192 bears against the snubber receiving surface 226, and more specifically against the pad 228, if included. As the stairway continues to close to the fully stowed position, the snubber flange 192 (see FIG. 6) rides upwardly and wedges against the snubber receiving surface 226. The engagement of pad 196 against the under surface 222 of slide bar 220 provides a reaction force to this snubbing action. By varying the elevation of the snubber receiving surface 226, such as previously explained, the snubbing force is adjusted. Alternative mechanisms for snubbing the stairway may also be used. In addition, the snubber and snubber receiver, although advantageous, may be eliminated. The illustrated snubber positively supports the forward edge of the stairway assembly, together with the support provided by the pivot, and minimizes vibration of the stairway 10 when stowed as a vehicle travels along the highway.

As also can be seen in FIG. 8, the illustrated form of pivot supporting bracket 44, in addition to including section 216, also includes a pivot mounting bracket section 230 coupled to the vehicle, such as to the cab frame. Fasteners, such as indicated at 232, join pivot bracket section 230 to pivot bracket section 216 during installation of the stairway assembly.

Figure 10:
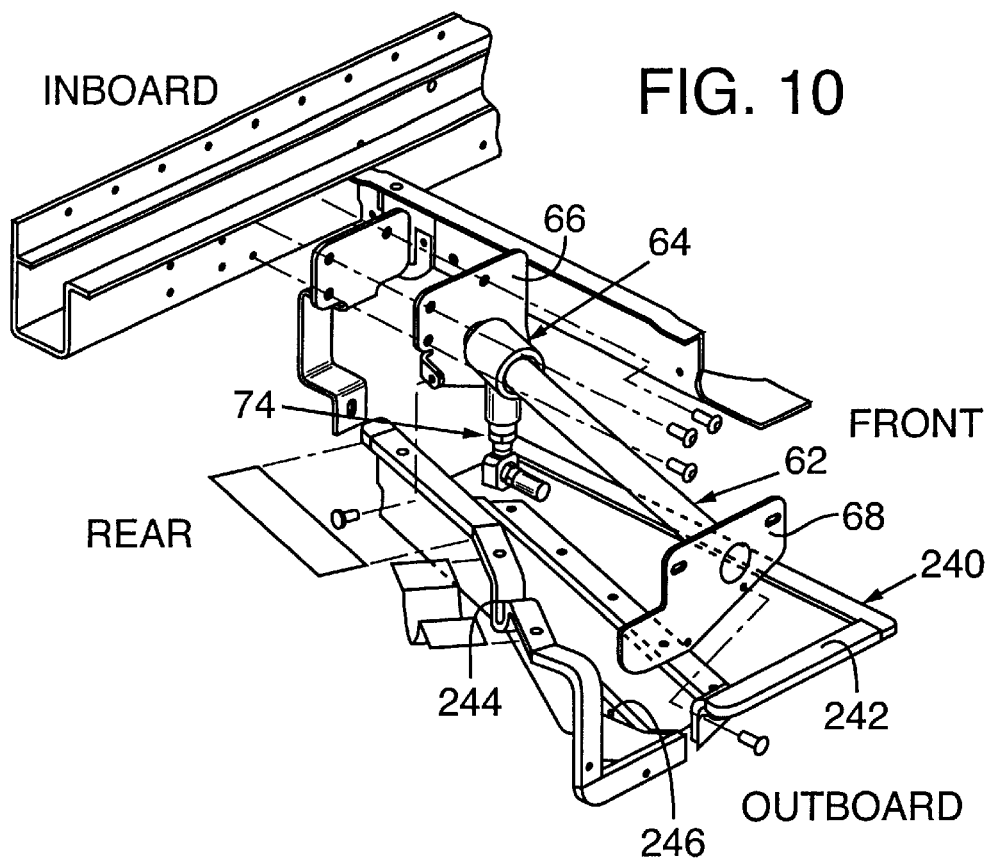
FIG. 10 is an exploded perspective view of one form of a stairway support mechanism together with an environmentally shielding cover, the mechanism shown in FIG. 10 being mounted to the passenger side of the vehicle and being viewed looking toward the inboard of the vehicle.
Figure 11:
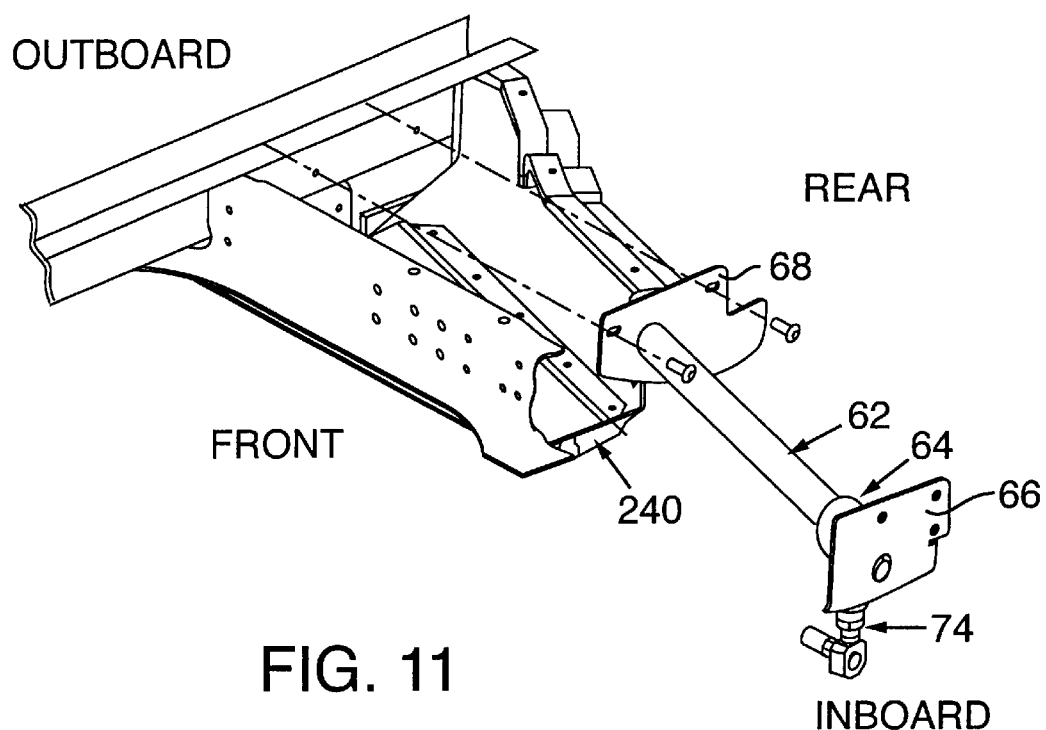
FIG. 11 is a partially exploded perspective view similar to that of FIG. 10, but shown looking in an outboard direction.

With reference to FIGS. 10–14, one specific mechanism for supporting the mechanism at a location spaced from the pivot is shown. In FIG. 10, the bracket 66 mounts to the vehicle or cab framework toward the inboard side of the vehicle. In this specific example, the framework is secured to the under side of the cab. In addition, an environmental shielding cover may be provided with one form of this cover being indicated at 240. The cover shields the coupler 64 and elongated guide element 62 from mud, dust and other debris. The illustrated cover is positioned below the guide element 62. The cab, itself, in this example, overlies the guide element 62 and environmentally shields the guide element from above. The cover 240 has an upper edge 242 which may be covered with a sealing material, such as a foam strip, to provide a reliable dust seal. In the event cables pass through the chamber defined by the dust cover, a cable passageway 244 may be provided. The passageway 244 may also be lined with the sealing material to enclose and seal the passageway through which the cables pass. The illustrated cover 240 includes an elongated slot indicated at 246 (FIG. 10). This slot extends generally in an inboard to outboard direction. As the coupler 64 travels along the guide element 62 during stowing and deployment of the stairway, the illustrated coupler is, in general, traveling in alignment with the slot. The link element 74 extends through the slot to a location below the cover where it engages the stairway. Thus, in this illustrated example, the link element 74 travels along the slot as the stairway is stowed and deployed, with the stairway being suspended by the coupler and link element at a location below the cover 240. FIG. 11 illustrates the connection of bracket 68 to vehicle framework, in this case to the framework at the under side of the cab, at a location which is outboard from the bracket 66. Thus, in FIG. 11, the coupler 64 is shown in an inboard-most position.

Figure 12:
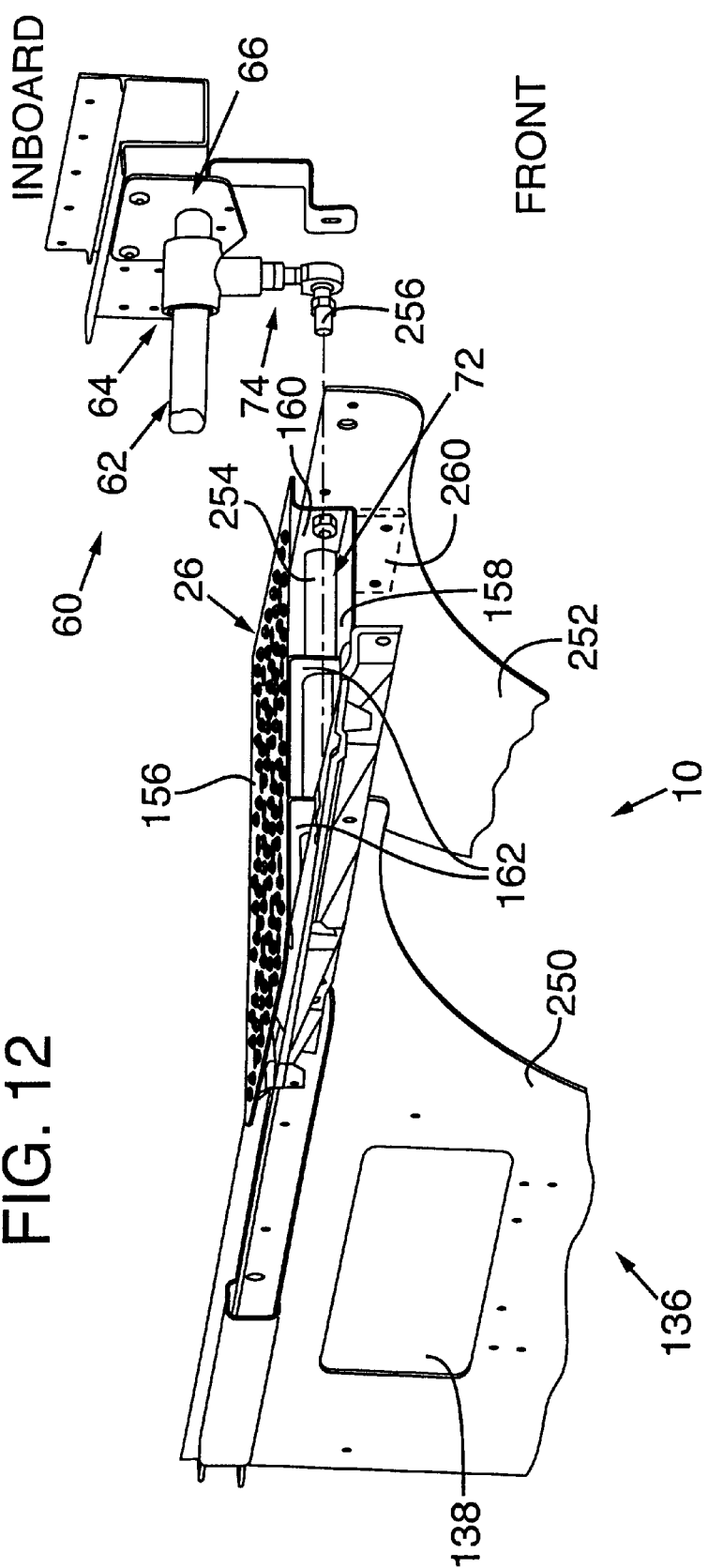
FIG. 12 is an exploded, partially broken away, perspective view of a portion of one form of stairway and platform reinforcement usable in the embodiment of FIG. 1.

In FIG. 12, the platform 26 is shown extending between a first upright wall 250 included in the outer side wall assembly 136, and a second upright wall 252. The walls 250, 252 are spaced apart from one another. In this illustrated case, the walls 250, 252 are generally parallel to one another, with wall 250 being at an outboard location relative to wall 252. In the form shown, the platform reinforcement 72 comprises an elongated reinforcing rod 254 which extends transversely between the side walls 250, 252 and which is secured to the upper edge portions of the side walls. The longitudinally extending reinforcing elements 162, as well as the perimeter defining wall 160 of the illustrated platform 26, include openings through which the reinforcement rod 254 extends. The illustrated link element 74 includes a reinforcing coupler 256 which extends into the inboard end of the rod 254 in the illustrated construction. Coupler 256 may be threadably connected to rod 254 to join the stairway 10 to the link element and thus couple the stairway to the coupler 64 and guide member 62. The reinforcing rod 254 may be inserted into a connector receiver 262 of a bracket 260 (see FIG. 18) mounted to wall 252 and then be fastened to the auxiliary projecting step 146. The connector 256 need not be connected directly to the reinforcement 254, although this does assist in reinforcing the construction. In addition, the illustrated reinforcement rod 254 is of a one-piece unitary construction extending entirely across the platform. Thus, joints which may otherwise weaken the rod are eliminated in this construction, although they could be included in alternative constructions. The platform may also be reinforced in other ways.

Figure 13:
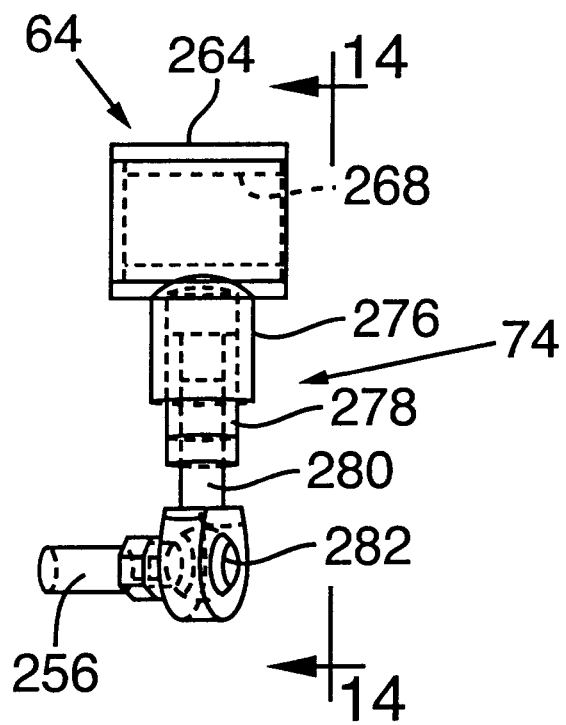
FIG. 13 illustrates one specific embodiment of a link member and coupler usable the retractable stairway assembly of FIG. 1.
Figure 14:
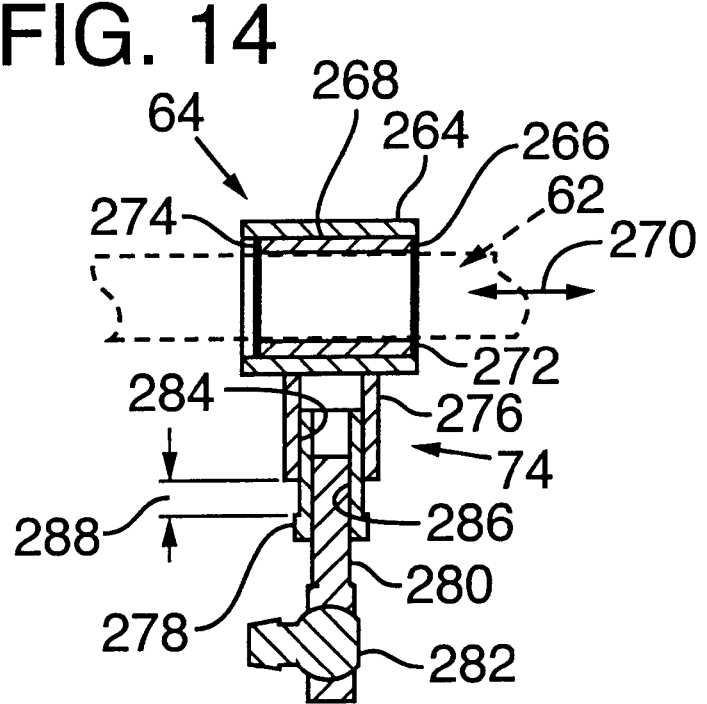
FIG. 14 is a vertical sectional view of the link member and coupler taken along line 14—14 of FIG. 13.

One specific form of coupler 64 and link element 74 is illustrated in FIGS. 13 and 14. Alternative constructions may also be used. In the example shown in these figures, the coupler 64 includes a housing 264 having an internal passageway 266 through which the guide element 62 passes. In the illustrated construction, passageway 266 is of a circular cross section, although alternative shapes may be employed. A linear bearing 268 is held within the coupler housing 264 and engages the guide element 62. Bearing 268 permits the coupler to both slide axially along the guide element 62, as indicated by arrows 270, and also permits the coupler to rotate about the longitudinal axis of the guide element. An additional pivot may, for example, be included in the link element or in the coupler to accommodate this pivoting motion. One end of the bearing 268 engages an annular lip 272 which narrows the passageway 266 at one end of the coupler housing. A retainer 274 is inserted into the opposite end of the coupler housing to hold the bearing in place.

The illustrated coupler includes a downwardly extending hollow neck 276. The interior of neck 276 may be threaded to threadably receive a hollow tubular link extension element 278. Link extension element 278 also has interior threads for threadably receiving a pivot supporting component 280 which carries a pivot, such as a ball joint 282. The set of threads 284 interconnecting elements 276 and 278 are of a like handedness with the handedness being selected from either right handed or left handed threads. The set of threads 286 which interconnect the elements 278 and 280 are of a like handedness which is opposite to the handedness of the threads 284. Consequently, adjustment of the length of the link element 74 is accommodated. That is, in this construction, by rotating element 278 in a first direction, the distance 288 and overall length of the link element is reduced. Conversely, by rotating the element 278 in the opposite direction, the distance 288 and overall length is increased. Since the coupler housing is supported by the guide element 62, in this case at a specific elevation relative to the vehicle, adjusting the length of the illustrated link element 74 raises and lowers the stairway relative to the vehicle at the location of the link element. Thus, the illustrated link element comprises one form of a turnbuckle, although other turnbuckle type constructions may be used. In addition, other mechanisms for accommodating the desired motion and adjustment of the link element length may be used. In addition, although advantageous, the use of an adjustable link element is optional.

The ball joint 282 accommodates pivoting of the stairway relative to the coupler 64. Consequently, as the illustrated coupler slides along the guide element 62, the coupler may pivot relative to the guide element and the stairway may pivot, via the ball joint 282, relative to the coupler. As another alternative, the guide element 62 may have a curved configuration with relative pivoting motions of the coupler being eliminated. However, by utilizing a guide element having a straight section along which the coupler slides, the illustrated construction utilizing a linear bearing may be employed.

Figure 15:
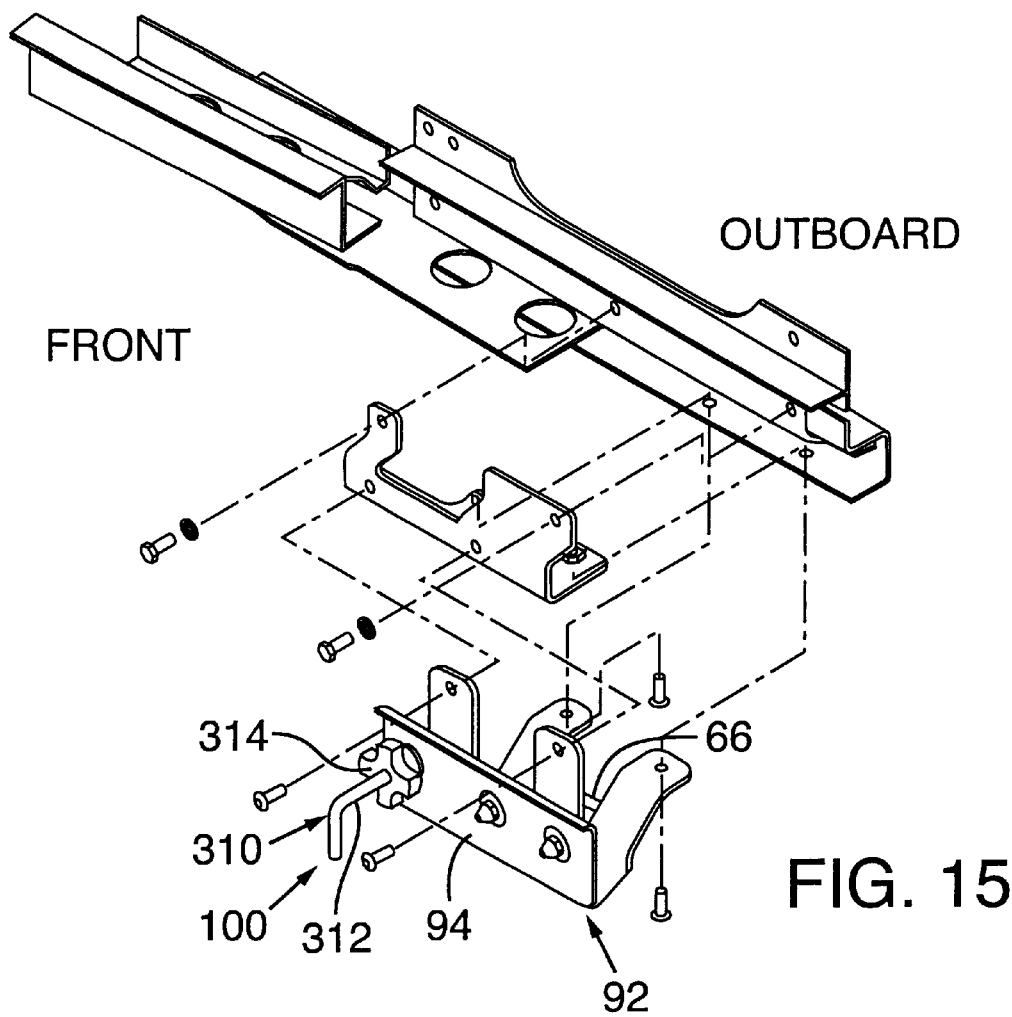
FIG. 15 illustrates one form of a latch which may be included in the stairway of FIG. 1 together with an embodiment of a mechanical lock for use in manually locking the stairway in a stowed position.
Figure 16:
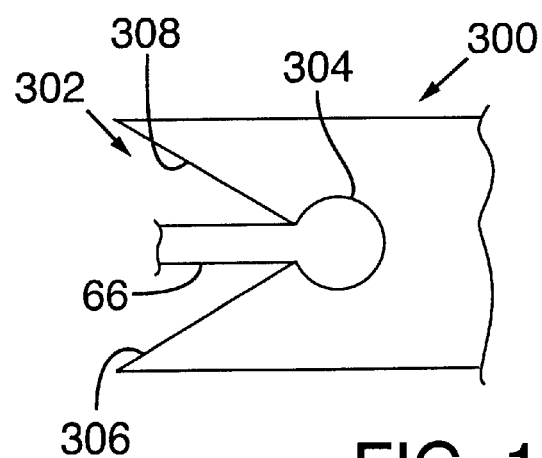
FIG. 16 illustrates one form of a catch which may be used with the latch of FIG. 15.

FIGS. 15 and 16 illustrate one form of latch 92 and latch catch 300 in greater detail. In this specific example, bracket 94 is mounted to the vehicle framework, such as to the underside of the cab, so as to position the base of the U-bolt latch 66 used in this construction in an outboard facing direction. The latch catch in this example may be formed of a block of durable resilient material, such as rubber, mounted, for example, by a base (not shown) to the inboard side of the outboard wall 250 of the stairway 10. The body of latch catch 300 (see, also, FIG. 18) defines a mouth 302 and an interior latch receiving region 304 spaced from the mouth. A slot extends inwardly from the mouth to region 304 and is bounded by first and second wall sections 306, 308. The walls 306, 308 converge or taper moving from the mouth towards region 304 to assist in guiding the latch 66 into the latch receiving region 304 when the stairway is stowed. The latch and latch catch are optional, but positively support a rear section of the stairway when they engage one another. Also, these components further reduce vibration of the stairway as the vehicle travels.

The illustrated form of manually actuated lock 100 comprises an L-bolt 310 having a shank portion 312 supported by the bracket 94. A retaining knob 314 and nut (not shown) threaded onto shank 312 and against the bracket 94 retain the shank 312 in position. When knob 314 is rotated to space the knob from bracket 94, the L-bolt 310 may be rotated to advance the shank 312 in inboard and outboard directions. A threaded shank receiving nut or other receptacle mounted to the stairway is positioned to receive the end of shaft 312 as the shaft is advanced in the outboard direction, assuming the stairway 10 is in a stowed position. After the stairway is locked in place by engagement of the shank 312 with the receptacle, knob 314 is tightened to secure the stairway in this locked condition. Consequently, deployment of the stairway is blocked due to this locking action. Should the stairway malfunction, it can be manually shifted to its stowed position and locked in place in this manner as well as selectively locked in this manner as desired at other times. Other alternative locking mechanisms may be employed, including non-manually actuated mechanisms, although the illustrated mechanism is a mechanically simple and effective approach. In addition, the locking mechanism is optional and may be eliminated, if desired.

FIG. 17 illustrates a specific example of a platform 26 which may be used in the stairway assembly of FIG. 1. In this example, the lower section 158 of platform 26 is stamped, molded, or otherwise formed to provide respective elongated side walls 320, 322, each terminating in a respective upper flange 324, 326. The flanges 324, 326 support the under surface of the top platform section 156. A front cross piece 328 extends between side walls 320 and 326. The illustrated cross piece 328 includes an inwardly extending base flange 330 and an outwardly extending platform top section supporting flange 332. The illustrated pivot and snubber reinforcements 221, 208 are positioned between top flange 332 and extension portions 334, 336 of the bottom platform section 158. Angle brackets (unnumbered in FIG. 17) may be used to interconnect the cross piece 328 to the respective walls 320, 322. The walls 320, 322 may also include respective inwardly directed flanges at their opposite ends, two of such flanges being indicated at 338 in FIG. 17. The illustrated form of top platform section 156 includes a downwardly extending flange 340 at its rear end which overlies the flanges 338 at this location. Flange 340 also overlies a downwardly extending flange 342 of the lower platform section 158. In addition to the longitudinal reinforcements 162 spaced inwardly from the side walls 320, 322, the illustrated construction includes respective elongated longitudinally extending side wall reinforcement pieces 342, 344 to which fastener receiving nuts are mounted for use during assembly of the stairway.

Figure 18:
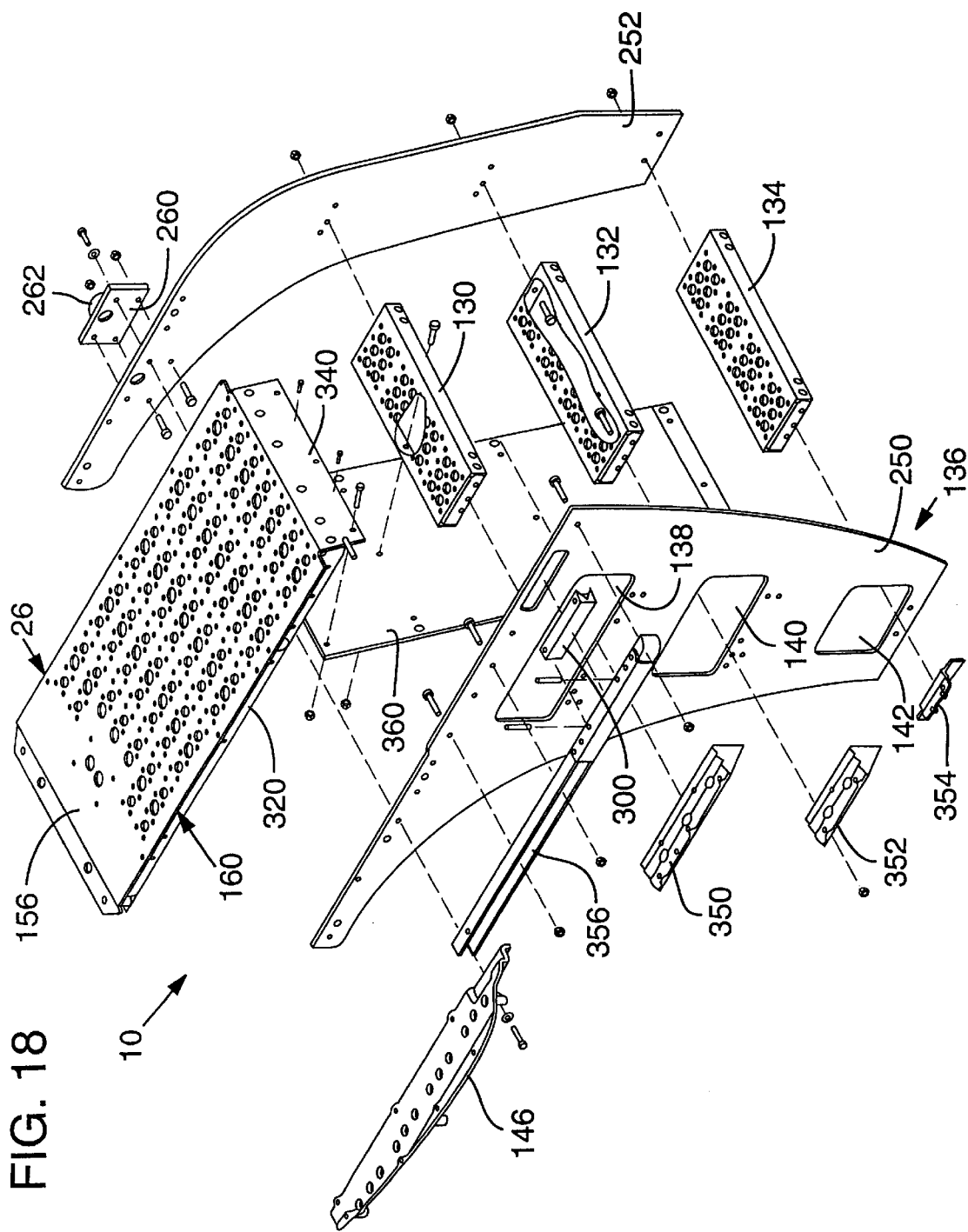
FIG. 18 is an exploded view of a form of stairway usable in the embodiment of FIG. 1.

Referring to FIGS. 18–20, additional components of one specific form of stairway assembly 10 are shown. More specifically, a plurality of step cleats 350–354 are mounted to the outboard or exterior surface of upright wall 250. The cleat 350 is positioned along the lower boundary of opening 138, with the upper surface of the cleat 350 being generally aligned with, or positioned at substantially the same elevation as, the top surface of the step 130. Similarly, cleat 352 is positioned along the lower boundary of opening 140 and generally aligned with the top surface of step 132. Also, cleat 354 is positioned along the lower boundary of opening 142 and has its upper surface generally aligned with the top surface of the step 134. The cleats 350–354 are of a width which corresponds to the width of the associated step openings. In the illustrated case, the cleats are of a progressively decreasing width and correspond to the progressively decreasing width of the illustrated openings 138–142. A trim piece mounting bracket 356 is mounted to the outboard side of wall 250 along the upper edge of this wall. The auxiliary projecting step 146 is supported at a rear end portion thereof by bracket 356 and also is secured to the platform 26 through a portion of the upper edge of wall 250 sandwiched between the step 146 and platform 26. A step closing panel 360 extends downwardly from platform 26 and is positioned in front of the steps 130, 132 and 134. Panel 360, when included, thus closes the stairway at the front of each of the steps. As can be seen in FIG. 19, a first wheel well defining element 362 is shown lining the front of the stairway closing panel 360. Element 362 may be covered at its front side with a splash and spray reducing material, such as indoor-outdoor carpet 364 (e.g. artificial grass). Wheel well defining element 362 includes a backing 363 to which the splash guard 364 is mounted. The backing 363 may be of any suitable material, such as glass reinforced polyester. A second wheel well defining element 368 is shown mounted to the underside of lower section 158 of platform 26.

As shown in FIG. 20, the illustrated stairway may include a side wall assembly 136 comprised of the wall 250 together with one or more outer trim pieces. In this case, these trim pieces include a lower trim piece 370 and an upper trim piece 372. The lower trim piece includes respective openings 374, 376 and 378 aligned generally with the respective openings 138, 140 and 142 through the panel 250. Each of the openings 374, 376 and 378 is bounded generally along the top and sides by an inboard extending flange element. The flange element associated with opening 374 is indicated at 380, the flange element associated with opening 376 is indicated at 382, and the flange element associated with opening 378 is indicated at 384. The respective flange elements 380, 382 and 384 each have a gap along the bottom of the respective openings to accommodate the respective cleats 350, 352 and 354, which extend from the outboard side of wall 250 toward the openings in the trim panel. The upper trim section 372 is designed to provide an aesthetically pleasing outboard edge to the step 146 and to the upper edge of the wall 250. Tread covering materials may be placed over the top of the cleats 350, 352 and 354, such as shown in FIG. 1.

It should be apparent that details of the stairway assembly and related components described above may be modified without departing from the principles of the invention as set forth in the claims, below. Again, the present invention relates to novel and non-obvious elements of a retractable stairway assembly, both individually and collectively, as defined by the claims.

FIGS. 21–47 illustrate one form of controller and method for controlling a stairway which is shiftable from a stowed position to a deployed position. This controller may be utilized with a stairway of the type described previously in connection with FIGS. 1–20, but is not limited to controlling this specific type of stairway wherein the stairway pivots between stowed and deployed positions. For example, the controller may be used with stairways that extend and retract laterally away from and toward the side of a vehicle without being pivoted thereto. The controller may also be used with retractable stairways otherwise shiftable from a stowed position to a deployed position wherein, when deployed, the stairway is available for use in climbing along the stairway to and from a doorway of a vehicle cab, trailer, or other vehicle compartment.

Figure 21:
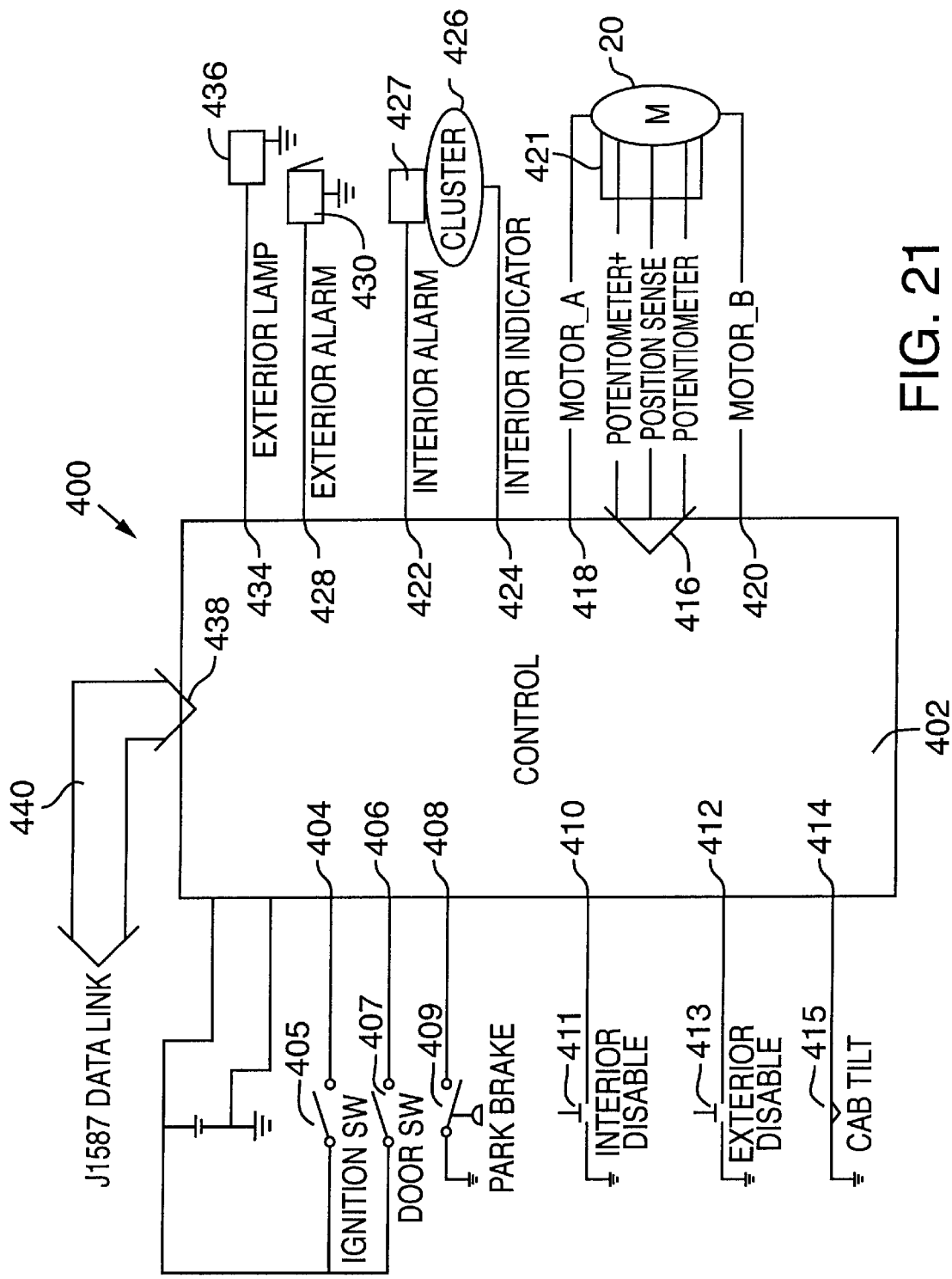
FIG. 21 illustrates one form of a controller for the retractable stairway of FIG. 1, it being understood that the stairway may be controlled in any suitable way.

With reference to FIGS. 21 and 22, one form of a stairway control is shown and indicated generally at 400. The control 400 may be microprocessor based, or alternatively may be hard-wired. A conventional power supply may be utilized for the control 400, although the power supply is not shown in this figure. The control 400 shown in FIG. 21 has a variety of inputs and outputs and may include additional or fewer inputs and outputs from those shown in FIG. 21. Thus, the FIG. 21 control is one specific example of a suitable controller. In FIG. 21, the control 400 comprises a circuit 402 with a plurality of inputs. More specifically, the illustrated circuit 402 includes a first input 404 coupled to a vehicle ignition switch 405 of the vehicle to determine whether the ignition switch is on or off; a second input 406 coupled to a door switch 407 or other door position indicator to determine whether the door is open or closed; an input 408 coupled to a parking brake indicator or switch 409 to determine whether the parking brake is set or released; an input 410 coupled to an interior disable control, such as a switch 411, to determine whether the interior disable control is in a stairway deactivate state; an input 412 coupled to an exterior disable control, such as a switch 413, for determining whether the exterior disable control is in a step deactivate state; and an input 414 coupled to a cab tilt indicator, such as a mercury switch 415, which is activated if the cab is tilted. The inputs 404–414 may be digital inputs. The control circuit 402 also includes an input indicated at 416 for receiving information from a sensor indicative of the position of the stairway, for example, during deployment and stowing and when stationary. Although any suitable position sensor may be used, in the illustrated example the stairway is shifted by an electric motor 20 having an actuator arm which is extendable and retractable to shift the stairway between deployed and stowed positions such as previously described. A potentiometer 421 is coupled to the actuator to provide signals to the control circuit 402 which represent the position of the stairway based on the resistance through the potentiometer. As a specific example, a Model E-150 electric motor from Warner Electric includes such a potentiometer with an actuator arm. In the illustrated embodiment of FIGS. 1–3, the actuator arm extends and retracts approximately four inches and shifts the stairway through approximately twenty-eight degrees from a fully stowed to a fully deployed position. Thus, the control circuit 402 accurately monitors the position of the stairway and may determine whether the stairway is being deployed, stowed or stationary. In addition, as explained below in connection with FIG. 23, the control circuit may monitor the current being supplied to the motor 20 and establish one or more current thresholds for operating the motor, such as explained below. The input 416 in this specific example is an analog input. In addition to the above inputs, the control circuit 402 may have an input/output port 438 coupled to a data link 440 on the vehicle. The data link may be a J1587 data link which is an SAE standard data link for vehicles. Information such as the vehicle speed is available to the control circuit from the data link.

The control circuit 402 illustrated in FIG. 21 has a plurality of outputs. These may include outputs for controlling the direction of travel of the stairway assembly. For example, those outputs may include outputs 418, 420 for controlling the direction of operation of motor 20, depending upon the polarity of the voltage and current controlled by circuit 402 to be delivered at outputs 418, 420.

The control 400 may also provide an alert, which may be visual, auditory, or both at the interior of the cab under certain operating conditions of the stairway. For example, output 424 of control circuit 402 may be coupled to an instrument cluster 426, for example located on the dash of a vehicle, for causing a lamp to illuminate or other visual signal to be given under selected stairway operating conditions. In addition, control circuit 402 may have an output 422 coupled to an interior alarm 427 for purposes of providing an auditory alarm within the vehicle cab under selected stairway operating conditions. Similarly, the control circuit 402 may have an output 428 coupled to an alarm which is capable of providing visual, auditory, or both types of alert signals to an individual located at the exterior of the vehicle cab during movement of the stairway. For example, control circuit 402 may have an output 428 coupled to an alarm 430 positioned to transmit an auditory alarm which is audible at the exterior of the vehicle. Also, the control circuit 402 may optionally have an output 434 coupled to a visual indicator, such as a lamp 436, visible from the exterior of the vehicle and which is illuminated under certain conditions such as upon commencement of deployment or stowing of the stairway. The exterior lamp may also provide illumination to the stairway, although a vehicle dome light would typically illuminate the stairway when the door is open.

Again, the control circuit 402 may have more or fewer inputs and outputs than those described above. For example, although desirable, the interior and exterior alarms may be eliminated. Also, the exterior lamp is also optional. Furthermore, sensing whether the door is open or closed is useful in connection with automatic operation of the stairway upon opening of the door. However, the door position may be sensed in numerous ways. In addition, the operation of the stairway may be keyed to information on the speed of vehicle travel obtained over the data link with, for example, deployment of the stairway being blocked in the event the vehicle is traveling. In many respects, sensing the parking brake condition is redundant with vehicle speed sensing and either or both may be used in determining whether conditions are desirable for operating the stairway. Similarly, the interior or exterior disable switches 411, 413 are desirable, but may be eliminated from a suitable control system. In addition, determining the tilt of the cab is a desirable option. Typically, determining whether the cab is tilted involves evaluating whether the cab is tilted downwardly at the side at which the stairway is to be deployed an amount which is greater than a threshold. Thus, tilt determination may involve an evaluation of the tilt of the cab about the longitudinal axis of the cab. Tilt of the cab about a transverse axis may also be evaluated. For example, if the cab is tilted downwardly too much, it may be difficult to stow the stairway following its deployment, in which case it may be preferred not to deploy the stairway under such conditions.

FIG. 22 illustrates a cab 12 of a truck 14 having stairway assemblies 10 at the respective driver and passenger sides of the vehicle. The control 400 illustrated in FIG. 21 may be replicated with one such control being provided for the passenger side stairway and another such control being provided for the driver side stairway. In this case, the control circuit 402 for each of the stairways may have common inputs from the ignition switch 405 and parking brake set indicator 409. Again, the position of these components in FIG. 22 is shown schematically.

Figure 23:
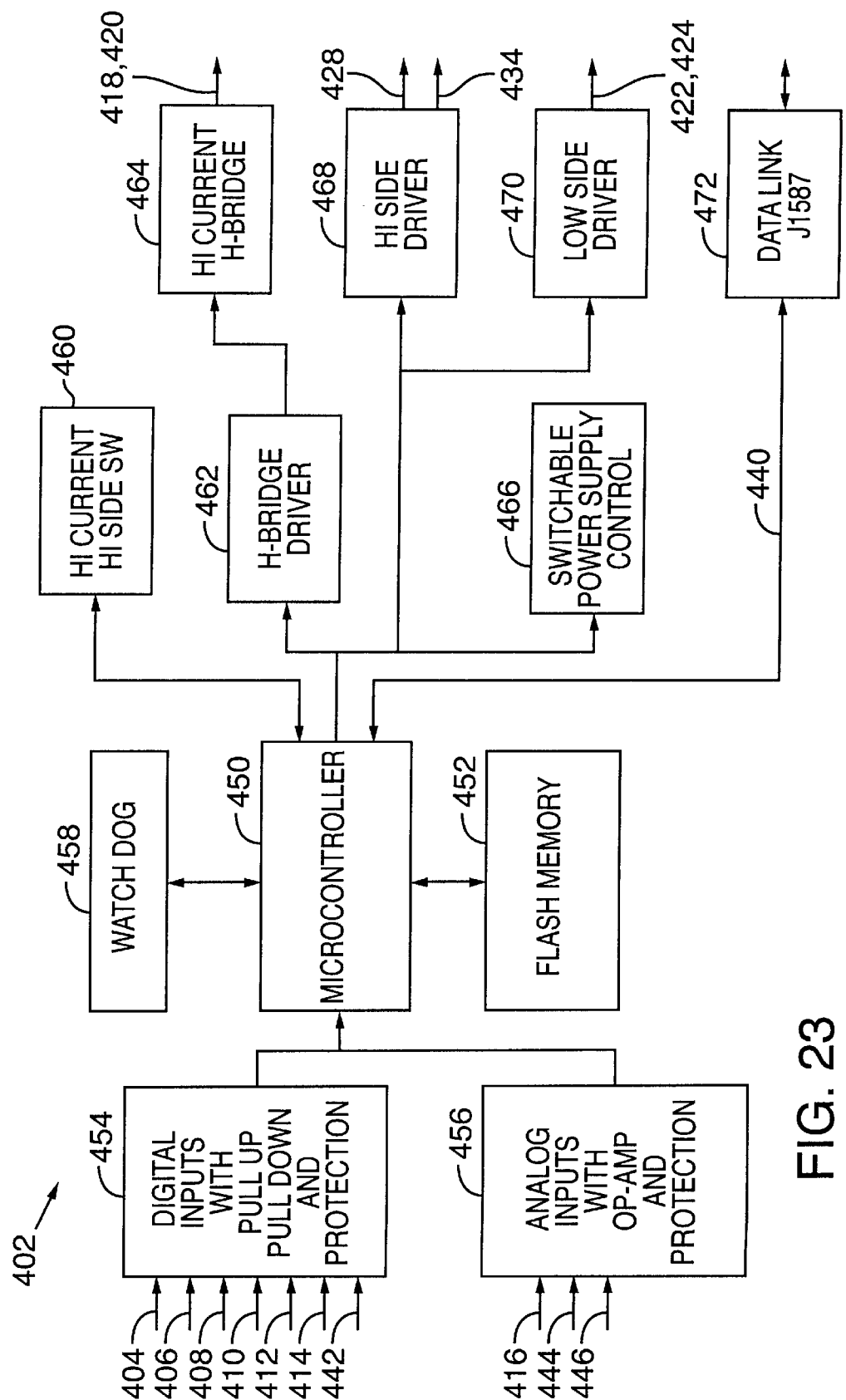
FIG. 23 is a more detailed block diagram of the specific form of controller illustrated in FIG. 21.

FIG. 23 illustrates one example of a suitable control circuit 402 in greater detail. The heart of the illustrated control circuit 402 is a microcontroller or microprocessor 450 coupled to memory, such as flash memory 452. Microcontroller 450, as one specific example, may be a Motorola 68HC11F1 microprocessor and may be programmed in accordance with the state diagram of FIG. 24 and flow charts of FIGS. 25–45. This state diagram and flow charts contain numerous options and is merely one specific example of a suitably programmed microcontroller for the control circuit 402. The microcontroller receives digital inputs from an input driver and signal conditioning circuit 454 coupled to the respective inputs 404–414. In addition, circuit 454 receives an input 442 indicating whether the particular stairway being controlled by control circuit 402 is located at the driver or passenger side of the vehicle. The ignition switch input 405 is monitored with the circuit 402 typically being in a low power mode when the ignition switch is off. Microcontroller 450 also receives signals corresponding to a plurality of analog input signals received by an analog input circuit 456. These inputs include, as explained above, the step position indicating signals at input 416. In addition, a signal representing the current and voltage being supplied to the motor are provided to circuit 456 at inputs 444 and 446. These inputs are obtained within the circuit 402 as the current and voltage being delivered to the motor is passed through the control circuit in this example. A conventional watchdog circuit 458 is also included. For example, circuit 458 may toggle the microprocessor 450 at, for example, 50 Hz, and monitor the response from the microprocessor to such toggling. This watchdog circuit resets the microprocessor in the event the response of the microprocessor to toggling indicates that resetting is required. The drive circuit for motor 20 in this specific example includes a high current high side switch 460, such as a Siemens BTS60P switch; an H-bridge driver circuit, such as a Harris Semiconductor HIP4081A circuit; and a high current H-bridge circuit 464, such as a four-channel BTS129 circuit from Siemens. The output of high current H-bridge circuit 464 supplies current at the proper polarity for operating the motor to cause the stairway to travel in the appropriate direction toward or away from a stowed position. H-bridge driver 462 controls the operation of high current H-bridge circuit 464. High current high side switch 460 supplies protected power to the high current H-bridge circuit.

The illustrated control circuit 402 also includes a switchable power supply control 466 operable to shut down the operation of the stairway assembly in the event battery voltage exceeds an upper threshold (e.g. 16 volts) or drops below a lower threshold (e.g. 9 volts). A high side driver circuit, such as a Siemens BTS611 circuit 468, supplies power to an exterior alarm and lamp, if used, at the respective outputs 428, 434. Microcontroller 450 controls the operation of the high side driver 468 and also the operation of a low side driver 470. The low side driver 470 may comprise, for example, a Harris Semiconductor four channel driver CA3262AQ circuit for providing power to a cab interior lamp and cab interior beeper or auditory alarm, for example via outputs 422, 424, if these alarms are used. Diagnostic, message and programming information may be delivered via the data link 472 (FIG. 23) to the microcontroller.

Figure 24B:
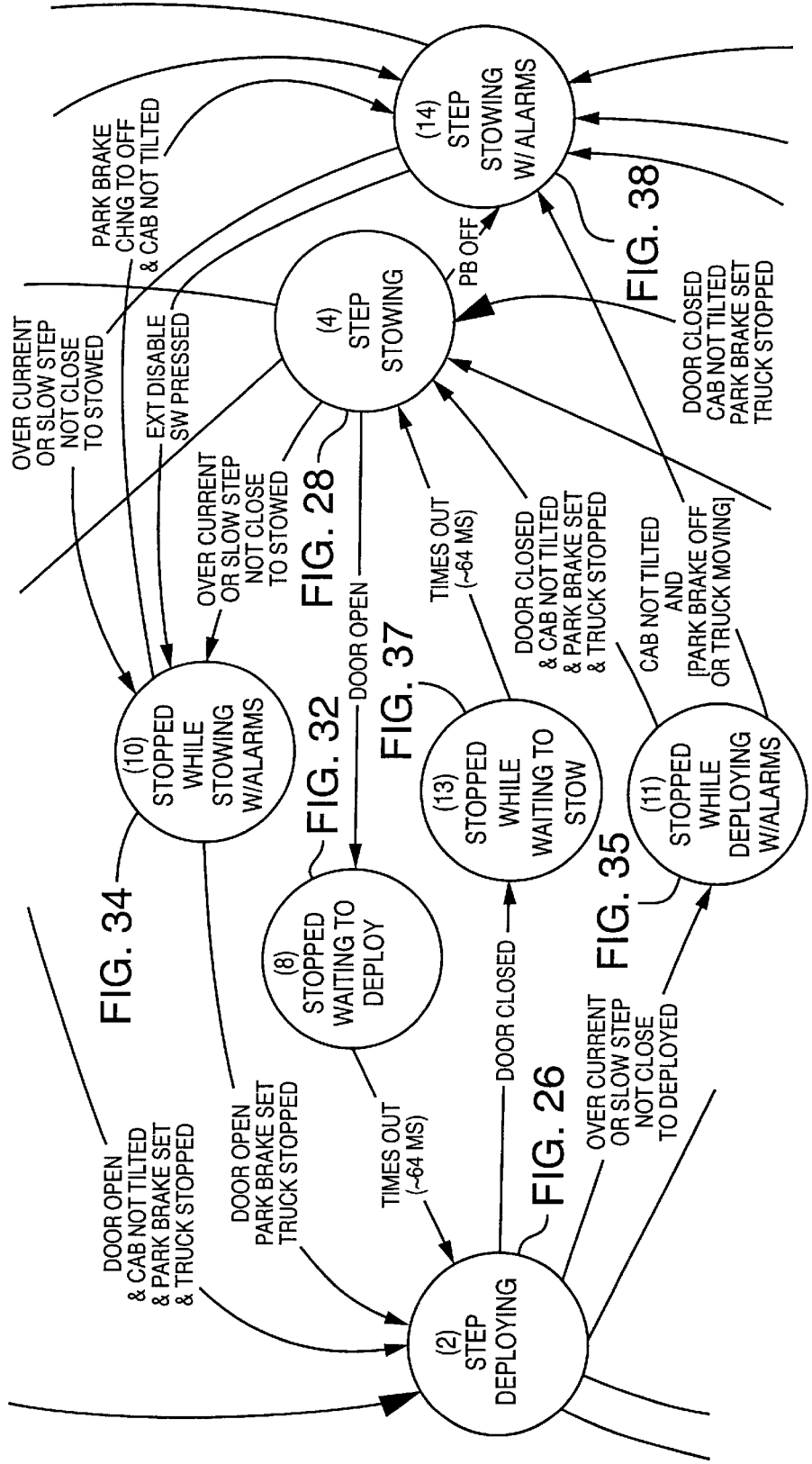
FIG. 24 is a step control state diagram illustrating one specific approach programming a microcontroller (microprocessor) usable in the FIGS. 21 and 23 controller embodiments, the diagram illustrating a number of optional control states.

An exemplary program for the microprocessor 450 included in control circuit 402 includes twenty-one states, as indicated in the step control state diagram of FIG. 24. FIGS. 25–45 provide an example of a flow chart for each of these states. FIG. 24 identifies the states and also identifies the figure in which the flow chart for each state is diagrammed. The microprocessor 450 may be programmed with all of these states, although states may be eliminated or varied from those depicted in FIG. 24.

The major states set forth in the step control state diagram of FIG. 24 are as follows:

(A) Step Stowed—the stairway is completely stowed under the cab;
(B) Step Deploying—the stairway is moving outward from the cab;
(C) Step Deployed—the stairway is completely deployed;
(D) Step Stowing—the stairway is retracting toward a stowed position, for example, under the cab;
(E) Stopped While Deploying—the stairway is stopped while in the process of deploying away from a stowed position; and
(F) Stopped While Stowing—the stairway is stopped while in the process of stowing.

Figure 25:
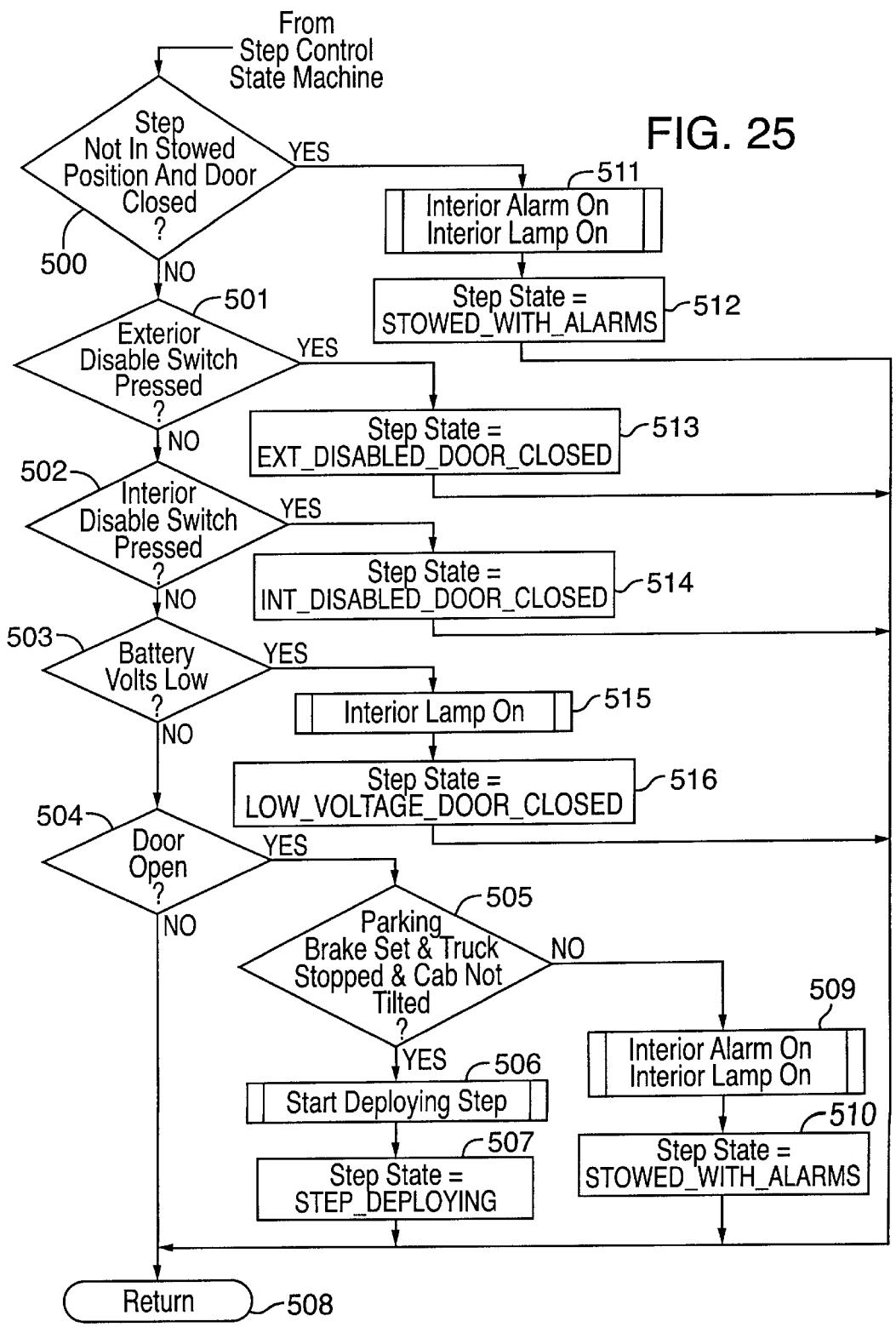

In the Step Stowed state of FIG. 25, the stairway assembly is not moving and is stowed completely under the cab in the embodiment depicted in FIGS. 1–3. The cab door may be opened without deploying the stairway 10 by using the exterior and/or interior disable switches 411, 413. Actuating (e.g. pressing) a disable switch will maintain the stairway in the step stowed state. In the illustrated embodiment, the stairway may be blocked from deployment for one cycle of opening and closing the door following actuating the interior disable switch. From inside the cab, a user may press and hold the interior disable switch 411 in a step deactivating state while opening the door. From the exterior of the cab, a user may press and release the exterior disable switch 413 and then open the door. As an option, a timer may be utilized to require opening the door within a predetermined time of actuating the exterior disable switch, such as ten seconds, for the exterior disable switch to block the operation of the stairway.

In the specifically illustrated embodiment, to advance to the Step Deploying state, a number of conditions must be met. In one specific example, the parking brake must be set, the truck must be stopped, the cab must be not tilted beyond a predetermined threshold such as about ten percent from horizontal, the exterior and interior disable switches must not be in the step deactivating state, and the battery voltage must be at an acceptable level.

In this example, if these conditions are met, upon opening the door, the stairway commences deployment from its stowed position. In the event the interior alarm and/or the interior lamp are on or the step assembly does not deploy when the door is opened, the above conditions should be checked. In such a case, the door is typically opened and closed to reset the interior disable switch in case that it was inadvertently shifted to the step deactivating state.

In general, a suitable control evaluates at least one vehicle status condition from a set of vehicle status conditions, the set of vehicle status conditions including at least one of the following: (1) whether the truck is stopped; (2) whether the parking brake is set; and (3) whether the cab is tilted from in excess of a threshold. The stairway is then blocked from deployment from a stowed position if said at least one vehicle status condition is not in a predetermined state. The set of vehicle status conditions may include one, two, or three of these conditions, as well as other conditions. Alternatively, two or all three of these vehicle status conditions may be evaluated with, for example, the deployment of the stairway from the stowed position being blocked if the predetermined states are (1) the truck is not stopped; (2) the parking brake is not set; and (3) the cab is tilted from in excess of the threshold.

As previously mentioned, cab tilt sensing is an option and may or may not be included. Also, the vehicle status conditions of whether a truck is stopped and whether a parking brake is set may be evaluated to determine whether both occur or only one occurs, with or without the cab tilt evaluation. Again, as an additional option included in the specifically illustrated embodiment, stairway deployment may be blocked from a stowed position in the event a manually actuated disable control, such as the interior and/or exterior disable switches, are in a step deployment or movement deactivating state. Again, after a period of time, the exterior disable control may be shifted from the step deployment deactivating state to a state where it no longer causes movement of the stairway to be blocked.

As another option, deployment of the stairway again may be blocked if, for example, the battery voltage is below a threshold or is too high.

In accordance with a specific embodiment of the control circuit, the stairway may also be automatically deployed from a stowed position toward a deployed position if said at least one vehicle status condition is in the predetermined state and the door is opened. Semi-automatic operation may also be provided requiring, for example, a user to take certain steps in addition to opening a door in order for the stairway to deploy.

In addition, the control circuit 402 may monitor the current delivered to an electric motor if an electric motor is being used as an actuator to shift the stairway between stowed and deployed positions. The deployment of the stairway may be blocked in the event the electric current exceeds a threshold. For example, if the stairway encounters a post or other obstacle as deployment commences, the current being delivered to the motor typically would exceed the threshold. In this case, the control circuit would block the movement of the stairway.

Figure 26:
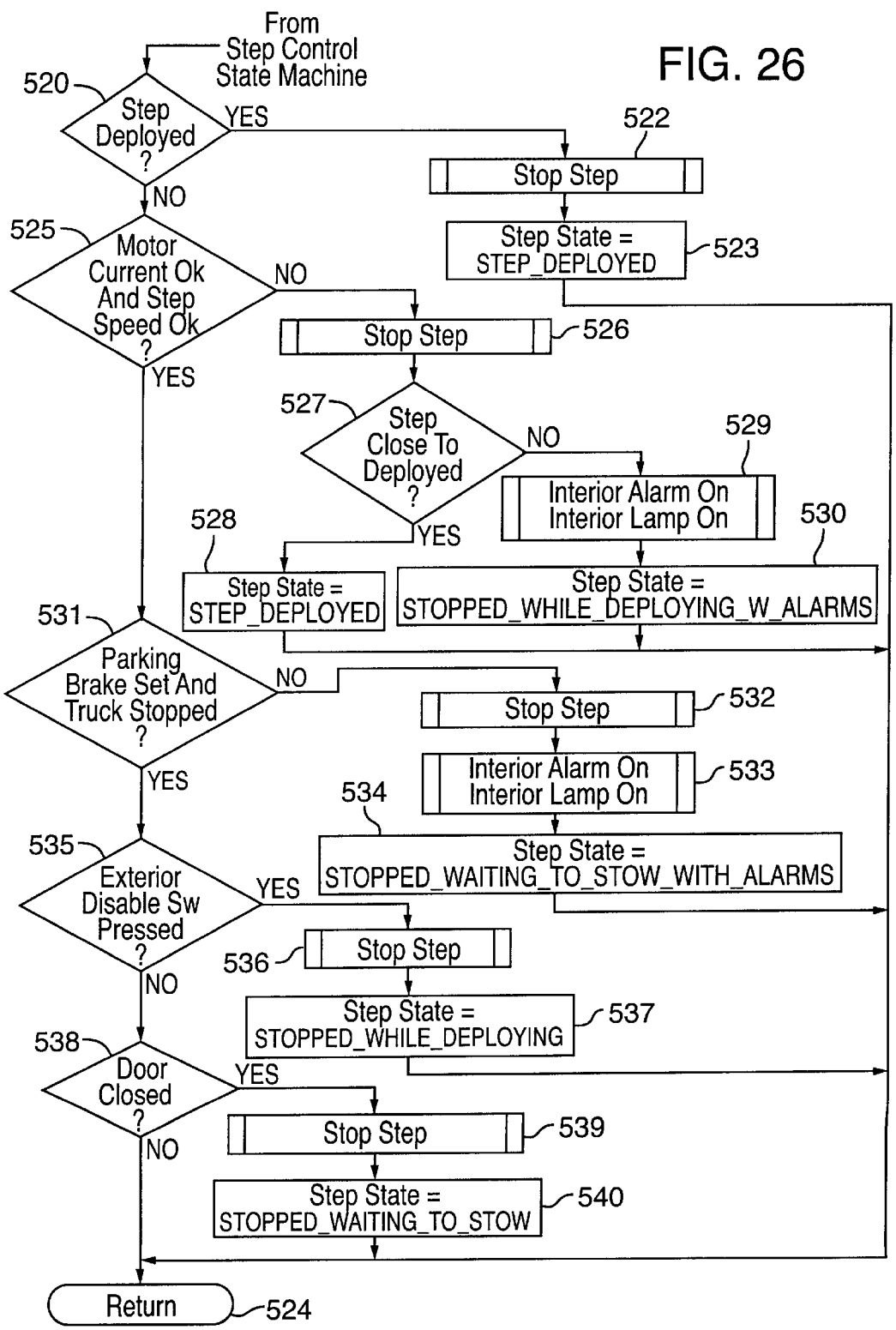

With specific reference to FIG. 25, in the Step Stowed state a first decision block 500 is reached from the step control state machine, at which a determination is made as to whether the stairway is in the stowed position and the door is closed. During normal operation, the answer is no, and a decision block 501 is reached. At block 501, the question is asked whether the exterior disable switch 413 is actuated to a step movement state. Under normal conditions, the answer would be no, and a decision block 502 is reached. At block 502, the question is asked whether the interior disable switch 411 is in the step movement or deployment deactivating state. Again, under normal conditions the answer would be no, and decision block 503 is reached, wherein a determination is made as to whether the battery voltage is low. Under normal operating conditions, the answer would again be no, and a decision block 504 is reached. At block 504, inquiry is made as to whether the door is open. During the normal step deployment sequence, the answer would be yes, and a block 505 is reached. At block 505, a determination is made as to whether vehicle status conditions such as the parking brake being set, the truck being stopped, and the cab not being tilted are met. If the answer is yes, block 506 is reached and deployment of the step from the stowed position commences. In addition, at block 507 the "Step Deploying" state is reached (FIG. 26). A return block 508 is then reached. If at block 505 any of the vehicle status conditions being evaluated are not in the desired predetermined state, a block 509 is reached. At block 509, the interior alarm, if used, in this case the interior auditory alarm and interior lamp, are activated to provide an alarm or warning. From block 509, a block 510 is reached corresponding to the "Stowed With Alarms" state illustrated in FIG. 29. From block 510 the return block 508 is again reached.

If at block 500 a determination is made that the stairway is not in a stowed position and the door is closed, a block 511 is reached, followed by a block 512. Blocks 511 and 512 are identical to blocks 509 and 510.

Figure 30:
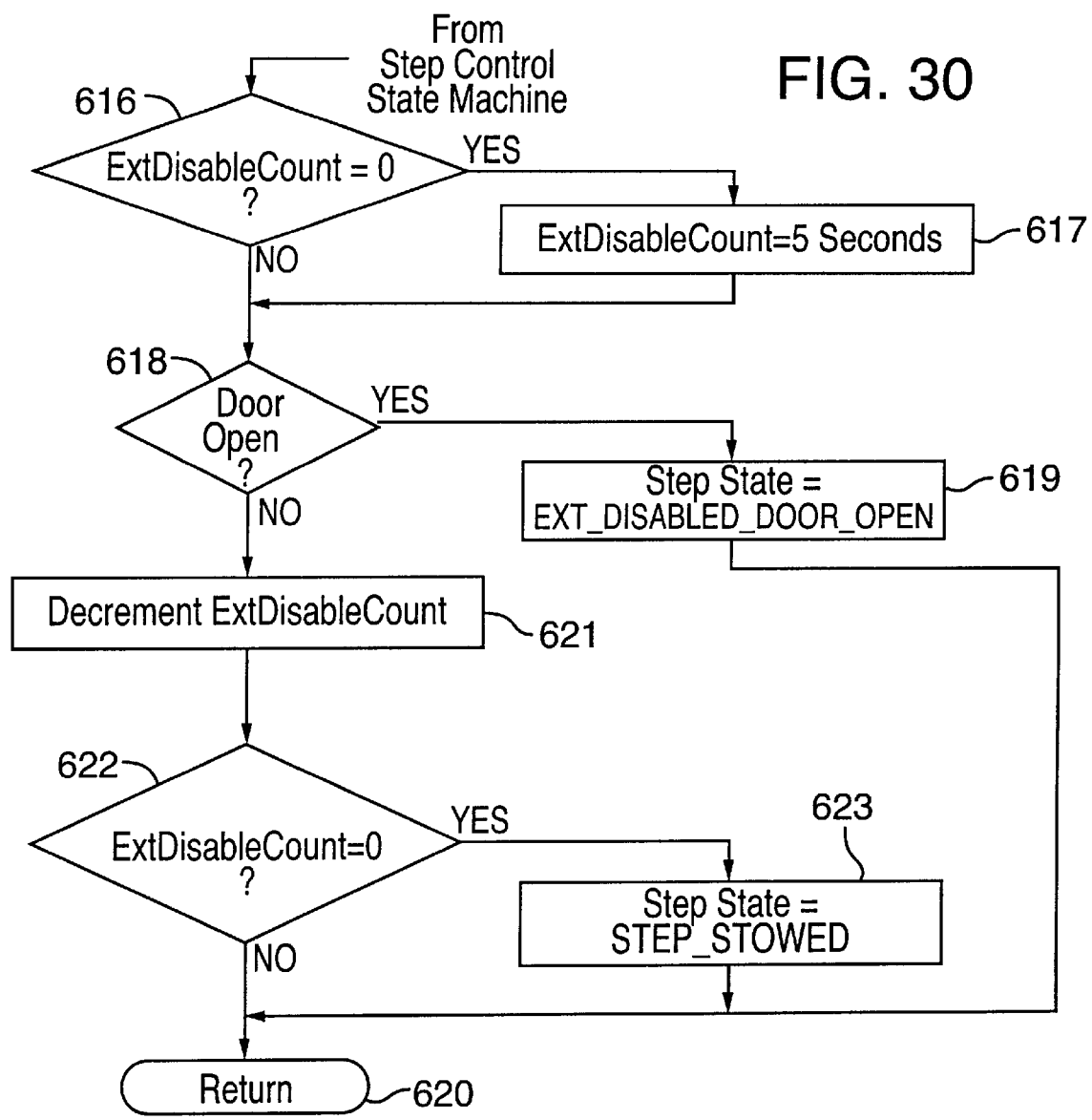

If at block 501 a determination is made that the exterior disable switch is in a stairway movement deactivating state, a block 513 is reached, corresponding to the "Ext Disabled Door Closed" state of FIG. 30. From block 513, the block 508 is reached. If at block 502 a determination is made that the interior disable switch 411 has been shifted to the stairway deployment or movement deactivate state, a block 514 is reached. This block corresponds to the "Int Disable Door Closed" state of FIG. 31. From block 514, the block 508 is reached. If at block 503 the battery voltage is determined to be below a threshold, a block 515 is reached and the interior lamp is energized to provide a visual warning. From block 515 a block 516 is reached. At block 516 the control is in the "Low Voltage Door Closed" state of FIG. 45.

Assume the Step Deploying state has been reached.

The Step Deploying state example of FIG. 26 corresponds to the stairway being moved from the stowed position toward a deployed position. When in this state, the exterior alarm 430 (if used) and an exterior lamp 436 (if used) are activated to indicate that the stairway is in motion. The stairway will continue to deploy, unless an interrupt deployment of stairway condition exists, until such time as the steps are fully deployed. In the illustrated embodiment, the feedback potentiometer 421 (FIG. 21) provides signals for evaluation by the microprocessor to determine when the step is fully deployed. Although this approach is advantageous, other alternative position sensing approaches may be used.

During step deployment, the illustrated control circuit 402 evaluates at least one interrupt deployment of stairway condition from a set of interrupt deployment of stairway conditions. This set of interrupt deployment of stairway conditions may include at least one of the following: (a) whether the exterior disable switch 413 (if used) has been shifted to a step deployment or movement deactivating state, and (b) whether the speed of deployment of the stairway is below a threshold speed (for example, less than ten percent of the average speed of a normally moving stairway). This threshold speed may be varied. If the speed of deployment of the stairway is below the threshold speed, this is indicative of the stairway encountering an obstacle or encountering unusual deployment resistance (for example if dirt or debris has become lodged in the stairway deployment mechanisms). If the exterior disable switch is shifted to the step deployment or movement deactivating state or the speed of deployment drops below the threshold speed, in this example, the deployment of the stairway is interrupted. Either or both of these conditions may be monitored. In addition, whether the door is open may be an interrupt deployment of stairway condition. For example, if the door is closed while the stairway is being deployed, in the illustrated embodiment deployment of the stairway is interrupted and the system returns to a Step Stowing state. In addition, the set of interrupt deployment of stairway conditions may also include whether the truck is stopped, whether the parking brake is set, and whether the motor current (if an electric motor is used) is at an acceptable level (e.g. below a threshold). Again, the set of interrupt of deployment of stairway conditions may include one or more of these conditions, with one or more of them being evaluated during stairway deployment. In the illustrated embodiment, all of these conditions are evaluated. In addition, in this example, the stairway will stop deploying and the control 402 will shift to the Stop While Deploying state (FIG. 36) if the exterior disable switch is shifted to the step deployment deactivating state, the motor current is too high, or the stairway deployment speed is too slow. In addition, the existence of these latter two conditions in this example results in the interior auditory alarm and interior lamp being activated to provide a warning.

Figure 27:
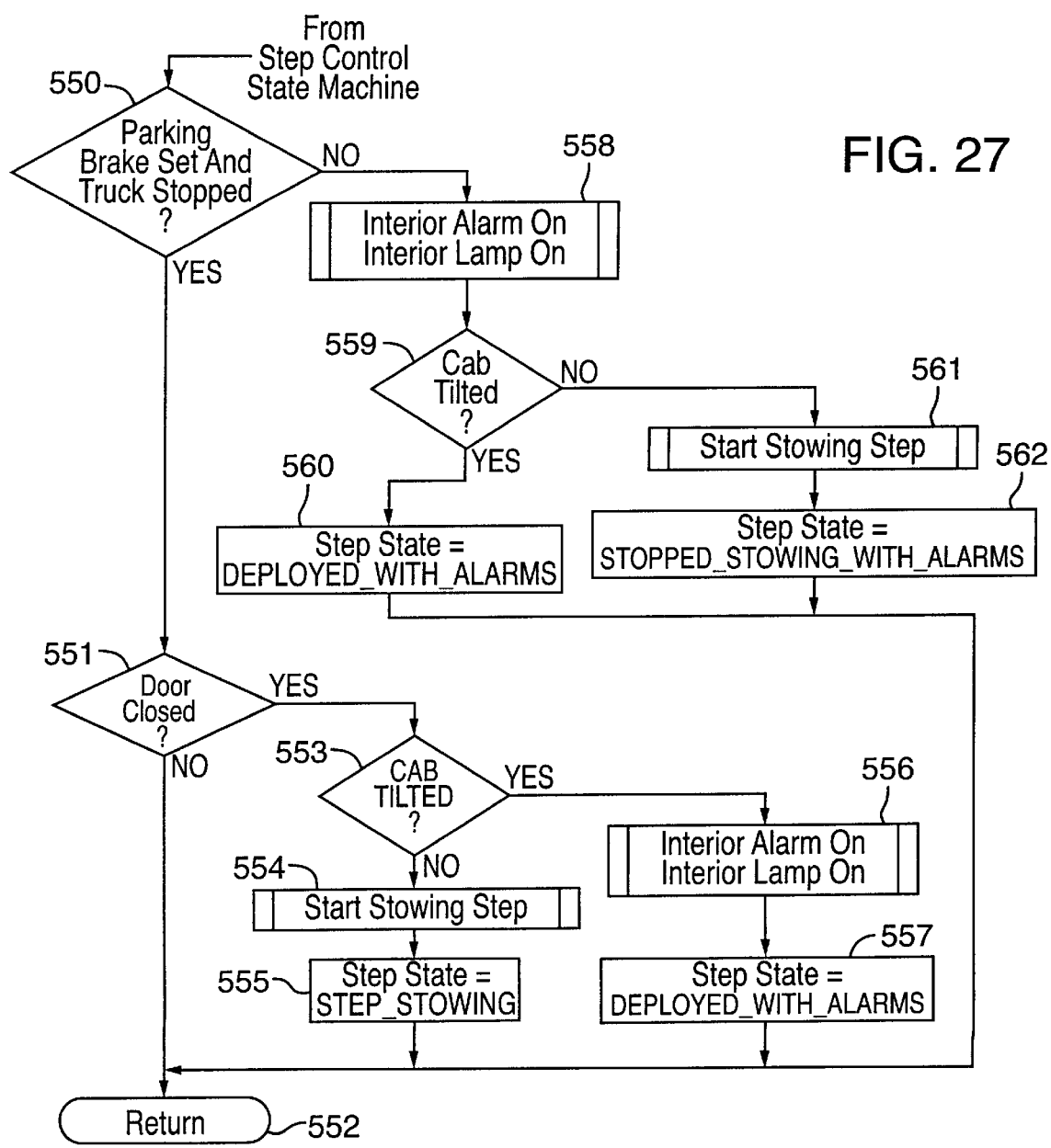

In the specific example of a Step Deploying state illustrated in FIG. 26, a decision block 520 is reached from the step control state machine. At block 520, an inquiry is made as to whether the stairway is deployed. If the answer is yes, a block 522 is reached, and further deployment of the step halts. In this case, at block 523 the microcontroller is shifted to the "Step Deployed" state, such as shown in FIG. 27. From block 523, a return block 524 is reached. If at block 520, the stairway has yet to be fully deployed, a block 525 is reached. At block 525, a determination is made as to whether the motor current is at an acceptable level and whether the step speed during deployment is acceptable. If the answer is no, a block 526 is reached, and deployment of the step is halted. From block 526, a decision block 527 is reached. At block 527, a determination is made as to whether the stairway is substantially deployed such that the stairway should be considered fully deployed. For example, substantial deployment may be found, if, for example, the stairway is within a certain distance or percentage of full deployment. In the embodiment of FIGS. 1–3, a specific example would be treating the step as fully deployed if it is within four percent of full deployment. This full deployment tolerance may be varied. If at block 527 the answer is yes, a block 528 is reached. At block 528, the stairway is determined to be in the "Step Deployed" state (see FIG. 27) and the return block 524 is reached. In contrast, if at block 527 a determination is made that the stairway is not close enough to full deployment, a block 529 is reached. At block 529, the interior auditory and visual alarms are activated (assuming these alarms are used). From block 529, a block 530 is reached with the microprocessor then being in the "Stopped While Deploying With Alarms" state (see FIG. 34 for one example). From block 530, the block 524 is again reached.

Returning to decision block 525, if at this block the motor current and stairway speed is determined to be acceptable, a decision block 531 is reached. At block 531 a determination is made as to whether the parking brake is set and whether the truck is stopped. If at block 531 the answer is no, a block 532 is reached and deployment of the stairway is halted. From block 532, a block 533 is reached and the interior auditory and visual alerts are activated (if used). From block 533, a block 534 is reached and the control is in the "Stopped Waiting to Stow With Alarms" state (see FIG. 44 for an example). From block 534, the return block 524 is reached.

If at block 531 it is determined that the parking brake is set and the truck is stopped (assuming these conditions are being evaluated), then a decision block 535 is reached. At block 535, a determination is made as to whether the exterior disable switch has been placed in a step deployment or movement deactivating state. If the answer is yes, a block 536 is reached and deployment of the step is interrupted. From block 536, a block 537 is reached with the microprocessor being in a "Stopped While Deploying" state (see FIG. 36 for an example). From block 537, the return block 524 is reached. If at block 535 it is determined that the exterior disable switch is not in the step deployment or movement deactivating state, a decision block 538 is reached. At block 538 a determination is made as to whether the door has been closed. If the answer is yes, block 539 is reached and step deployment is interrupted. From block 539, the control shifts to block 540 and to a "Stopped Waiting to Stow" state (see FIG. 37 for an example). If at block 538 it is determined that the door is not closed, the return block 524 is reached from block 538.

Thus, during a normal step deploying sequence, the program flow is from block 520, to block 525, to block 531, to block 535 and to block 538 and back to block 520 until such time as the step is fully deployed as determined at decision block 520.

Assume the step is fully deployed (or close enough to be treated as fully deployed). In the embodiments of FIGS. 1–3, full deployment occurs when the step has traveled twenty-eight degrees from the fully stowed position, although this would be different for a non-pivoting step and may be varied, depending upon the specific step configuration being controlled. To advance to the next state, Step Stowing (FIG. 28 as an example), one or more vehicle status conditions must be met. These vehicle status conditions can be the same as the conditions which are evaluated before commencing deployment of the stairway from the stowed position toward a deployed position. Thus, this state may involve evaluating at least one vehicle status condition from a set of vehicle status conditions wherein the set of vehicle status conditions may include at least one of the following: (a) whether the vehicle is stopped, whether the parking brake for the vehicle is set, and whether the cab is tilted in excess of a threshold (e.g., downwardly toward the direction at which the stairway is to be deployed). Stowing of the stairway may be blocked or allowed to continue with an alarm being provided if said at least one vehicle status condition is not in a predetermined state. In other words, stowing of the stairway may be blocked, or may continue with an alarm,, if the vehicle is not stopped, if the parking brake is not set, and/or if the cab is tilted from in excess of the threshold. Despite the existence of these conditions, in the illustrated example, step stowing will commence with an interior alarm being activated if the cab is not tilted and the truck is moving or the parking brake is not set. While the stairway is in the Step Deployed state, the cab may be tilted. In addition, in this specific example, the interior alarm and interior warning lamp will remain off if the parking brake is set, the truck is not moving, and the door remains open. If any of these conditions change while the cab is tilted, in this example the interior alarm and interior warning lamp will commence operating to provide a warning. Upon closing the door associated with the stairway, automatically, or semi-automatically, if desired, stowing of the steps will commence with the control shifting to the Step Stowing state.

FIG. 27 illustrates one specific example of a step control in a Step Deployed state ready to commence stowing the stairway. In this example, at a decision block 550 (reached from the step control state machine) a determination is made as to whether the parking brake is set and the truck is stopped. If the answer is yes, a decision block 551 is reached. At block 551, a determination is made as to whether the door is closed. If the answer is no, a return block 552 is reached. If at block 551 it is determined that the door has been closed, a decision block 553 is reached. At block 553, a determination is made as to whether the cab is tilted beyond the threshold. If the answer is no, block 554 is reached and stairway stowing commences. From block 554, a block 555 is reached with the system being placed in the "Step Stowing" state (see FIG. 28 for an example). From block 555, the return block 552 is reached. If at block 553 a determination is made that the cab is tilted in excess of a threshold, a block 556 is reached. At this block, the interior auditory and visual alarms (if used) are activated. From block 556, the process reaches a block 557 and the system is placed in the "Deployed With Alarms" state (see FIG. 41 for an example). From block 557 the block 552 is reached.

Returning again to block 550, if at this block a determination is made that the parking brake is not set and the truck is not stopped, a block 558 is reached. At block 558, the interior auditory and visual alarms (if used) are activated. From block 558, a decision block 559 is reached. At block 559, a determination is made as to whether the cab is tilted from in excess of the threshold. If the answer is yes, a block 560 is reached and the system is in the "Deployed With Alarms" state (see FIG. 41 for an example). If at block 559 a determination is made that the cab is not tilted, a block 561 is reached and stowing of the stairway commences. From block 561*a* block 562 is reached and the system is placed in a "Step Stowing With Alarms" state (see FIG. 38 for an example). From blocks 560 and 562, the return block 552 is reached.

Assume the system is in a Step Stowing state where the stairway is being shifted toward a fully stowed position from a deployed position. In this case, the exterior alarm (if used) is activated to indicate that the stairway is in motion. In general, the steps will continue to stow until the step position is determined to be fully stowed (e.g. the potentiometer 421 signals to the microcontroller that the steps are in a stowed position). When fully stowed, the control circuit 402 advances to the Step Stowed state. Stairway stowing occurs on the assumption that a number of conditions are met, such as set forth in the illustrated example. The step stowing conditions may include at least one condition selected from the set of step stowing conditions comprising (a) the door is closed; (b) the exterior disable switch is not shifted to a stairway deactivating state; (c) the motor current is at an acceptable level; and (d) the step is traveling at an acceptable speed. Again, one or more of these conditions may be monitored. In the illustrated example, all four of these conditions are monitored.

If the door opens, in this example, the stairway will stop stowing and the control will shift to the Step Deploying state. Under normal operating conditions, no alarms will sound other than the exterior alarm (if used) when deploying of the step recommences.

If the exterior disable switch is pressed (e.g. shifted to a stairway movement deactivate state), the motor current is too high, or the step speed is too slow, then, in this example, the stairway stowing is interrupted and the control shifts to the "Stopped While Stowing" state. If stopping occurs due to the motor current being too high or the step speed being too slow, the interior alerts, that is, the interior alarm and interior warning lamp, if used, will be activated.

Also, in this specific example, if the vehicle commences moving or the parking brake is not set, the stairway will continue to stow but the interior alerts, if used, will be activated.

Again, all of these conditions need not be monitored and alternatives may be employed. For example, upon opening the door, the system need not automatically shift to a step deploying state. For example, once step stowing commences, it may continue without interruption until the step is stowed without monitoring any of these conditions. Also, as an alternative, monitoring may be limited to any one or more of these conditions. For example, one could assume that the step speed will be okay if the motor current is okay and eliminate the monitoring of the step speed. If an electric motor is not being used as an actuator, other parameters (such as hydraulic pressure in the case of a hydraulic system) may be monitored. In addition, the exterior disable switch may be eliminated.

Figure 28:
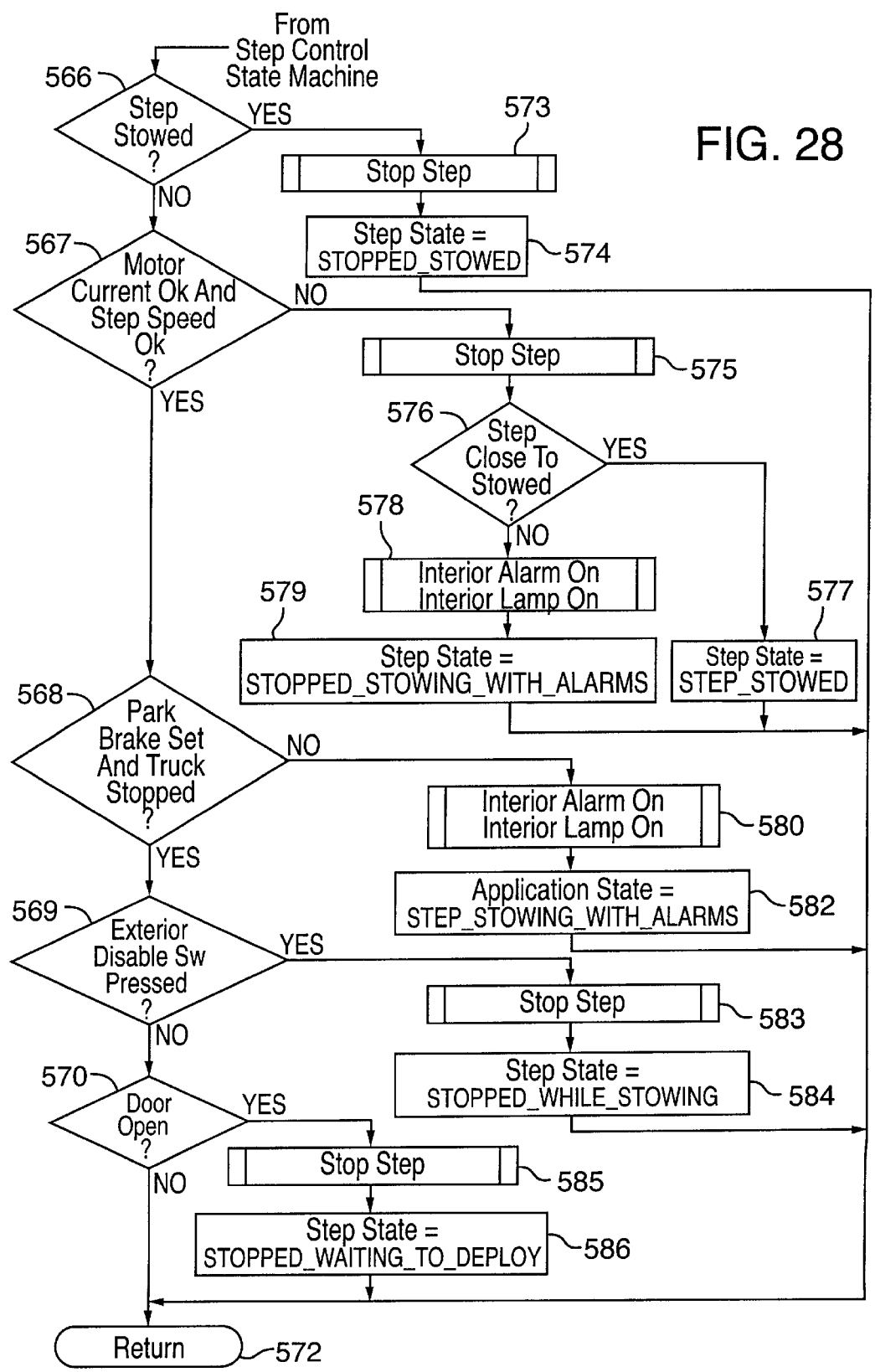

One specific example of a Step Stowing state is shown in FIG. 28. In this figure, at a decision block 566, reached from the step control state machine, a determination is made as to whether the stairway is stowed. If not, a decision block 567 is reached and a determination is made as to whether the motor current and step speed are at acceptable levels. If the answer is yes, a decision block 568 is reached and a determination is made as to whether the parking brake is set and the truck is stopped. If the answer at block 568 is yes, a decision block 569 is reached and a determination is made as to whether the exterior disable switch is pressed (e.g. in a stairway movement deactivating state). If the answer is no, at decision block 570 a determination is made as to whether the door is open. If the answer is no, a return block 572 is reached. During normal stowing of the stairway, the sequence proceeds through blocks 566, 567, 568, 569 and 570 and repeats until at block 566 a determination is made that the step is stowed. In this latter case, a block 573 is reached from block 566 and stowing of the step is halted. From block 573, a block 574 is reached and the state system is in the "Step Stowed" state (see, for example, FIG. 25). From block 574, the block 572 is reached.

Assume that the step is not fully stowed and block 567 is reached from block 566. If the motor current and step speed are not acceptable, a block 575 is reached and stowing of the step is interrupted. At block 576, reached from block 575, a determination is made as to whether the step is close enough to a fully stowed position to be considered fully stowed. For example, if the step is stowed within two percent of the fully stowed position, it may be considered fully stowed. The allowed tolerance from a fully stowed position within which the stairway is treated as fully stowed may be varied. From block 576, if the step is determined to be close enough to a fully stowed position to be considered as if it is fully stowed, a block 577 is reached. At block 577, the system is placed in the Step Stowed state (see FIG. 25). If at block 576 it is determined that the step is not close to being stowed, a block 578 is reached. At block 578 the interior alerts, if used, are activated. From block 578 the system proceeds to block 579 and is placed in a "Stopped While Stowing With Alarms" state (see FIG. 34 for an example). From blocks 577 and 579, the process reaches return block 572.

If the step is stowing, but not yet fully stowed, and the motor current and step speed are acceptable, a block 568 is reached. Assume at block 568 the parking brake is not set and the vehicle is not stopped. In this case, a block 580 is reached and the interior alerts are activated, if used. From block 580, the process proceeds to block 582 with the system being placed in a "Step Stowing With Alarms" state (see FIG. 38 for an example). That is, in this case stowing of the step will continue although the alarms will indicate a problem exists. From block 582 the process returns via block 572.

Assuming the step has not fully stowed, motor current and step speed are acceptable, the parking brake is set, and the vehicle is stopped. Under these conditions of the Step Stowing state of FIG. 28 the block 569 is reached. If the exterior disable switch is pressed (to the step movement deactivate state), a block 583 is reached and stowing of the step stops. From block 583, the process continues to block 584 with the system being placed in the "Stopped While Stowing" state (see FIG. 33 for an example). In this case, the interior alerts are not activated as the stairway movement was intentionally halted. From block 584, the return block 572 is reached.

In the FIG. 28 Step Stowing state, assume that the stairway has not been fully stowed and that block 570 is reached through blocks 567, 568 and 569. Also assume at block 570 that the door has been opened. In this case, a block 585 is reached with stowing of the stairway halted. From block 585, a block 586 is reached and the system shifts to a "Stopped Waiting to Deploy" state (see FIG. 32 for an example).

Assume that deployment of the stairway was interrupted after it started and before the stairway was determined to be in a fully deployed position or close enough to fully deployed to be considered fully deployed. In this case, depending upon the circumstances, in the illustrated example the interior alerts, namely the interior auditory alarm and interior warning lamp, may be either on or off. Typically, one of three conditions occurred during step deployment to reach this state. That is, assuming an exterior disable switch is included in the system, placing the exterior disable switch or control in a step movement deactivating step will halt the deployment of the step. As another example, in the case where motor current is being monitored, step deployment may be interrupted if the motor current is above a threshold. Furthermore, assuming step speed is being monitored, deployment of the step may be interrupted if the step deployment speed is unacceptably slow. In the illustrated example, shifting of the exterior disable switch to a stairway deactivating state also interrupts stairway deployment. In the specific example shown in the figures, the interior alerts (the auditory and visual warning devices, if used) remain inactive in this latter case. The stairway in this case remains in the same position until the door is closed. If the door is closed, the steps will travel toward a stowed position, assuming the conditions of the step stowing state are met and the cab is not tilted (if cab tilting is being monitored). To recommence deployment of the stairway following interruption in a partially deployed position, the illustrated control thus passes through the step stowing state. Upon closing and reopening the door, the stairway recommences deploying if the step deployment conditions are met.

With the stairway stopped during deployment, the cab may be tilted. In addition, in this specific example the interior alerts remain off if the parking brake is set, the vehicle is not moving, and the door remains open. If any of these conditions change while the cab is tilted, the interior alerts are activated as a warning. If the motor current is in excess of a threshold, this typically indicates that movement of the steps are obstructed or there is a weight on the steps. In this case, the interior alerts are activated. If step stowing speed is too slow, the interior alerts are also activated.

In the illustrated embodiment, assume stowing of the stairway toward a fully stowed position was interrupted during the stowing process. In this case, the stairway is stopped somewhere between the fully deployed and fully stowed position. In addition, the interior alerts, if used, may be on or off. As in the case where the stairway was stopped during deployment, typically one of three conditions occurred during step stowing to reach the Stop While Stowing state. These conditions include one or more of the following: (a) the exterior disable switch is shifted to the stairway deactivating state (assuming an exterior disable switch is used); (b) the motor current is too high (again assuming motor current is being monitored); and (c) the step speed is too slow (assuming step speed is being monitored).

In this example, pressing the exterior disable switch to a step movement deactivating state stops the movement of the stairway assembly. The interior alerts, if used, remain off. In addition, the stairway remains in the same position until the door is opened. Upon opening the door, the steps will commence deployment, assuming all conditions of the Step Deploying state are met and, in this example, that the cab is not tilted. Upon closing the door, stowing of the stairway will recommence, assuming all conditions of the Step Stowing state are met and, in this example, that the cab is not tilted.

While in the Stopped While Stowing state, the cab may be tilted. In one specific example, the interior alerts remain off if the parking brake is set, the vehicle is not moving, and the door remains closed. If any of these latter conditions change while the cab is tilted, the interior alerts, in this case, will be activated as a warning.

As previously explained, the motor current will be too high if, for example, the steps are obstructed or if there is weight on the steps. In this case, the interior alerts are activated in the illustrated example with these alerts also being activated if the step speed is too slow.

The description proceeds with a discussion of the remaining states illustrated in FIGS. 29–45. It should be understood that these states are examples, only, of a suitable control process for the microprocessor included in the control circuit 402. As previously pointed out, one need not monitor all of the various vehicle conditions depicted in the flow diagrams of these figures in order to provide a control for the stairway.

Figure 29:
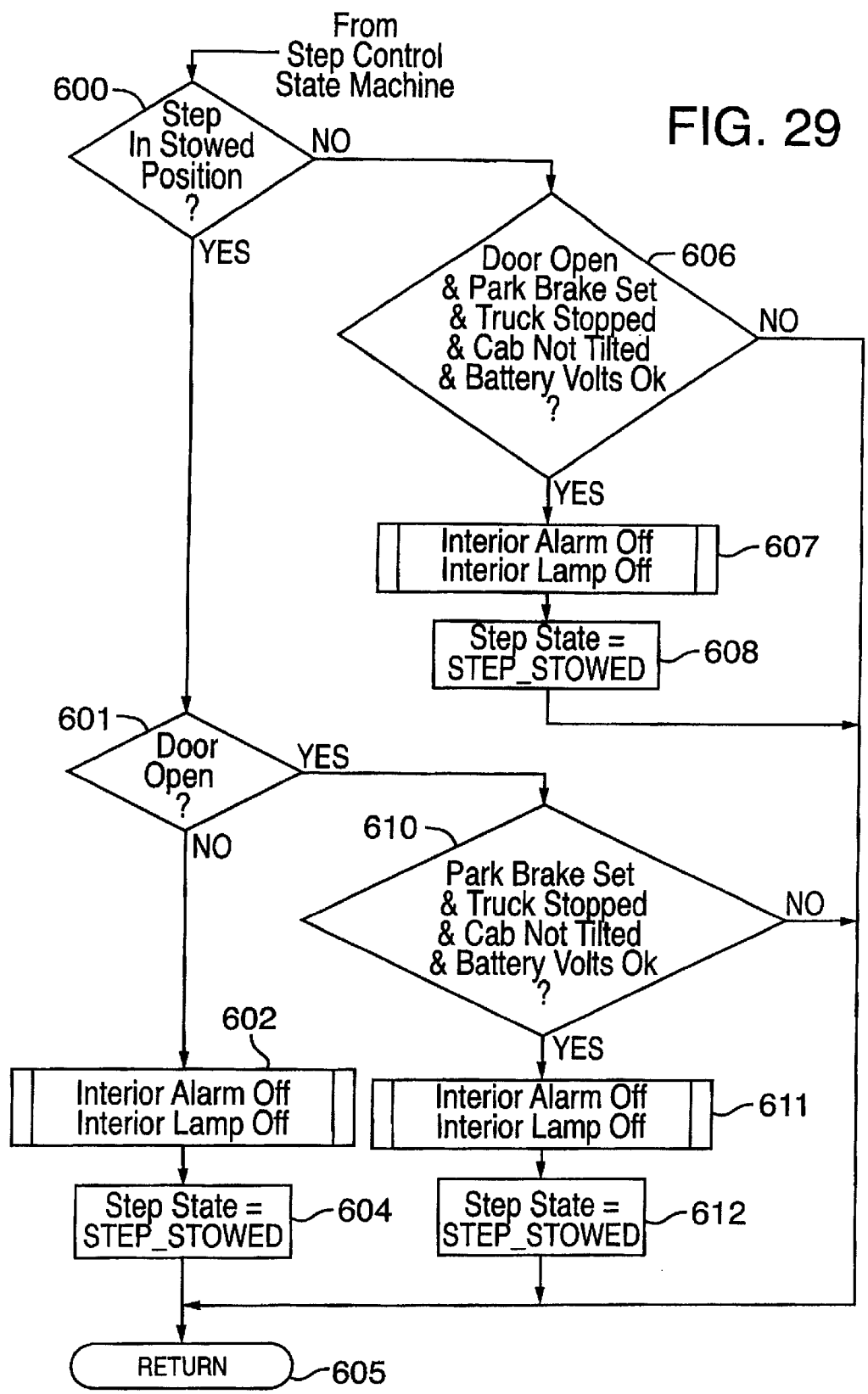

FIG. 29 illustrates an example of a Step Stowed With Alarm state.

In this illustrated example, the state starts at decision block 600. At block 600, a determination is made as to whether the step is in a stowed position. If the answer is yes, a decision block 601 is reached. At block 601, a determination is made as to whether the door is open. if the answer is no, a block 602 is reached and the interior alerts, if used, are deactivated. From block 602 the process proceeds to block 604 with the system passing to the Step Stowed state (FIG. 25). From block 604, a return block 605 is reached.

If at block 600 a determination is made that the step is not in a stowed position, a decision block 606 is reached. At block 606, a determination is made as to whether the door is open, the parking brake set, the vehicle stopped, the cab not tilted, and the battery voltage is acceptable. Again, any one or more of these conditions may be monitored. If the answer at block 606 is yes, the interior alarms are deactivated as indicated at block 607. From block 607 the process shifts to a "Step Stowed" state at block 608, with the process continuing to block 605. If at block 606 all of the conditions being monitored are not acceptable, the interior alarms remain on with the process continuing along the no branch from block 606 to return block 605.

If at block 601 the door is determined to be open, a decision block 610 is reached. At block 610 a determination is made as to whether the parking brake is set, the vehicle is stopped, the cab is not tilted, and the battery voltage is at an acceptable level. If the answer is yes, a block 611 is reached and the interior alerts are deactivated. From block 611 the process continues to block 612, with the system shifting to the Step Stowed state (FIG. 25). If one or more of the conditions being monitored, such as the conditions set forth in block 610, are unacceptable, the no branch is followed from branch 610 and the interior alarms are not deactivated. From block 610, in this case, the process continues to block 605.

FIG. 30 illustrates an example of the exterior disable door closed state. In this case, the door of the vehicle is in a closed position and the exterior disable switch associated with the stairway adjacent to this door has been placed in a stairway movement deactivate state. In this illustrated approach, the exterior disable switch is shifted from its deactivate state after a predetermined time. This predetermined time may be varied, but is typically five or ten seconds.

In FIG. 30, the process of this state starts at a decision block 616 wherein a question is asked as to whether the disable count is zero. The disable count is the time remaining before the exterior disable switch is shifted out of the stairway movement deactivating state. If the answer is yes, the count is established at block 617 at a predetermined time, such as five seconds. If the answer at block 616 is no, or following block 617, a decision block 618 is reached. At block 618 an inquiry is made as to whether the door is open. If the answer is yes, a block 619 is reached and the system is in a "Ext Disable Door Open" state (see FIG. 39 for an example). From block 619, the process reaches a return block 620. If the door is not open at block 618, a block 621 is reached and the count is decremented. If the delay established at block 617 has elapsed, from a decision block 622, a block 623 is reached and the system is shifted to the Step Stowed state (FIG. 25) and the system reaches return block 620. If the count has not fully decremented to zero at block 622, the process returns via block 620 and, assuming nothing further has changed, again reaches block 616. This will continue until a yes determination is made at either block 618 or 622.

As an alternative, the exterior disable switch (if used) may simply remain in the step movement deactivate state until it is again manually actuated to shift state. In such a case, the state of FIG. 30 is eliminated. Also, the exterior switch may be operable to enable the stairway deployment or stowing if shifted to a stairway activate state.

Figure 31:
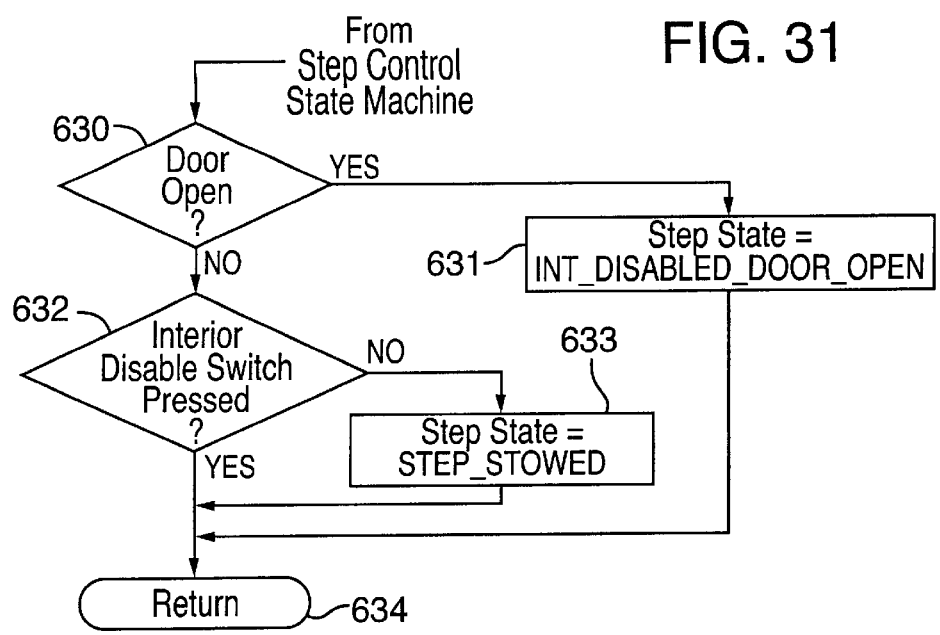

An example of the Interior Disable Door Closed state is shown in FIG. 31. This state is reached, for example, if the interior disable switch is in a stairway movement deactivate state and the door is closed. At a decision block 630 in FIG. 31, a determination is made as to whether the door is open. If the door is opened, a block 631 is reached and the system is placed in the "Int Disabled Door Open" state (see FIG. 40 for an example). If at block 630 it is determined that the door is closed, a decision block 632 is reached. At block 632 a determination is made as to whether an interior disable switch has been pressed or shifted to a stairway deactivate state. If the answer is no, the process proceeds to block 633 and the system is in the Step Stowed state (FIG. 25). From block 633 the process continues through a return block 634. If at block 632 a determination is made that the interior disable switch is in the stairway deactivate state, the yes branch from block 632 is followed to block 634, with the system returning to the state machine. If nothing affecting the state has changed, the process will return to block 630 and continue to cycle until such time as the door is determined to be open at block 630 or the interior disable switch is shifted from its movement deactivate state.

Figure 32:
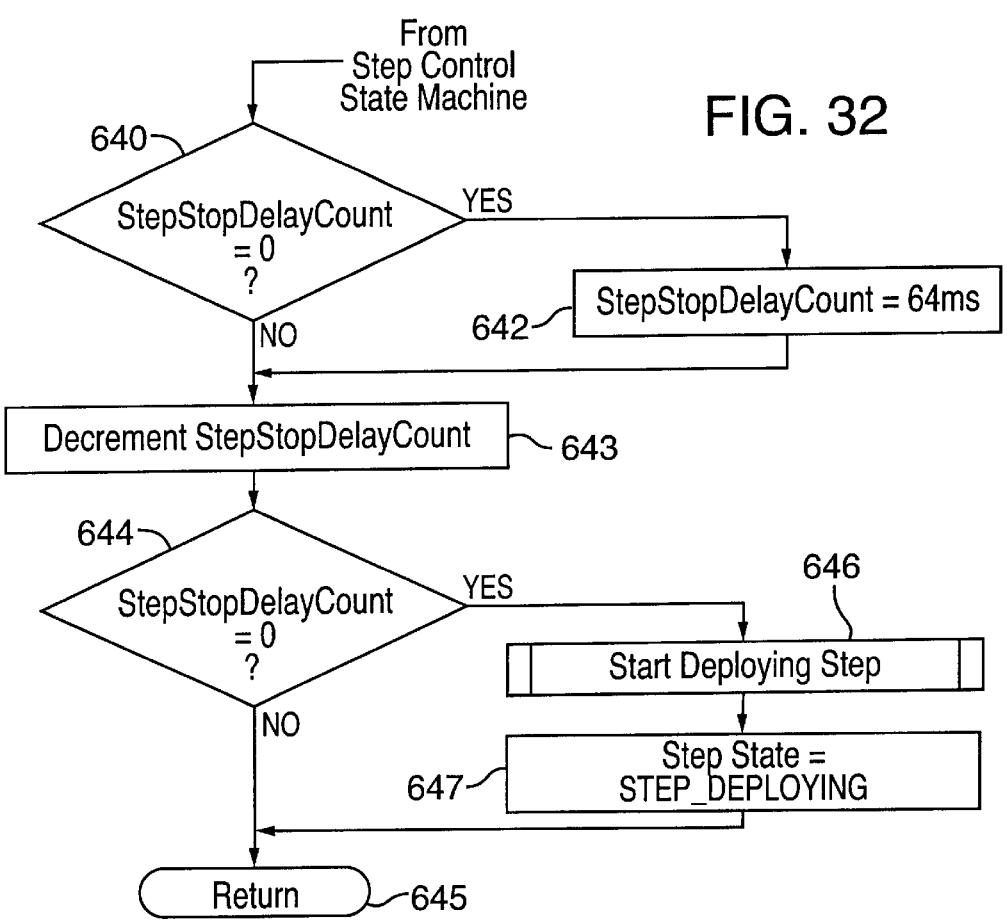

The Stopped Waiting To Deploy state example, shown in FIG. 32, is provided to insert a delay prior to recommencing deployment of the step after deployment has been interrupted. This delay is inserted to prevent the polarity of the current being applied to the motor from being instantaneously reversed. At block 640, a determination is made as to whether the delay count is zero. If the answer is yes, a block 642 is reached and the delay count is set at a predetermined level, in this case sixty-four milliseconds. This delay may be varied and is optional in some systems. Assuming the delay count is not equal to zero at block 640 or has been set at block 642, a block 643 is reached. At block 643 the delay count is decremented. From block 643 a decision block 644 is reached. At block 644 a determination is made as to whether the delay count has been decremented to zero. If the answer is no, a return block 645 is reached. Assuming no status changing conditions have occurred, the system will recycle to block 640 and continue decrementing the delay count. Eventually the delay count will be decremented to zero. In this case, from block 644 a block 646 is reached and deployment of the step is started. From block 646, a block 647 is reached and the state is shifted to the "Step Deploying" state (see FIG. 26).

Figure 33:
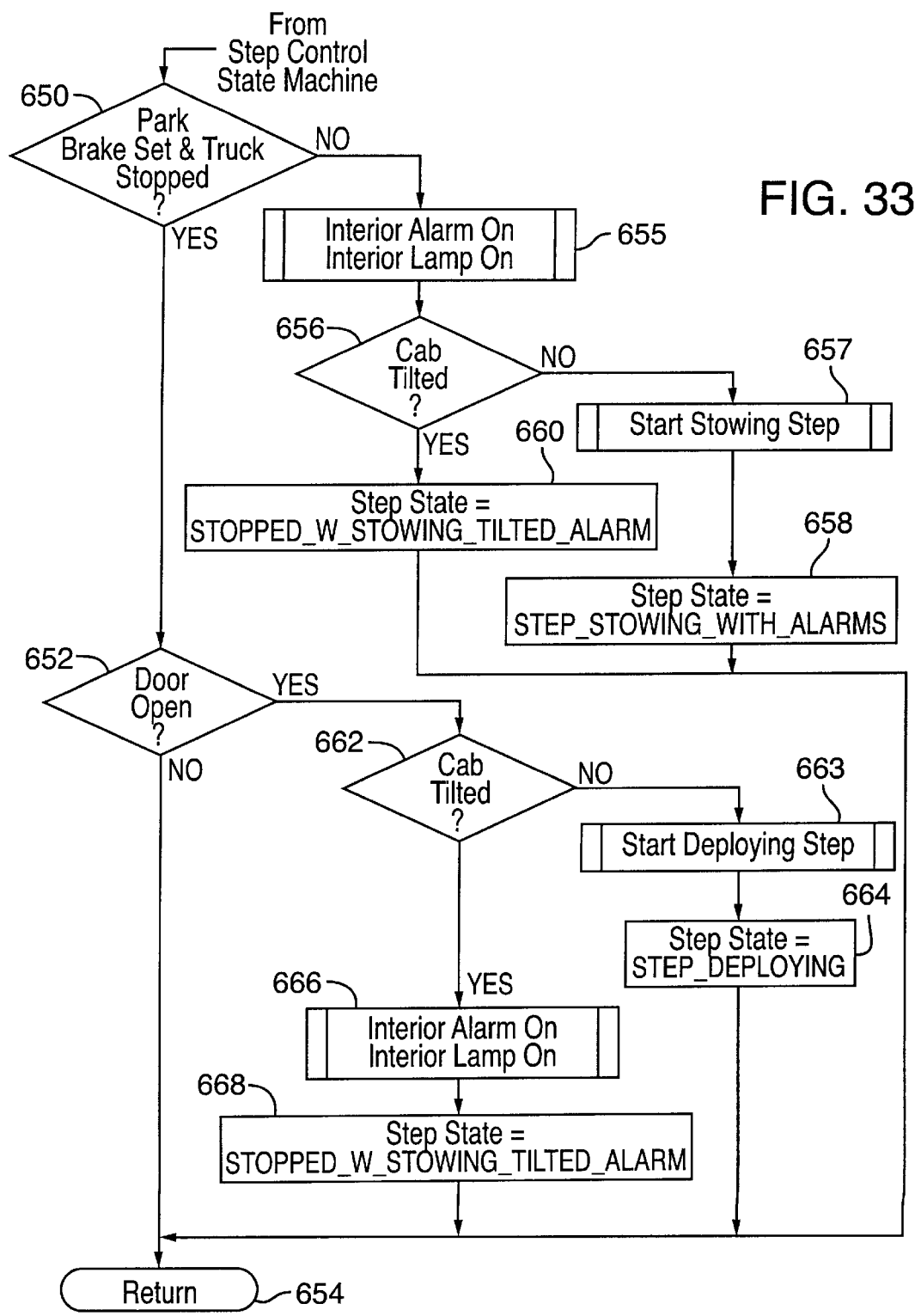

FIG. 33 provides an example of a Stopped While Stowing state which is reached when stowing of the step is interrupted under conditions where the interior alarms have not been activated. In this FIG. 33 example, a decision block 650 is reached. At block 650, a determination is made as to whether the parking brake is set and vehicle stopped, assuming both of these conditions are being monitored. If the answer is yes, a decision block 652 is reached. At block 652 a determination is made as to whether the door is open. If the answer is no, a return block 654 is reached and the process returns to the step control state machine.

If at block 650 a determination is made that the parking brake is not set, or the vehicle is not stopped, or both, a block 655 is reached. At block 655 the interior alerts are activated and the process continues to a decision block 656. At block 656, a determination is made as to whether the cab is tilted. If the answer is no, at block 657 stowing of the step commences. From block 657, a block 658 is reached and the state is set at the "Step Stowing With alarms" state (see FIG. 38), with the process continuing via return block 654. If at decision block 656 a determination is made that the cab is tilted, for example, more than a threshold, a block 660 is reached. At block 660 the step state is set equal to "Stopped While Stowing Tilted Alarm" (see FIG. 43). From block 660, the process reaches return block 654.

Assume at block 652 a determination is made that the door is open. In this case, a decision block 662 is reached, and a determination is made as to whether the cab is tilted, e.g. more than a threshold. If the answer is no, a block 663 is reached and deployment of the step commences with the process continuing to a block 664. At block 664, the system is in the "Step Deploying" state (FIG. 26). This assumes the specific example wherein the system passes through the step deploying state before returning to a step stowing state.

If at decision block 662 a determination is made that the cab is tilted an excessive amount, a block 666 is reached and the interior alerts, if used, are activated. From block 666, a block 668 is reached with the step state being equal to the "Stopped While Stowing Tilted Alarm" state (see FIG. 43).

Figure 34:
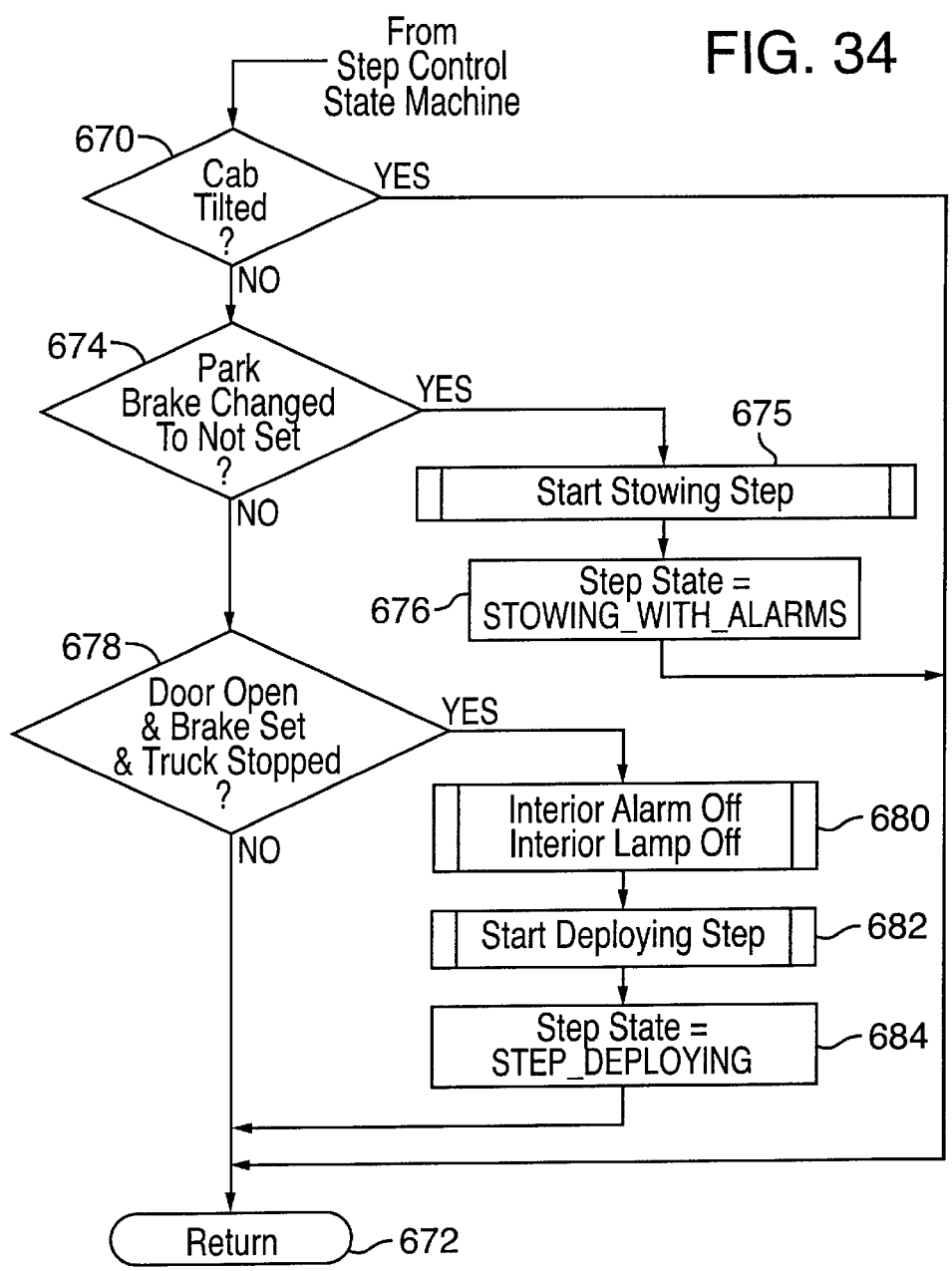

FIG. 34 illustrates one example of a Stopped While Stowing With Alarms state. The FIG. 34 example starts at decision block 670 wherein a determination is made as to whether the cab is excessively tilted. If the answer is yes, a return block 672 is reached, with the process continuing back to the step control state machine. Assuming no changes take place which affect the status of the step control state machine, block 670 will again be reached. The process will continue to cycle through block 670 in this manner until such time as the cab is no longer excessively tilted. In this case, from block 670, a decision block 674 is reached. At block 674 a determination is made as to whether the parking brake has been changed to a not set condition. If the answer is yes, stowing of the step commences at block 675. From block 675, at block 676 the state is set equal to the "Stowing With Alarms" state (FIG. 38) and the process continues via return block 672.

If at block 674 a determination is made that the parking brake has not been changed to a not set condition, a decision block 678 is reached. At block 678, a determination is made as to whether the door is open, the parking brake is set, and the vehicle is stopped, assuming all three of these conditions are being monitored. If the answer is no, the process continues via return block 672. If the answer is yes, at block 680 the interior alerts are deactivated, a block 682 is reached at which time deployment of the step commences, followed by the state being set at block 684 to a "Step Deploying" state (FIG. 26).

Figure 35:
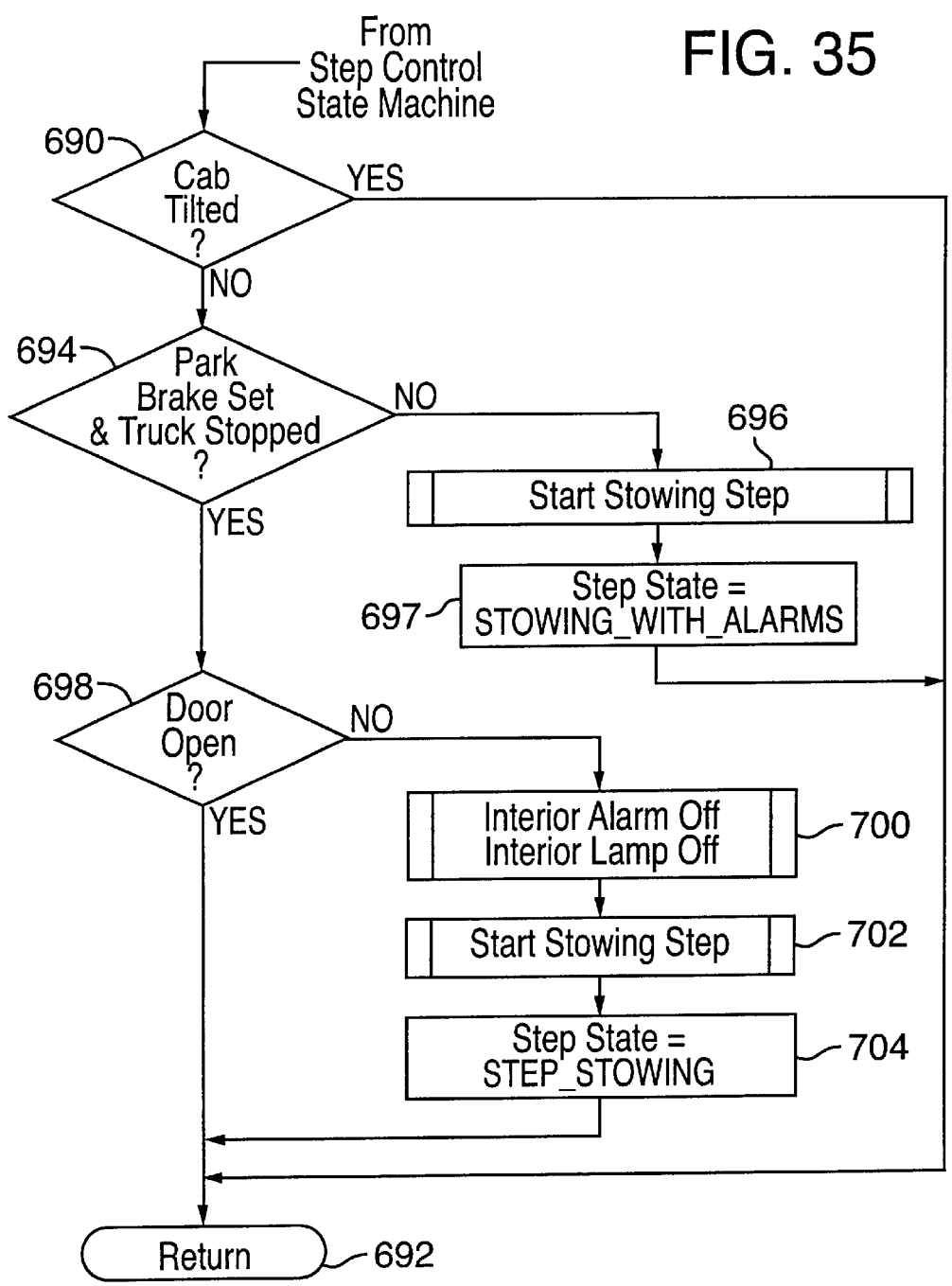
Figure 38:
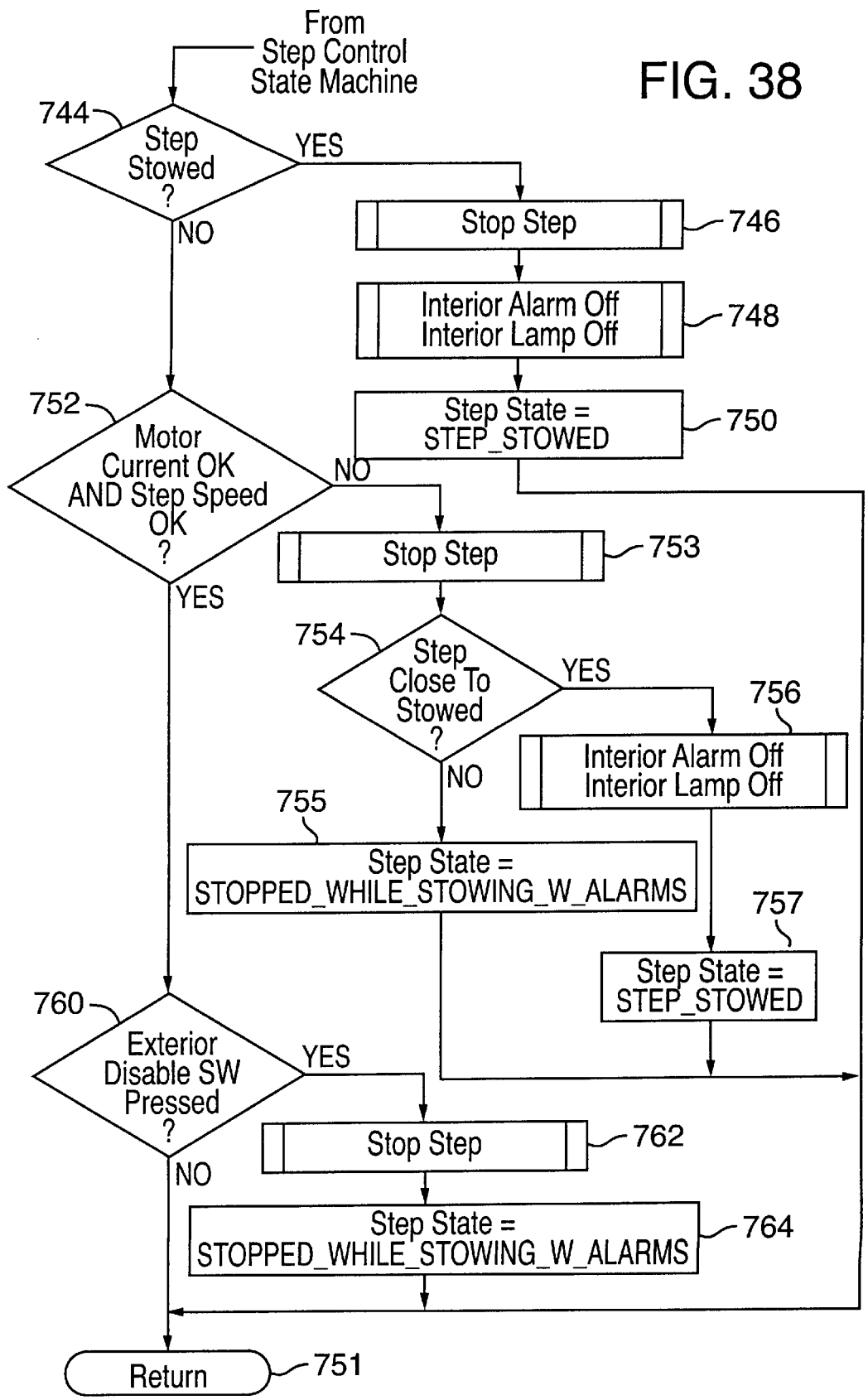

FIG. 35 illustrates an exemplary Stop While Deploying With Alarms state. From the step control state machine, a cab tilted decision block 690 is reached in FIG. 35. If at block 690 a determination is made that the cab is tilted in excess of a threshold, a return block 692 is reached, with the process continuing to the step control state machine. In the absence of changes, the process will again cycle through block 690 until the cab is no longer tilted. In this case, the process continues from block 690 to a decision block 694, at which a determination is made as to whether the parking brake is set and the vehicle is stopped, assuming these conditions are being monitored. If the answer is no, a block 696 is reached and stowing of the stairway commences. From block 696, a block 697 is reached with the state being set in the "Stowing With Alarms" state (FIG. 38). If at block 694 a determination is made that the parking brake is set and the vehicle is stopped, a decision block 698 is reached. At block 698 a determination is made as to whether the door is open. If the answer is yes, the process continues via return block 692. If the answer at block 698 is no, the process continues to a block 700 at which the interior alerts, assuming they are being used, are deactivated. From block 700, a block 702 is reached and stowing of the step commences. Following block 702, the system is placed in a "Step Stowing" state (FIG. 28) at block 704.

Figure 36:
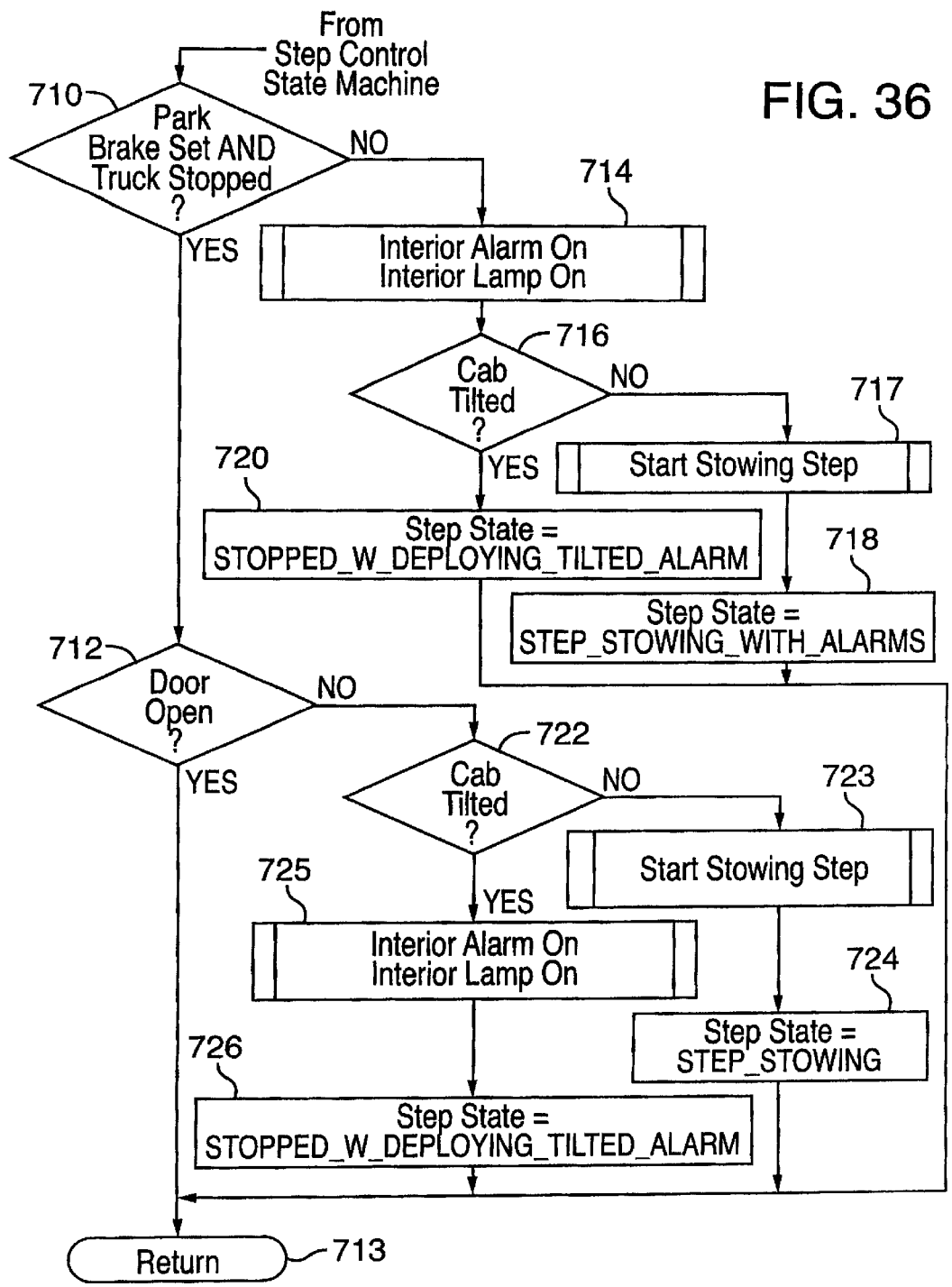
Figure 42:
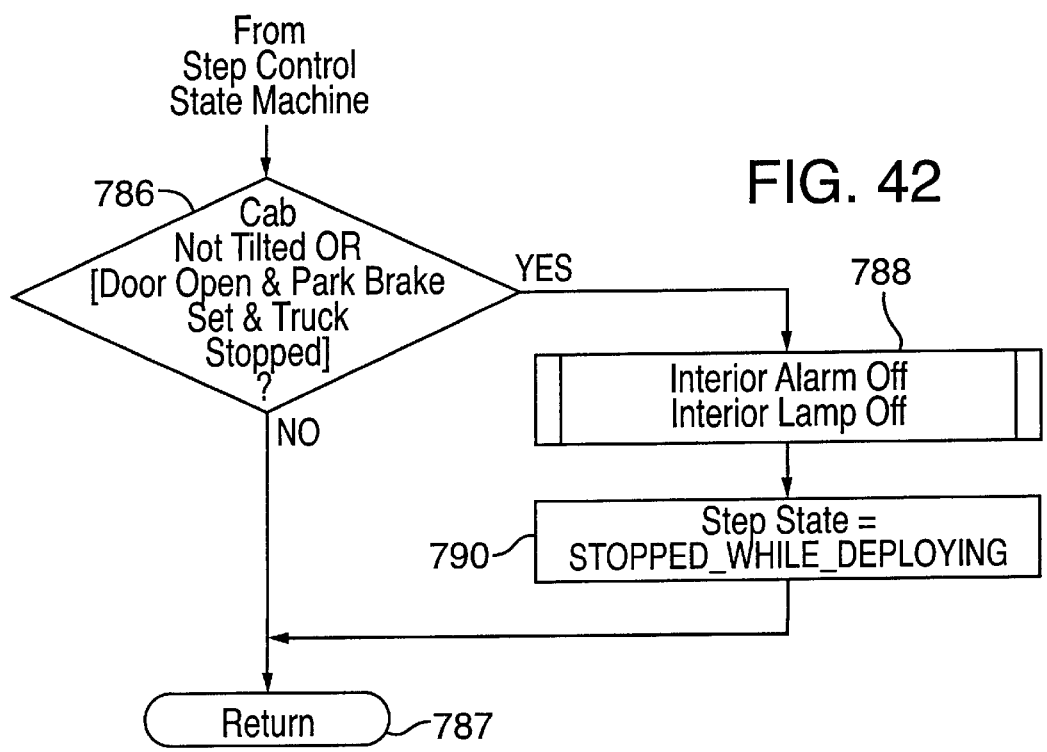

FIG. 36 illustrates an example of a Stopped While Deploying state. From the step control state machine, a decision block 710 is reached. At block 710 a determination is made as to whether the parking brake is set and the vehicle stopped. If the answer is yes, a decision block 712 is reached and a determination is made as to whether the door is open. If the door is open, a return block 713 is reached from block 712, with the process continuing. If at block 710, a determination is made that either the parking brake is not set or the vehicle is not stopped, or both, assuming these conditions are being monitored, a block 714 is reached and the interior alerts. if used, are activated. The process continues from block 714 to a decision block 716 at which a determination is made as to whether the cab is tilted. If the answer is no, a block 717 is reached and stowing of the step commences. From block 717, a block 718 is reached with the state being set at the "Step Stowing With Alarms" state (FIG. 38). If at block 716 a determination is made that the cab is excessively tilted, the process continues to a block 720, with the step state being set equal to the "Stopped While Deploying Tilted Alarm" state (FIG. 42). From blocks 718 and 720, the process continues via the return block 713.

If at block 712 a determination is made that the door is not open, a decision block 722 is then reached. At block 722 a determination is made as to whether the cab is tilted in excess of a threshold. If the answer is no, at block 723 stowing of the stairway commences. From block 723, the process continues to a block 724, with the state being set to the "Step Stowing" state (FIG. 28). If at block 722 a determination is made that the cab is titled, the process continues at a block 725 with interior alerts, if used, being activated. From block 725 the process continues to a block 726, with the state being set in the "Stopped While Deploying Tilted Alarm" state (FIG. 42). From blocks 724 and 726, the process continues via the return block 713.

Figure 37:
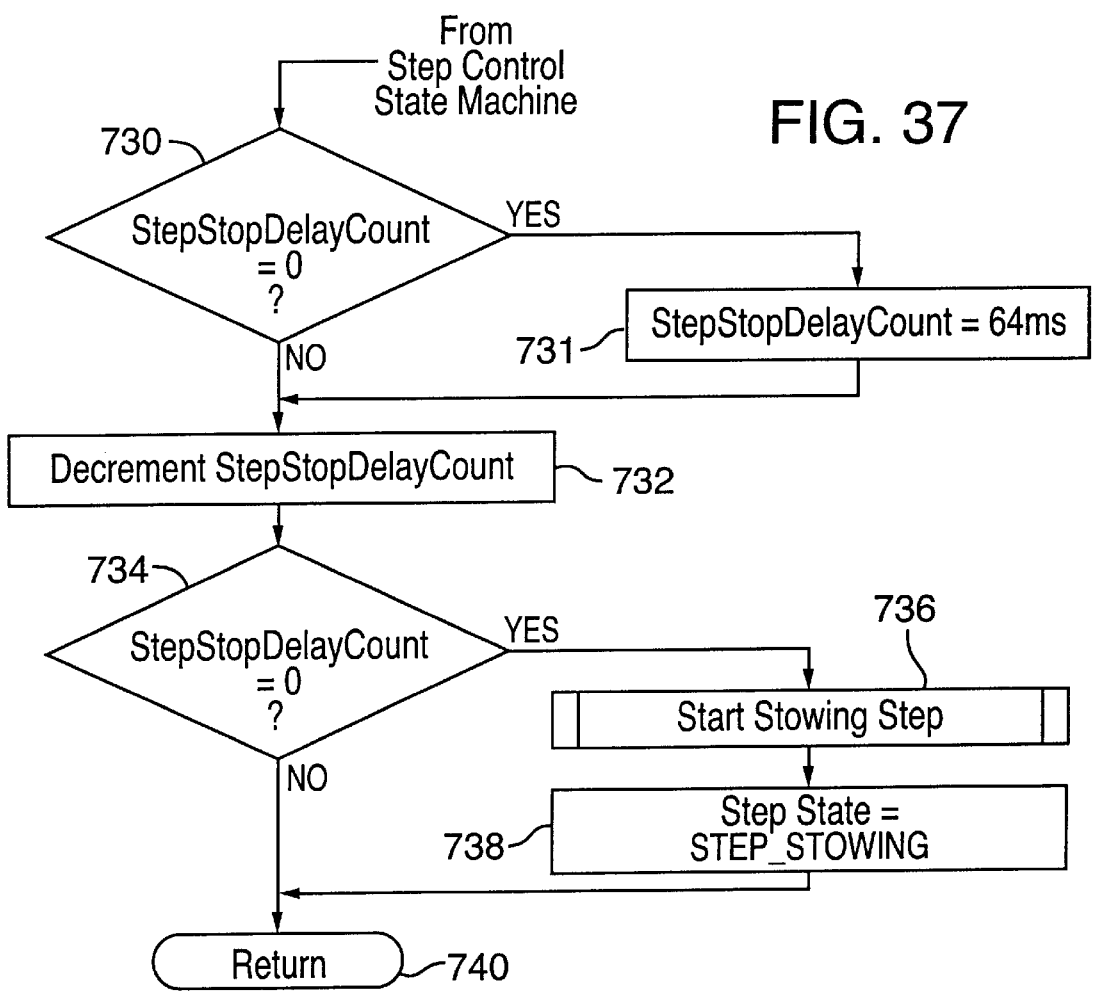

FIG. 37 illustrates an exemplary Stopped Waiting To Stow state. This state is included to insert a delay before recommencing the stowing of the stairway after stowing has stopped. This delay prevents instantaneous reversal of the polarity of the current being applied to the motor being used to shift the stairway between deployed and stowed positions. In some systems, for example where an electric motor is not being used or where other protections are provided, if needed, the delay illustrated by the FIG. 37 state may be eliminated.

In FIG. 37, a decision block 730 is reached from the step control state machine. At block 730, a determination is made as to whether the delay count equals zero. If the answer is yes, a delay has yet to be set during this state and a block 731 is reached. At block 731 the delay is set to a predetermined level, which may be varied, and which in this example is sixty-four milliseconds. From block 731, and also from block 730 in the event the delay count was not equal to zero, a block 732 is reached. At block 732, the delay count is decremented. From block 732, the process continues at a decision block 734. At block 734 a determination is made as to whether the count has been decremented to zero. If the answer is yes, the delay has timed out and a block 736 is reached. At block 736, stowing of the stairway commences. The process continues from block 736 to a block 738, with the step state being set equal to the "Step Stowing" state (FIG. 28). From block 738, the process continues to a return block 740. If at block 734 a determination is made that the delay has not elapsed, return block 740 is reached. Assuming no changes in state, eventually block 734 will be reached at a time when the delay has been decremented to zero, with the process then continuing at block 736, as previously described.

FIG. 38 illustrates an example of a Step Stowing With Alarms state. In this figure, from the step control state machine, a decision block 744 is reached. At block 744, a determination is made as to whether the step is in a fully stowed position. If the answer is yes, a block 746 is reached, with stowing of the step halted. At block 748, the interior alerts, assuming they are used, are deactivated so as to not indicate an alarm condition. Thereafter, a block 750 is reached, with the step state being placed in the "Step Stowed" state (FIG. 25). From block 750, a return block 751 is reached, with the process continuing at the step control state machine.

Assume at block 744 the step has yet to be stowed. In this case, from 744 a decision block 752 is reached. At block 752, a determination is made as to whether the motor current and step speed, assuming these conditions are being monitored, are at an acceptable level. If the answer is no, at block 753 stowing of the stairway is halted. Following block 753, a decision block 754 is reached. At block 754 a determination is made as to whether the step is close enough to a stowed position to be considered fully stowed. The amount to which the stairway may vary from a fully stowed position while still being considered fully stowed may be varied. In the specific step construction of FIGS. 1–3, although variable, the stairway is considered close enough if it is within two percent of the fully stowed position. If the stairway is not close enough to be considered fully stowed, a block 755 is reached. At block 755 the state is set equal to the "Stopped While Stowing With Alarms" state (FIG. 34), and the process continues to the return block 751. If at block 754 the step is close enough to a fully stowed position to be treated as fully stowed, a block 756 is reached. At block 756 the interior alerts, assuming they are used, are deactivated. From block 756, a block 757 is reached, with the state being placed in the "Step Stowed" state (FIG. 25). From block 757, the process continues to return block 751.

If at block 752 a determination is made that the motor current and step speed are acceptable, again assuming these conditions are being monitored, a decision block 760 is reached. At block 760, a determination is made as to whether the exterior disable switch has been pressed or placed in its stairway movement deactivate state. If the answer is no, the process continues to return block 751. If the answer is yes at block 760, the process continues at a block 762 with stowing of the stairway being halted. From block 762, a block 764 is reached. At block 764 the step state is set equal to the "Stopped While Stowing With Alarms" state (FIG. 34).

Figure 39:
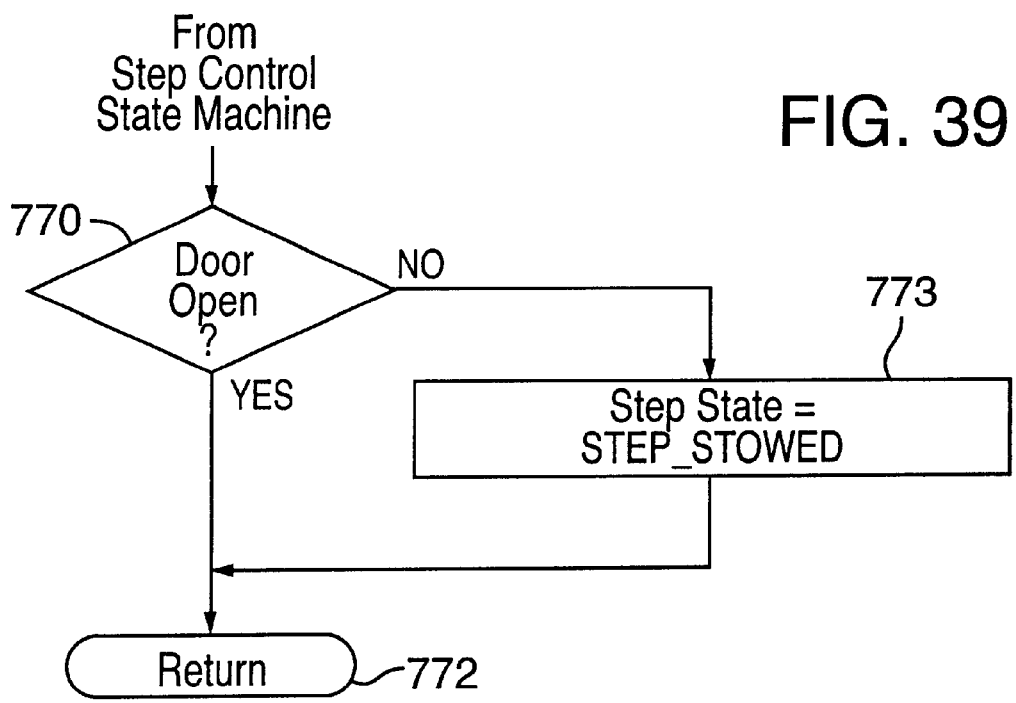

FIG. 39 illustrates an example of an Exterior Disabled Door Open state. In this state, the exterior disable switch has been shifted to a stairway movement deactivate state with the door open. From the state machine, a decision block 770 is reached. At block 770, a determination is made as to whether the door is open. If the answer is yes, a return block 772 is reached and the process continues. Assuming no changes, the process will recycle to decision block 770 until such time as the door is closed. When this occurs, from block 770, a block 773 is reached. At block 773 the state is shifted to the "Step Stowed" state (FIG. 25).

Figure 40:
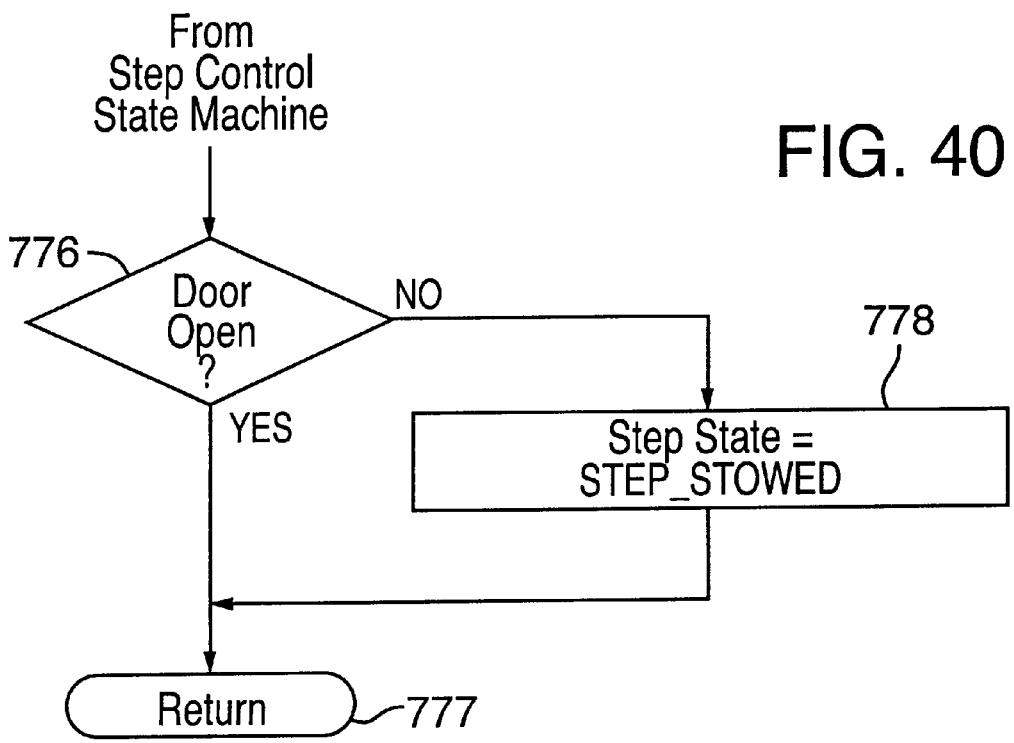

FIG. 40 illustrates an example of an Interior Disabled Door Open state. In this state, the interior switch is shifted to a stairway disable or movement deactivate state with the door open. From the step control state machine, a decision block 776 is reached. At block 776 a determination is made as to whether the door is open. If the answer is yes, return block 777 is reached and the process recycles. If nothing changes, block 776 will repetitively be reached until such time as the door is determined to be closed. In this case, from block 776 a block 778 is reached. At block 778, the step state is equal to the "Step Stowed" state (FIG. 25).

Figure 41:
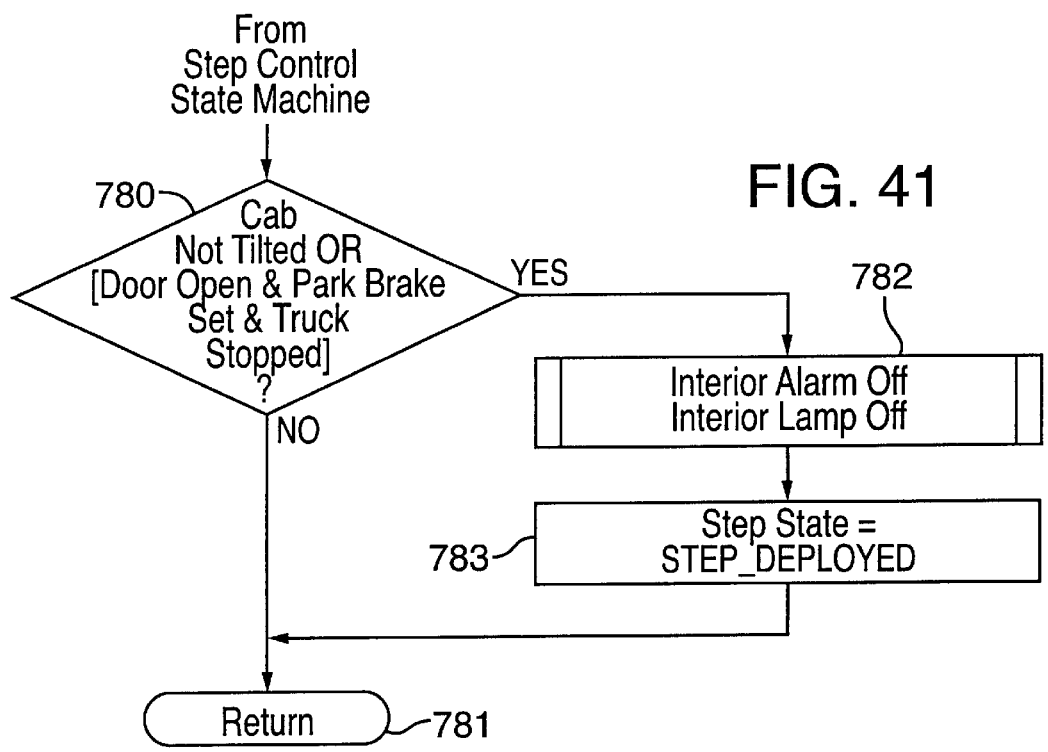

FIG. 41 illustrates an example of a Step Deployed With Alarms state. In this figure, from the step control state machine, a decision block 780 is reached. At block 780 a determination is made as to whether the cab is not excessively tilted or all of the following are true: (a) the door is open; (b) the parking brake is set; and (c) the vehicle is stopped. Again, this assumes that all of these conditions are being monitored. If the answer at block 780 is no, a return block 781 is reached and the process continues. If the answer at block 780 is yes, the interior alerts are deactivated from providing an alarm at block 782. From 782, the process continues to a block 783, at which the step state is set equal to the Step Deployed state (FIG. 27). From block 783, the process continues to the return block 781.

FIG. 42 illustrates one example of a Stopped While Deploying Tilted Alarm state. From the step control state machine, a decision block 786 is reached. At block 786 a determination is made as to whether the cab is not titled or the following conditions all exist: (a) the door is open; (b) the parking brake is set; and (c) the vehicle is stopped. If the answer is no, the process continues via the return block 787. If the answer is yes, again assuming all of these conditions are being monitored, a block 788 is reached and the interior alerts, if used, are deactivated. From block 788, a block 790 is reached, with the step state being set equal to the "Stopped While Deploying" state (FIG. 36).

Figure 43:
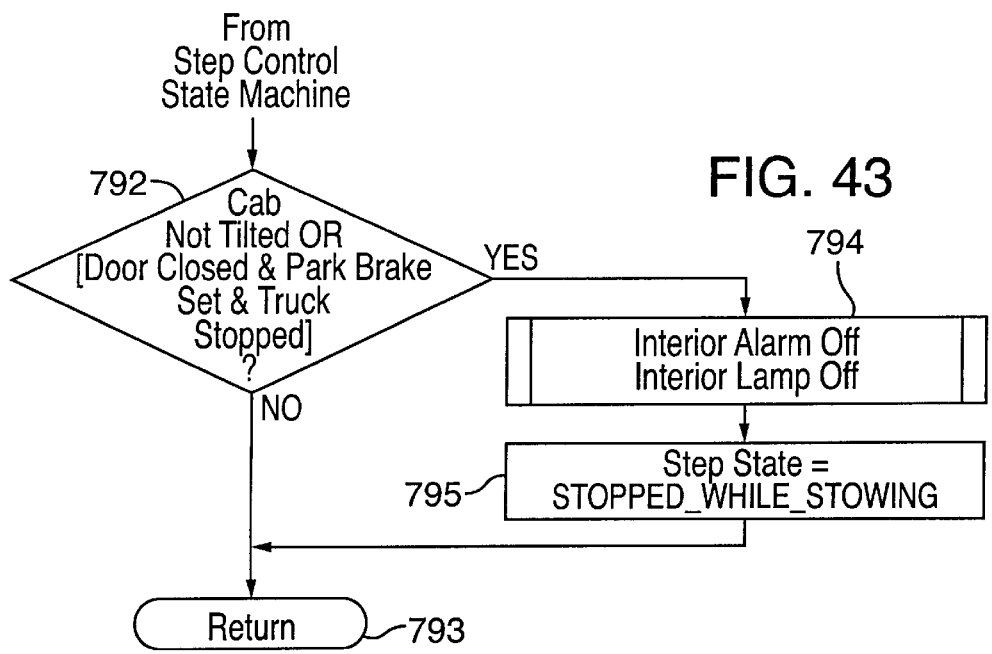

FIG. 43 illustrates one example of a Stopped While Stowing Tilted Alarm state. In this figure, from the step control state machine, a decision block 792 is reached. At block 792, a determination is made as to whether the cab is not tilted or all of the following conditions exist: (a) the door is closed; (b) the parking brake is set; and (c) the vehicle is stopped. Again, this assumes that all of these conditions are being monitored. If the answer at block 792 is no, the process continues to a return block 793. If the answer at block 792 is yes, the interior alerts, assuming they are being used, are deactivated from providing a warning at block 794. From block 794, the process continues to a block 795, with the state being set equal to the "Stopped While Stowing" state (FIG. 33). From block 795, the process continues via return block 793.

Figure 44:
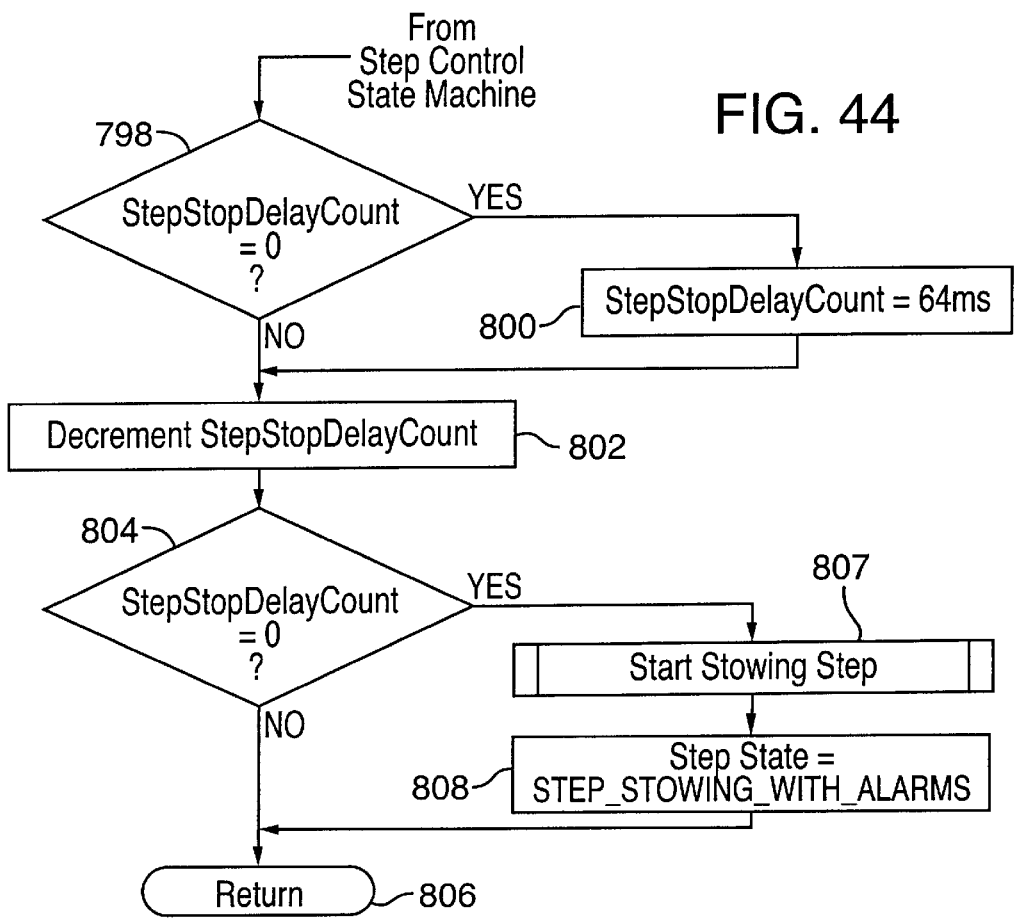

FIG. 44 illustrates one example of a Stopped Waiting To Stow With Alarms state. In this example, a delay is inserted before operating the motor after it has been stopped. Again, this delay prevents the instantaneous reversal of the polarity of current being supplied to the motor. If an electric motor is not being used, delays are unnecessary because of the particular motor being used, or other protection is provided, this state may be eliminated.

In FIG. 44, from the step control state machine, a decision block 798 is reached. At block 798, a determination is made as to whether the delay count is zero. If yes, a block 800 is reached and the delay count is set equal to a predetermined amount, such as sixty-four milliseconds. This delay amount may be varied. From block 800, a block 802 is reached. Block 802 is also reached if the delay count is not equal to zero at block 798. At block 802, the delay count is decremented. The process then continues at a decision block 804. At decision block 804, a determination is made as to whether the delay count is now zero. If the answer is no, a return block 806 is reached and the process continues. If nothing has changed, block 798 will again be reached with the process continuing via blocks 802 and 804. Eventually, at block 804, the delay count will be zero. In this case, a block 807 is reached and stowing of the stairway commences. From block 807, a block 808 is reached. At block 808 the state is equal to the "Step Stowing With Alarms" state (FIG. 38). From block 808, the return block 806 is again reached.

FIG. 45 illustrates one example of a low voltage door closed state. In general, this state, if used, is intended to block the deployment of the stairway from a stowed position in the event the battery voltage is too low to accomplish this task. In the absence of this state, the stairway may, for example, partially deploy under low battery voltage conditions and then stop. However, in such a case, one can simply manually return the stairway to a stowed position.

In FIG. 45, from the step control state machine, a decision block 810 is reached. At block 810, a determination is made as to whether the battery voltage is at an acceptable magnitude. If the answer is no, a decision block 811 is reached. At block 811, a determination is made as to whether the door is opened. If the answer is no, the process continues via a return block 812. If at block 810 the battery voltage is determined to be acceptable, an interior warning lamp is turned off at block 813. In addition, from block 813, a block 814 is reached, with the state being set equal to the "Step Stowed" state (FIG. 25). If the battery conditions are too low and the door is open at 811, an interior alarm sounds at block 815. A block 816 is reached following block 815, with the state being set equal to the "Stowed With Alarms" state (FIG. 29). The process continues from blocks 814 and 816 to the return block 812.

With reference to FIG. 46, assume that an electric motor is utilized to shift the stairway between the deployed and stowed positions. One way of determining whether an obstacle has been encountered by a stairway during stowing or deployment is to monitor the current being delivered to the motor. One can establish an overall current limit for the motor, with the operation of the stairway being halted if the overall current limit is exceeded. This mode of operation is indicated in one example by the overall hardware motor current limit level 820 shown in FIG. 46. That is, if the current is in excess of the hardware motor current limit, the operation movement of the stairway may be stopped.

A more sophisticated motor control may also be used. For example, the control circuit 402 may establish a software imposed motor current limit which, for example, may be less than or equal to the overall hardware motor current limit. The hardware motor current limit is typically set to be less than the maximum current which the motor may receive without damage to the motor. Current level 822 in FIG. 46 indicates an overall software imposed motor current limit which is less than the hardware motor current limit in this specific example. The motor may then be operated at a maximum current level which is below the software imposed motor current limit. Also, the software may be designed to ignore the motor current limits over a short period of time, for example, at commencement of the motor operation or short duration current spikes which occur as the motor operates.

In addition, the current delivered to the motor may be correlated with the position of deployment of the stairway. For example, in connection with the stairway of FIGS. 1–3, the stairway may be constructed to pivot a total of, for example, twenty-eight degrees from a fully stowed to a fully deployed position. In FIG. 46, the current waveform 824 is one example of the actual current required by an electric motor during one cycle of moving the stairway from a stowed position (zero degrees deployment) to a fully deployed position (twenty-eight degrees of deployment). As can be seen from this figure, apart from a current spike over about the first 1.7 degree of deployment, the current is below the overall software motor current limit 822.

Thus, one can correlate the current delivered to a motor with the position of deployment of the stairway. Furthermore, one can correlate and compare the current required by the motor at a specific position of deployment during a first deployment cycle with the current required by the motor at the same position during a subsequent deployment cycle. If the current has increased significantly, this provides an indication that an obstacle has been encountered. For example, if someone has left a package on the stairway as the stairway is being stowed, the package may block the stowing of the stairway. When the package encounters the side wall of the cab or other impinging structure, the current required by the motor will increase at the location of deployment where the package is encountered in comparison to the current required during the last stowing cycle at such deployment location. The software may detect this current change and, for example, halt the operation of the stairway. In addition, current required by the motor during deployment is not necessarily the same as the current required by the motor during stowing. Consequently, these correlations can be made for a given position of deployment during the deployment cycle and also during the stowing cycle. As another example, if someone is standing on the stairway when stowing commences, the motor will require more current in comparison to the case where the motor commenced stowing with no one present on the stairway. The software, again, can cause the stairway to halt operation under such conditions.

The correlation of motor current to stairway deployment position may be accomplished in numerous ways. FIG. 46 illustrates one specific example.

In connection with FIG. 46, the stairway travel is subdivided into a plurality of travel segments. In FIG. 46, although not necessary, the travel segments are equal to one another and, in this case, established at 3.5 degrees of travel. For each travel segment, a stored motor current average is established. The magnitude of the average for the first segment in FIG. 46 during deployment of the stairway from a stowed to a deployed position is indicated at 826. The magnitude of the stored average for the second travel segment is indicated at 828. The magnitude of the stored average current for successive travel segments are indicated respectively at 830, 832, 834, 836, 838, and 840. In determining a stored current average, the current may be sampled over a travel segment with the samples then being averaged to establish an initial stored motor current average for the segment. For example, sampling may take place at sixteen millisecond intervals, although this may be varied. During subsequent travel cycles in the same direction through the travel segment, the stored current average may be updated by averaging the stored average with the just measured current average for the travel segment. However, rather than updating the stored current average each time, the measured current average may be compared with the stored average, with the stored average being updated only if a significant change has occurred. For example, if the just measured average is within one percent of the stored average for the travel segment, it may be ignored.

A current tolerance may also be established for each travel segment. If the measured current exceeds the sum of the stored current average and the tolerance for a travel segment, at least for more than an insignificant amount of time, the software may cause the movement of the stairway to stop and cause the interruption of current to the motor. The tolerance for each segment may be varied. again, for a short period of time following motor start up (for example, five to ten microseconds, the current limits may be ignored. Current magnitudes 842–856 in FIG. 46 depict the sums of the stored current averages and tolerances for each travel segment during deployment of the stairway from a stowed position toward a deployed position. Again, these values may differ for the travel segments when the stairway is traveling in the opposite direction.

By allowing the sum of stored current and current tolerance to shift over time, varying stairway operating conditions may be accommodated. For example, assume that the stairway, over time, gradually becomes more difficult to deploy and stow. For example, assume dirt is accumulating gradually on the stairway. Over time, the stored current average will increase with the current tolerance also increasing to be above the stored current average. Consequently, gradual changes in current requirements are effectively ignored due to the shifting stored current average and maximum current tolerance values. From a software design standpoint, the maximum value of the sum of the current tolerance and stored current average may be established to be no greater than the overall software motor current limit with exceptions, for example, for the initial travel segment, such as shown in FIG. 46.

The control circuit 402 may also increase the current delivered to the motor under selected operating conditions. For example, assume that the stairway is being shifted to a stowed position, but has yet to reach the stowed position. Also assume that the vehicle operator has started to move the vehicle. Under these conditions, to increase the power available for stowing of the stairway and to, in some cases, accelerate the stowing of the stairway, the software may increase the current being delivered to the motor to an amount in excess of the sum of the current tolerance and stored current average. The control circuit 402 may also increase the current in such cases to a level which is equal to the overall software motor current limit. This provides more power to the motor, allowing the motor to clear minor obstacles to stowing of the stairway. For example, if twigs are on the stairway and are blocking the full stowing of the stairway, the increased current may be enough to shift the stairway to a stowed position by overcoming the resistance to stowing provided by this debris. Also, if the vehicle commences moving and, for example, is traveling in excess of a predetermined speed, for example, over five miles per hour, the program may ignore the overall software current limit and allow the current to reach the hardware current limit.

As a specific example, the motor and actuator utilized in the embodiments of FIG. 1–3 may be a commercially available motor arm actuator, and potentiometer, such as Warner Electric Model E-150 motor. This specific motor has a potentiometer with a resistance of approximately 580 ohms per inch of travel of the actuator arm. With this specific construction, about three seconds is required to fully deploy and fully stow the stairway. In addition, the motor current may, for example, be sampled every sixteen milliseconds, with the measured average for each travel segment being determined at the end of the segment. During stowing of the stairway, approximately five to ten pounds force is enough to cause the maximum current tolerance to be reached, for example, assuming someone or something is standing or placed on the lowest step where the force would be maximum.

The software may be set to ignore an initial time of travel of the stairway (for example, about one second which would correspond to about the first eight degrees of travel under normal circumstances). In this case, the hardware current level would establish the maximum current available to the motor during this initial time. Again, the hardware current limit may be higher for an initial period of motor operation (e.g. for five to ten microseconds) to accommodate initial motor current spikes which can go up to fifty amps, with the hardware current limit, for example, being established at twenty amps thereafter.

If the speed of the truck exceeds five miles per hour, the control may ignore the software current limit and allow the current to go upward to the hardware current limit.

As a specific example, for travel segments one through eight, the maximum software current limit during stairway deployment may be established at ten amps.

The tolerance during the first travel segment during deployment may be set at four amps with the tolerance for the remaining segments being set at three amps. Again, these tolerances may be varied. During shifting from a deployed to a stowed position, the maximum software limit may be set at nine amps, as a specific example, although it may be increased to ten amps when the snubber is engaged. Similarly, the tolerance for the first travel segment during stowing (which corresponds to the eighth travel segment during deployment), may be set at four amps, with the tolerance set at three amps for, the remaining travel segments during stowing. Again, the tolerance may be varied for different travel segments and from one segment to the next.

It should be again noted that the actuator for deploying and stowing the stairway need not be an electric motor. Nevertheless, the previously described control approach may be utilized for controlling this type of stairway, although motor current would not be monitored in this case. Also, as previously mentioned, the control system may be utilized with an extendable and retractable stairway other than a stairway which pivots between stowed and deployed positions.

Having illustrated and described the principles of our invention with reference to several preferred embodiments, it should be apparent to those of ordinary skill in the art that the invention may be modified in arrangement and detail without departing from such principles. We claim as our invention all such modifications which fall within the scope of the following claims.

What is claimed is:

1. A method of controlling a retractable stairway assembly for a vehicle, the vehicle having a cab, the cab having an exterior and an interior, the cab also having a cab sidewall within which a doorway and door is positioned, access through the doorway being provided for ingress and egress into and out of the cab interior when the door is open, the retractable stairway being shiftable from a stowed position to a deployed position, when deployed the stairway is positioned for climbing along the stairway to and from the doorway, the method comprising:

evaluating at least one vehicle status condition from a set of vehicle status conditions, the set of vehicle status conditions including at least one of the following: (a) whether the vehicle is stopped, (b) whether the parking brake is set, and (c) whether the cab is tilted from horizontal in excess of a threshold; and blocking the deployment of the stairway from a stowed position if said at least one vehicle status condition is not in a predetermined state.

2. A method controlling a retractable stairway assembly according to claim 1 in which said set of vehicle status conditions comprises all three vehicle status conditions of whether the truck is stopped, whether the parking brake is set, and whether the cab is tilted from horizontal in excess of the threshold; and wherein the step of evaluating comprises the step of evaluating at least these three vehicle status conditions;

wherein the blocking of the deployment of the stairway step from a stowed position occurs if the predetermined states are: (a) the truck is not stopped, (b) the parking brake is not set, and (c) the cab is tilted from horizontal in excess of the threshold.

3. A method of controlling a retractable stairway assembly according to claim 1 in which the set of vehicle status conditions comprises at least two vehicle status conditions of the three vehicle status conditions of: (a) whether the truck is stopped, (b) whether the parking brake is set, and (c) whether the cab is tilted from horizontal in excess of a threshold;

wherein the step of evaluating comprises the step of evaluating said at least two vehicle status conditions of the set of vehicle status conditions; and wherein the blocking the deployment of the stairway step from a stowed position occurs if said at least two status conditions are not in a predetermined state.

4. A method of controlling a retractable stairway assembly according to claim 1 in which the blocking the deployment step from a stowed position includes the step of blocking the deployment of the stairway if a manually actuated disable control is in a step deployment deactivating state.

5. A method according to claim 4 including the step of shifting a manually activated disable control located at the exterior of the cab to a step deployment deactivating state and wherein the blocking the deployment step comprises the step of blocking the deployment of the stairway if the exterior disable control is in the step deployment deactivating state.

6. A method according to claim 5 including the step of automatically shifting the exterior disable control out of the step deployment deactivating state after a predetermined period of time.

7. A method according to claim 4 including the step of shifting a manually activated disable control located within the interior of the cab to a step deployment deactivating state, wherein the blocking the deployment step comprises the step of blocking the deployment of the stairway if the interior disable control is in the step deployment deactivating state.

8. A method according to claim 7 wherein the interior disable control remains in the step deployment deactivating state until the door is opened and closed.

9. A method of controlling a retractable stairway assembly according to claim 1 including the step of providing electric current from a battery to an electric motor to deploy the stairway from a stowed position and wherein the blocking the deployment step includes the step of blocking the deployment of the stairway if the battery voltage is below a threshold.

10. A method of controlling a retractable stairway assembly according to claim 1 including the step of automatically deploying the stairway from a stowed position toward the deployed position if said at least one vehicle status condition is in the predetermined state and the door is opened.

11. A method of controlling a retractable stairway according to claim 10 including the step of stopping the deployment of the stairway from the stowed position toward a deployed position in the event said at least one vehicle status condition ceases to be in the predetermined state following the commencement of deployment of the stairway.

12. A method of controlling a retractable stairway according to claim 11 including the step of evaluating at least one interrupt deployment of stairway condition from a set of interrupt deployment of stairway conditions, the set of interrupt deployment of stairway conditions including at least one of the following: (a) whether a manually activated exterior disable control at the exterior of the cab is in a step deployment deactivating state, and (b) whether the speed of deployment of the stairway is below a threshold speed; and
interrupting the deployment of the stairway if said at least one interrupt stairway deployment status condition is not in a predetermined state.

13. A method of controlling a retractable stairway assembly according to claim 12 including the step of providing an electric motor for shifting the stairway between deployed and stowed positions;
the method including the step of evaluating the electric current provided to the motor;

wherein the set of interrupt deployment of stairway conditions also includes whether the motor current is in excess of a threshold; and the step of interrupting the deployment of the stairway comprises the step of interrupting the deployment of the stairway in the event the motor current is in excess of the threshold.

14. A method of controlling a retractable stairway assembly according to claim 13 in which the step of interrupting the deployment of the stairway occurs if any of the following predetermined states exist for the set of interrupt deployment of stairway conditions: (a) the exterior disable control is in the step deployment deactivating state, (b) the speed of deployment of the step is below the threshold speed, and (c) the motor current is in excess of the threshold.

15. A method of controlling a retractable stairway according to claim 13 including the step of monitoring the position of the stairway as the stairway is shifted between a fully stowed and a fully deployed position, dividing up the distance of travel of the stairway between the fully stowed and fully deployed positions into a plurality of travel segments, and establishing an operating current deployment threshold for at least a plurality of such travel segments, the operating current deployment threshold being below a maximum current threshold, the method including the step of adjusting the operating current deployment threshold for each of said at least a plurality of travel segments in response to changes in the current delivered to the motor during at least one prior deployment of the stairway through said each of said at least a plurality of travel segments, wherein the operating current deployment threshold for one travel segment may differ from the operating current deployment threshold for other travel segments, and wherein the interrupt deployment of stairway conditions include whether the operating current deployment threshold established for any of the travel segments is exceeded.

16. A method of controlling a retractable stairway according to claim 14 including the step of varying the motor current threshold over time.

17. A method of controlling a retractable stairway according to claim 14 including the step of correlating the motor current threshold with the position of the stairway between fully stowed and fully deployed conditions and permitting the motor current threshold to differ with the position that the stairway is in during stairway deployment.

18. A method of controlling a retractable stairway assembly according to claim 9 including the step of sounding an alarm at the exterior of the cab during deployment of the stairway.

19. A method of controlling a retractable stairway assembly according to claim 14 including the step of activating an alert within the interior of the cab in the event deployment of the stairway is interrupted.

20. A method of controlling a retractable stairway assembly according to claim 14 also including the step of activating an alert within the interior of the cab in the event said at least one vehicle status condition is not in the predetermined state.

21. A method of controlling a retractable stairway according to claim 10 including the step of interrupting the deployment of the stairway upon closing the door.

22. A method of controlling a retractable stairway according to claim 21 including the step of stowing the stairway from a partially or fully deployed position and toward the stowed position in the event at least one of the following vehicle status conditions occur: (a) the vehicle starts moving, and (b) the parking brake is not set.

23. A method of controlling a retractable stairway according to claim 22 including the step of increasing the speed at which the stairway is stowed in the event the vehicle status is the vehicle starts moving.

24. A method of controlling a retractable stairway assembly according to claim 1 including the step of deploying the stairway from a stowed position toward the deployed position upon actuation of a manually actuated exterior control to a step activate deployment state.

25. A method of controlling a retractable stairway according to claim 1 comprising the step of commencing the stowing of a stairway from a deployed or partially deployed position toward a stowed position in the event at least one of the following vehicle status conditions occur: (a) the truck commences moving, and (b) the parking brake is not set.

26. A method of controlling a retractable stairway according to claim 25 comprising the step of interrupting the stowing of the stairway from a fully or partially deployed position toward the stowed position in the event the vehicle status condition is the cab is tilted from horizontal in an amount which is greater than the threshold.

27. A method of controlling a retractable stairway assembly according to claim 1 including the step of providing an electric motor for shifting the stairway between deployed and stowed positions;
  the method including the step of evaluating the electric current provided to the motor;
  the method including the step of operating the motor to move the stairway from a fully or partially deployed position and toward the stowed position;
  the method further including the step of interrupting the stowing of the stairway by the motor in the event the motor current is in excess of a stowing motor current threshold.

28. A method of controlling a retractable stairway according to claim 27 including the step of monitoring the position of the stairway as the stairway is shifted between a deployed and stowed position, dividing up the distance of travel of the stairway between the fully stowed and fully deployed positions into a plurality of travel segments, and establishing an operating current stowing threshold for at least a plurality of such travel segments, the operating current stowing threshold being below a maximum current threshold, the method including the step of adjusting the operating current stowing threshold for each of said at least a plurality of travel segments in response to changes in the current delivered to the motor during at least one prior stowing of the stairway through said each of said at least a plurality of travel segments, wherein the operating current stowing threshold for one travel segment may differ from the operating current deployment threshold for other travel segments, and wherein the interrupt deployment of stairway conditions include whether the operating current stowing threshold for any of the travel segments is exceeded.

29. A method of controlling a retractable stairway according to claim 27 including the step of varying the motor current threshold over time.

30. A method of controlling a retractable stairway according to claim 27 including the step of correlating the stowing motor current threshold with the position of the stairway between fully stowed and fully deployed conditions and permitting the stowing motor current threshold to differ with the position that the stairway is in during stowing of the stairway.

31. A method of controlling a retractable stairway assembly for a vehicle, the vehicle having a cab, the cab having an interior and an exterior, the cab also having a cab sidewall within which a doorway and door is positioned, access through the doorway being provided for ingress and egress into and out of the cab interior when the door is open, the retractable stairway being shiftable from a stowed position to a deployed position, when in the deployed position the stairway is exposed for climbing along the stairway to and from the doorway, the method comprising the steps of determining whether the vehicle is tilted from horizontal in excess of a threshold and blocking the deployment of the stairway from a stowed position toward a deployed position if the cab is tilted in excess of the threshold.

32. A method of controlling a retractable stairway assembly for a vehicle, the vehicle having a cab, the cab having an exterior and an interior, the cab also having a cab sidewall within which a doorway and door is positioned, access through the doorway being provided for ingress and egress into and out of the cab interior when the door is open, the retractable stairway being shiftable from a fully or partially deployed position to a stowed position, when in the fully deployed position the stairway is exposed for climbing along the stairway to and from the doorway, the method comprising the steps of shifting the stairway from the deployed or partially deployed position toward a stowed position at a first rate and increasing the rate at which the stairway shifted toward the stowed position in the event the vehicle starts moving as the stairway is being shifted toward the stowed position.

33. A method of controlling a retractable stairway assembly for a vehicle, the vehicle having a cab, the cab having an exterior and an interior, the cab also having a cab sidewall within which a doorway and door is positioned, access through the doorway being provided for ingress and egress into and out of the cab interior when the door is open, the retractable stairway being shiftable from a stowed position to a deployed position and from a deployed position to a stowed position, an electric motor being provided to shift the stairway between the stowed and deployed positions, when in a fully deployed position the stairway is positioned for climbing along the stairway to and from the doorway, the method comprising:
  evaluating the current being supplied to the motor during shifting of the stairway; and
  halting the shifting of the stairway in the event the current being supplied to the motor is in excess of a current threshold.

34. A method of controlling a retractable stairway assembly according to claim 33 including the step of establishing a current threshold which is at a first magnitude when the stairway is at a first position during deployment or stowing of the stairway and which is at a second magnitude when the stairway is at a second position during deployment or stowing of the stairway, and adjusting the first and second magnitudes over time and relative to one another.

35. A method of controlling a retractable stairway assembly according to claim 34 including the step of monitoring the current being provided to the motor when the stairway is at at least one position of deployment during deployment or stowing of the stairway, establishing a current threshold for current being delivered to the stairway when the stairway is in said one position during deployment or stowing of the stairway, varying the current threshold corresponding to said one position in the event the actual current being delivered to the motor when the stairway is in said one position varies from the actual current delivered to the motor when the stairway was in said one position during a previous deployment or stowing of the stairway.

36. A method of controlling a retractable stairway according to claim 35 in which the current threshold corresponding to said one position during stairway deployment is permitted to differ from the current threshold corresponding to said one position during stairway stowing.

37. A method of controlling a retractable stairway according to claim 36 including the step of establishing a maximum current threshold and the step of limiting the current threshold to be no greater than the maximum current threshold.

38. A method of controlling a retractable stairway according to claim 33 including the step of monitoring the position of the stairway as the stairway is shifted between a fully stowed and a fully deployed position, dividing up the distance of travel of the stairway between the fully stowed and fully deployed positions into a plurality of travel segments, and establishing an operating current deployment threshold for at least a plurality of such travel segments, the operating current deployment threshold being below a maximum current threshold, the method including the step of adjusting the operating current deployment threshold for each of said at least a plurality of travel segments in response to changes in the current delivered to the motor during at least one prior deployment of the stairway through said each of said at least a plurality of travel segments, wherein the operating current deployment threshold for one travel segment may differ from the operating current deployment threshold for other travel segments, and wherein the interrupt deployment of stairway conditions include whether the operating current deployment threshold established for any of the travel segments is exceeded.

39. A method of controlling a retractable stairway according to claim 33 including the step of varying the motor current threshold over time.

40. A method of controlling a retractable stairway according to claim 33 including the step of correlating the motor current threshold with the position of the stairway between fully stowed and fully deployed conditions and permitting the motor current threshold to differ with the position that the stairway is in during stairway stowing and deployment.

41. A method of controlling a retractable stairway according to claim 40 including the step of limiting the motor current threshold to be no greater than a maximum current threshold.

42. A method of controlling a retractable stairway assembly for a vehicle, the vehicle having a cab, the cab having an exterior and an interior, the cab also having a cab sidewall within which a doorway and door is positioned, access through the doorway being provided for ingress and egress into and out of the cab interior when the door is open, the retractable stairway being shiftable from a stowed position to a deployed position, when deployed the stairway is positioned for climbing along the stairway to and from the doorway, the method comprising:

evaluating at least one vehicle status condition from a set of vehicle status conditions, the set of vehicle status conditions including at least one of the following: (a) whether the truck is stopped, (b) whether the parking brake is set, and (c) whether the cab is tilted from horizontal in excess of a threshold; and blocking the deployment of the stairway from a stowed position if said at least one vehicle status condition is not in a predetermined state;

said set of vehicle status conditions comprising all three vehicle status conditions of whether the truck is stopped, whether the parking brake is set, and whether the cab is tilted from horizontal in excess of the threshold; and wherein the step of evaluating comprises the step of evaluating at least these three vehicle status conditions;

wherein the blocking of the deployment of the stairway step from a stowed position occurs if the predetermined states are: (a) the truck is not stopped, (b) the parking brake is not set, and (c) the cab is tilted from horizontal in excess of the threshold;

the set of vehicle status conditions comprising at least two vehicle status conditions of the three vehicle status conditions of: (a) whether the truck is stopped, (b) whether the parking brake is set, and (c) whether the cab is tilted from horizontal in excess of a threshold;

wherein the step of evaluating comprises the step of evaluating said at least two vehicle status conditions of the set of vehicle status conditions; and wherein the blocking the deployment of the stairway step from a stowed position occurs if said at least two status conditions are not in a predetermined state;

the blocking the deployment step from a stowed position including the step of blocking the deployment of the stairway if a manually actuated disable control is in a step deployment deactivating state;

including the step of shifting a manually activated disable control located at the exterior of the cab to a step deployment deactivating state and wherein the blocking the deployment step comprises the step of blocking the deployment of the stairway if the exterior disable control is in the step deployment deactivating state;

including the step of automatically shifting the exterior disable control out of the step deployment deactivating state after a predetermined period of time;

including the step of shifting a manually activated disable control located within the interior of the cab to a step deployment deactivating state, wherein the blocking the deployment step comprises the step of blocking the deployment of the stairway if the interior disable control is in the step deployment deactivating state;

wherein the interior disable control remains in the step deployment deactivating state until the door is opened and closed;

including the step of providing electric current from a battery to an electric motor to deploy the stairway from a stowed position and wherein the blocking the deployment step includes the step of blocking the deployment of the stairway if the battery voltage is below a threshold;

including the step of automatically deploying the stairway from a stowed position toward the deployed position if said at least one vehicle status condition is in the predetermined state and the door is opened;

including the step of stopping the deployment of the stairway from the stowed position toward a deployed position in the event said at least one vehicle status condition ceases to be in the predetermined state following the commencement of deployment of the stairway;

including the step of evaluating at least one interrupt deployment of stairway condition from a set of interrupt deployment of stairway conditions, the set of interrupt deployment of stairway conditions including at least one of the following: (a) whether a manually activated exterior disable control at the exterior of the cab is in a step deployment deactivating state, and (b) whether the speed of deployment of the stairway is below a threshold speed; and interrupting the deployment of the stairway if said at least one interrupt stairway deployment status condition is not in a predetermined state;

including the step of providing an electric motor for shifting the stairway between deployed and stowed positions;

the method including the step of evaluating the electric current provided to the motor;

wherein the set of interrupt deployment of stairway conditions also includes whether the motor current is in excess of a threshold; and the step of interrupting the deployment of the stairway comprises the step of interrupting the deployment of the stairway in the event the motor current is in excess of the threshold;

in which the step of interrupting the deployment of the stairway occurs if any of the following predetermined states exist for the set of interrupt deployment of stairway conditions: (a) the exterior disable control is in the step deployment deactivating state, (b) the speed of deployment of the step is below the threshold speed, and (c) the motor current is in excess of the threshold;

including the step of monitoring the position of the stairway as the stairway is shifted between a fully stowed and a fully deployed position, dividing up the distance of travel of the stairway between the fully stowed and fully deployed positions into a plurality of travel segments, and establishing an operating current deployment threshold for at least a plurality of such travel segments, the operating current deployment threshold being below a maximum current threshold, the method including the step of adjusting the operating current deployment threshold for each of said at least a plurality of travel segments in response to changes in the current delivered to the motor during at least one prior deployment of the stairway through said each of said at least a plurality of travel segments, wherein the operating current deployment threshold for one travel segment may differ from the operating current deployment threshold for other travel segments, and wherein the interrupt deployment of stairway conditions include whether the operating current deployment threshold established for any of the travel segments is exceeded;

including the step of varying the motor current threshold over time;

including the step of correlating the motor current threshold with the position of the stairway between fully stowed and fully deployed conditions and permitting the motor current threshold to differ with the position that the stairway is in during stairway deployment;

including the step of sounding an alarm at the exterior of the cab during deployment of the stairway;

including the step of activating an alert within the interior of the cab in the event deployment of the stairway is interrupted;

also including the step of activating an alert within the interior of the cab in the event said at least one vehicle status condition is not in the predetermined state;

including the step of interrupting the deployment of the stairway upon closing the door;

including the step of stowing the stairway from a partially or fully deployed position and toward the stowed position in the event at least one of the following vehicle status conditions occur: (a) the vehicle starts moving, and (b) the parking brake is not set;

including the step of increasing the speed at which the stairway is stowed in the event the vehicle status is the vehicle starts moving;

including the step of deploying the stairway from a stowed position toward the deployed position upon actuation of a manually actuated exterior control to a step activate deployment state;

comprising the step of commencing the stowing of a stairway from a deployed or partially deployed position toward a stowed position in the event at least one of the following vehicle status conditions occur: (a) the truck commences moving, and (b) the parking brake is not set;

comprising the step of interrupting the stowing of the stairway from a fully or partially deployed position toward the stowed position in the event the vehicle status condition is the cab is tilted from horizontal in an amount which is greater than the threshold;

including the step of providing an electric motor for shifting the stairway between deployed and stowed positions;

the method including the step of evaluating the electric current provided to the motor;

the method including the step of operating the motor to move the stairway from a fully or partially deployed position and toward the stowed position;

the method further including the step of interrupting the stowing of the stairway by the motor in the event the motor current is in excess of a stowing motor current threshold;

including the step of monitoring the position of the stairway as the stairway is shifted between a deployed and stowed position, dividing up the distance of travel of the stairway between the fully stowed and fully deployed positions into a plurality of travel segments, and establishing an operating current stowing threshold for at least a plurality of such travel segments, the operating current stowing threshold being below a maximum current threshold, the method including the step of adjusting the operating current stowing threshold for each of said at least a plurality of travel segments in response to changes in the current delivered to the motor during at least one prior stowing of the stairway through said each of said at least a plurality of travel segments, wherein the operating current stowing threshold for one travel segment may differ from the operating current deployment threshold for other travel segments, and wherein the interrupt deployment of stairway conditions include whether the operating current stowing threshold for any of the travel segments is exceeded;

including the step of varying the motor current threshold over time; and including the step of correlating the stowing motor current threshold with the position of the stairway between fully stowed and fully deployed conditions and permitting the stowing motor current threshold to differ with the position that the stairway is in during stowing of the stairway.

43. A method of controlling a retractable stairway assembly for a vehicle according to claim 41 wherein the stairway includes means for pivoting the stairway to the vehicle, means for snubbing the stairway when in a stowed position, means for latching the stairway in a stowed position, and means for selectively locking the stairway in a stowed position.

* * * * *